United States Patent
Fletcher et al.

[11] Patent Number: 6,112,190
[45] Date of Patent: *Aug. 29, 2000

[54] METHOD AND SYSTEM FOR COMMERCIAL CREDIT ANALYSIS

[75] Inventors: Bruce Alan Fletcher, Darien, Conn.; Sandeep Bhat, Rego Park, N.Y.; Ira Didner, Bellerose, N.Y.; Yehudah Freundlich, Brooklyn, N.Y.; Richard Kolodziejski, Deer Park, N.Y.; Joseph Schoder, Ardsley, N.Y.; Yagil Ronen, New York, N.Y.

[73] Assignee: Citibank, N.A., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/912,866

[22] Filed: Aug. 19, 1997

[51] Int. Cl.$^7$ .............................. G06F 17/00; G06F 17/30
[52] U.S. Cl. .................................. 705/38; 705/35; 705/36; 706/60; 706/61; 706/47; 706/50
[58] Field of Search ................................... 705/3, 38, 35, 705/40, 10, 36, 44, 39, 4, 26, 37; 706/45, 59–60, 11, 46–47, 17, 16, 61, 10, 50

[56] References Cited

U.S. PATENT DOCUMENTS

| | | | |
|---|---|---|---|
| 4,724,521 | 2/1988 | Carron et al. | 395/712 |
| 4,754,410 | 6/1988 | Leech et al. | |
| 4,774,664 | 9/1988 | Campbell et al. | |
| 4,866,634 | 9/1989 | Reboh et al. | 706/60 |
| 4,989,141 | 1/1991 | Lyons et al. | |
| 5,062,055 | 10/1991 | Chinnaswamy et al. | 702/182 |
| 5,136,686 | 8/1992 | Koza | 706/13 |
| 5,189,606 | 2/1993 | Burns et al. | 705/10 |
| 5,262,941 | 11/1993 | Saladin et al. | 705/38 |
| 5,274,547 | 12/1993 | Zoffel et al. | |
| 5,325,505 | 6/1994 | Hoffecker et al. | 707/101 |
| 5,361,201 | 11/1994 | Jost et al. | 705/35 |
| 5,446,885 | 8/1995 | Moore et al. | |
| 5,471,382 | 11/1995 | Tallman et al. | 705/2 |
| 5,481,647 | 1/1996 | Brody et al. | 706/11 |
| 5,550,964 | 8/1996 | Davoust | 345/440 |
| 5,574,828 | 11/1996 | Hayward et al. | 706/45 |
| 5,631,828 | 5/1997 | Hagan | 705/4 |
| 5,644,727 | 7/1997 | Atkins | 705/40 |
| 5,701,400 | 12/1997 | Amado | 706/45 |
| 5,732,397 | 3/1998 | DeTore et al. | 705/1 |
| 5,761,502 | 6/1998 | Jacobs | 707/103 |
| 5,764,923 | 6/1998 | Tallman et al. | 705/3 |
| 5,774,883 | 6/1998 | Andersen et al. | 705/38 |
| 5,799,297 | 8/1998 | Goodridge et al. | 707/1 |

FOREIGN PATENT DOCUMENTS

WO 96/30850   10/1996   WIPO .............................. G06F 17/60

OTHER PUBLICATIONS

Article—Castillo, O., Melin, P.; *An Expert System for Credit Evaluation*; Software Engineering Press (1993) pp. 236–241.

(List continued on next page.)

*Primary Examiner*—James P. Trammell
*Assistant Examiner*—Cuong H. Nguyen
*Attorney, Agent, or Firm*—George T. Marcou; Kilpatrick Stockton LLP

[57] ABSTRACT

This invention describes a method and system for assimilating data, applying reasoning mechanisms, and emulating the thought processes of a credit officer for commercial credit analysis. The system aids a credit officer in the risk assessment and completion of a loan package. The system thereby improves loan turnaround time and customer service, improving loan servicing capacity, quality, and consistency of credit decisions, and reducing costs. The system includes: 1) a conventional data base management system subsystem that manages and collects data via electronic access and end-user data entry; and 2) a decision support expert system that applies a knowledge base and inference engine (collectively known as an assessment model) utilizing an evidence tree and a generalized weighting approach to analyze credit requests.

57 Claims, 47 Drawing Sheets

OTHER PUBLICATIONS

Article—Beshinske, R., Spence, S.R., Nigam, R.; *Margin Credit Evaluation System*; IEEE (1991) pp. 128–131.

Article—Rothi, J.A., Yen, D.C.; *Why American Express Gambled on an Expert Data Base*; Information Strategy: The Executive's Journal (Spring 1990) pp. 16–22.

Article—Wolf, M.F.; *New Technologies for Customer Rating: Integration of Knowledge–Based Systems and Human Judgment*; Intelligent Systems in Accounting, Finance and Management, vol. 2 (1995) pp. 289–301.

Article—Tamai, T., Fujita, M.; *Development of an expert system for credit card application assessment*; International Journal of Computer Applications in Technology, vol. 2, No. 4 (1989) pp. 234–240.

Article—Ringlstetter, F., Guntzer, U., Moll, K.R., Juttner, G. Haußler, W., *Expert System for Credit Evaluation On a Personal Computer*; Information Technology for Organisational Systems (1988) pp. 1095–1100.

Presentation—Power, R., Dr.; *A System for Assessing Credit–Worthiness*; 8th International Workshop—Expert Systems & Their Applications; Avignon, France, May 30–Jun. 3, 1988.

Article—Rosenberg, E., Gleit, A.; *Quantitative Methods in Credit Management: A Survey*; Operations Research, vol. 42, No. 4 (Jul.–Aug. 1994) pp. 589–613.

Article—Srinivasan, V., Ruparel, B.; *CGX: An expert support system for credit granting*; European Journal of Operational Research 45 (1990) pp. 293–308.

Article—Sivasankaran, T., Ruby, R., Jr.; *An Expert System for Analysis of Credit Profiles*; Journal of Computer Information Systems (Summer 1990) pp. 31–38.

Article—Anonymous; *Lots of Ways to Make Credit Decisions*; United States Banker (Feb. 1992) pp. 57–59.

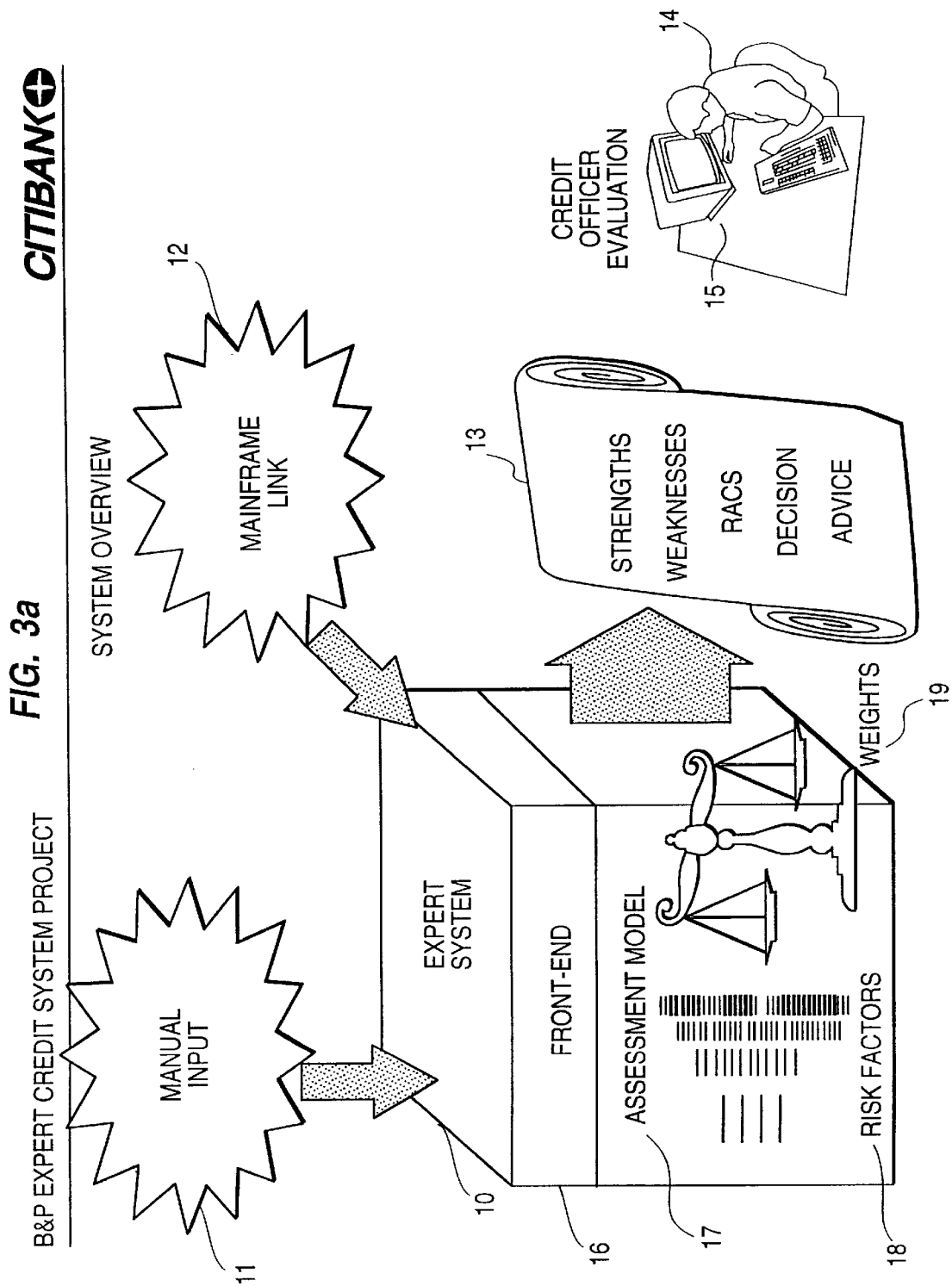

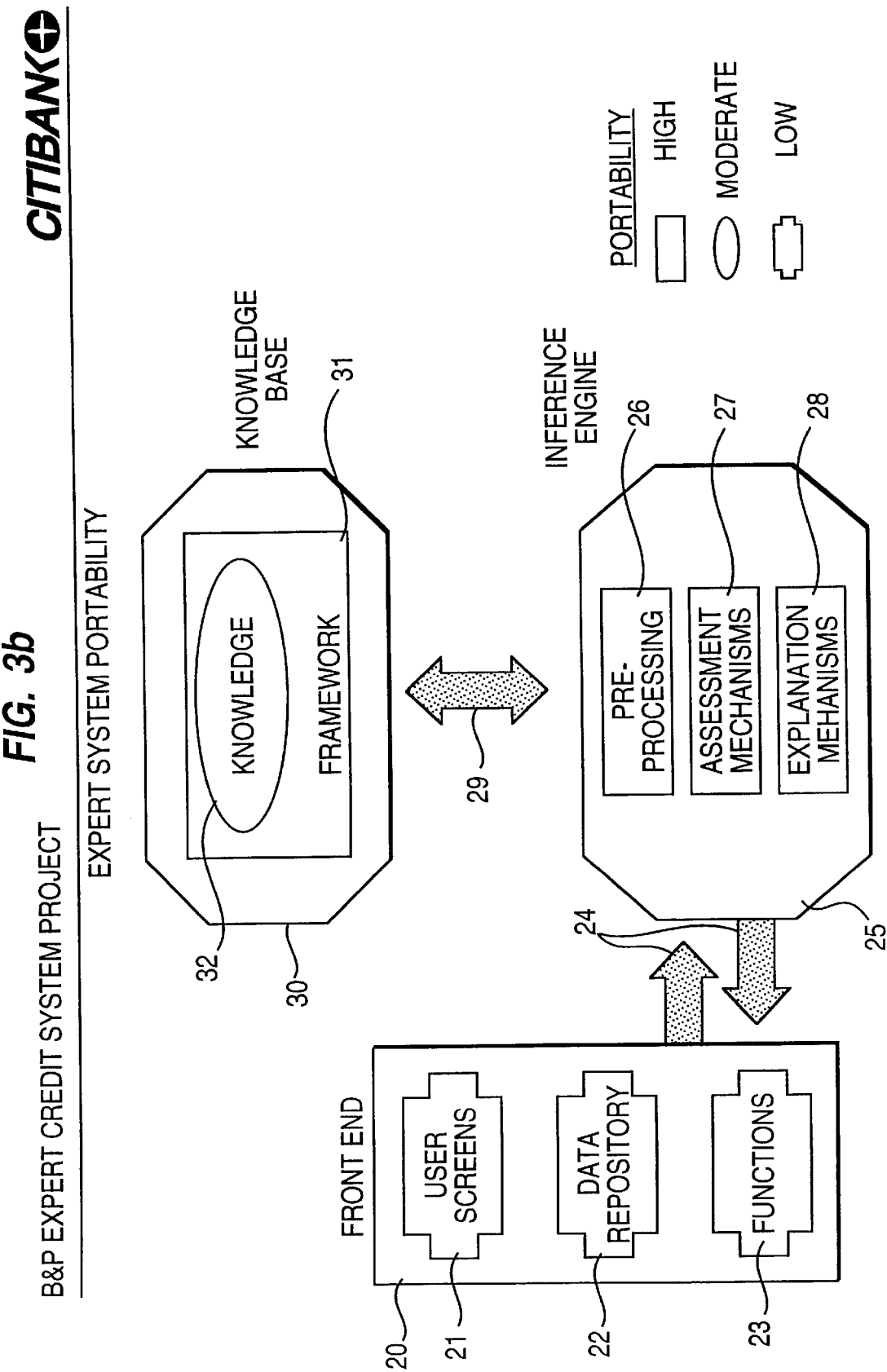

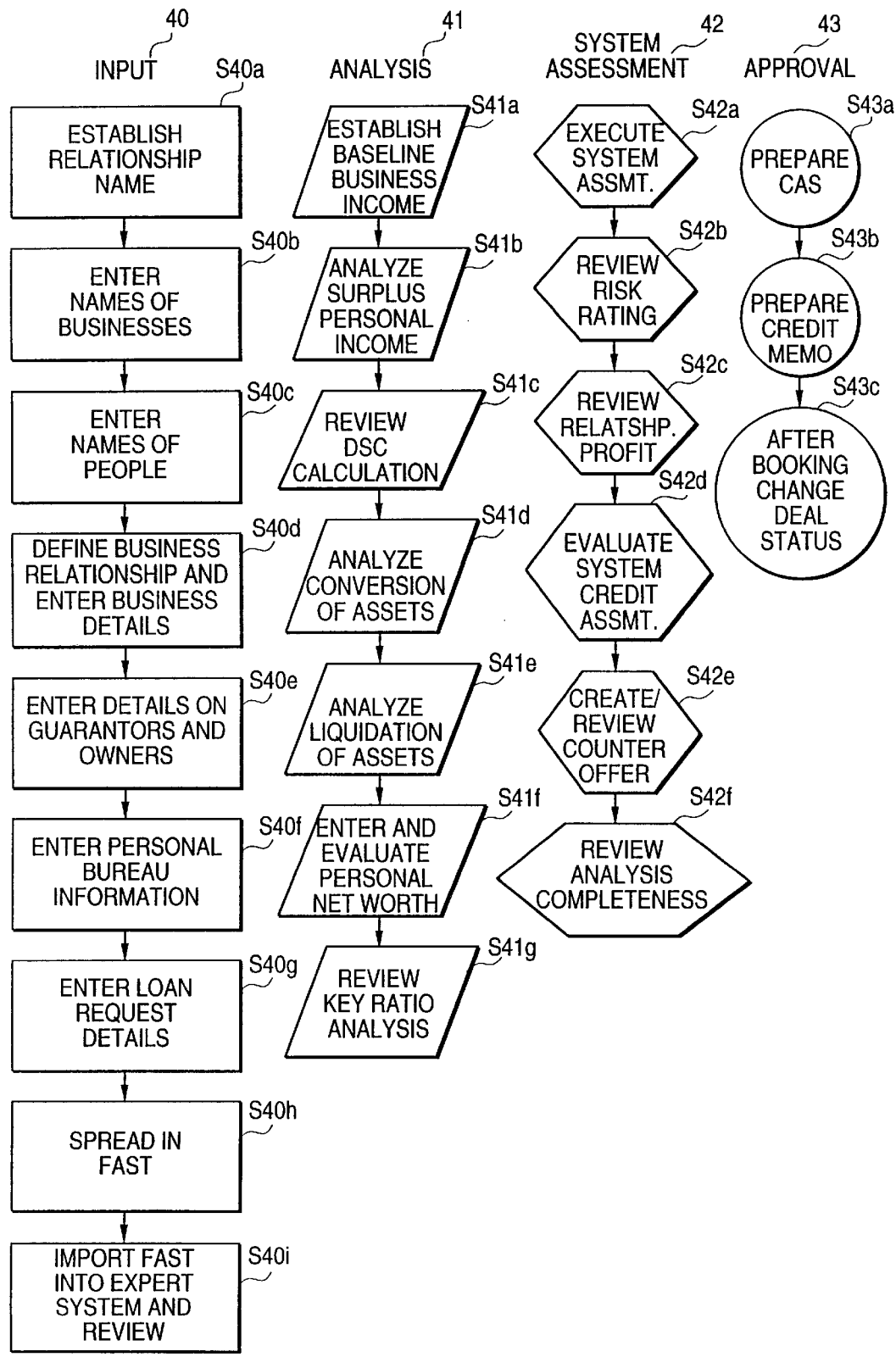

FIG. 13

Business Financials

| Income Statement | Restated Income Statement | Assets | Liabilities and Net Worth | Assessment Ratios |

| | Full Year Actuals | | | | | Interim | | Projected | |
|---|---|---|---|---|---|---|---|---|---|
| | 10/31/1993 | | 10/31/1994 | | 10/31/1995 | | 10/31/1995 | | Projected |
| | $ | % | $ | % | $ | % | $ | % | $ | % |
| Net Sales | 3,017 | 100.0 | 2,139 | 100.0 | 2,345 | 100.0 | 2,103 | 100.0 | 2,814 | 100.0 |
| Gross Profit | 803 | 26.6 | 693 | 32.4 | 989 | 42.2 | 866 | 41.2 | 1,175 | 41.8 |
| Officers Compensation | 200 | 6.6 | 300 | 14.0 | 325 | 13.9 | 225 | 10.7 | 497 | 17.7 |
| Wages and Salaries | | .0 | | .0 | | .0 | 45 | 2.1 | | .0 |
| Depr. and Amortization | 6 | .2 | 21 | 1.0 | 10 | .4 | 10 | .5 | 11 | .4 |
| Bad Debt Expense | 13 | .4 | 2 | .1 | -3 | -.1 | -3 | -.1 | -5 | -.2 |
| Other SGA Expense | 429 | 14.3 | 250 | 11.7 | 322 | 13.7 | 527 | 25.1 | 493 | 17.5 |
| Total Operating Expenses | 648 | 21.5 | 573 | 26.8 | 654 | 27.9 | 804 | 38.2 | 996 | 35.4 |
| Operating Profit | 155 | 5.1 | 120 | 5.6 | 335 | 14.3 | 62 | 2.9 | 179 | 6.4 |
| Other Items | | .0 | | .0 | 21 | .9 | 31 | 1.5 | 8 | .2 |
| Interest Expense | 113 | 3.7 | 66 | 3.1 | 31 | 1.3 | 31 | 1.5 | 70 | 2.5 |
| Taxes | 2 | .1 | -4 | -.2 | 2 | .1 | 1 | .0 | | .0 |
| Extraordinary Items | | .0 | | .0 | 95 | 4.1 | | .0 | | .0 |
| Net Profit | 40 | 1.3 | 58 | 2.7 | 418 | 17.8 | 61 | 2.9 | 118 | 4.2 |
| Div and Oth Adj to Ret Earn | | .0 | | .0 | -100 | -4.2 | | .0 | -28 | -1.0 |

[Import from FAST and Display] [Display Only] [Go To FAST] [Save] [Cancel]

FIG. 17

Loan Analysis For ABC Corporation Group

SUMMARY OF KEY COVERAGE RATIOS — 310

Primary Repayment Source — 311
- Debt Service — 311a: 6.82472
- Conversion of Business Assets — 311b: 1.11039

Additional Repayment Source — 312
- Liquidation of Total Assets To Non Mortgage Facilities — 312a

Distress Coverage (If Applicable) — 313
- Full Amortization Debt Service — 313a: 3.04521
- Non Mortgage Scheduled Debt Coverage — 313b

Mortgages Only — 314

| Product | Amount 314a | Appraised Value 314b | Loan To Value (%) 314c | 314d | Special Use 314e |
|---|---|---|---|---|---|
| Mortgage - First | 175 | 525 | 33.33334 | | No |

Others — 315
- Liquidation Of Business — 315a: 0.55452 / 0.55452
- Liquidation Of Personal Assets To Total Facilities — 315b: 0.4404
- Full Amortization Debt Service (If Applicable) — 315c: 3.04521 / 3.04521

Close — 316

Credit Approval Summary

X New    Increase    Review    Revision                    Close

*Relationship Name*
ABC Corporation Group

Primary Business Address
111 Main Street

Jamaica    NY    00501
County   Queens

Business & SIC
4214

Approving Unit                Branch
B & P Credit Center

| Revision | | Extension | Classification | Amount | Net Change | Cancellation |
|---|---|---|---|---|---|---|
| Date | 4/11/1997 | TOTAL FACILITIES | | 625 | | |
| Revision Date | 9/30/1997 | Line Of Credit | | 450 | | |
| Previous Report Date | | Letter Of Credit / BA | | | | |
| | | Owner Occupied Mortgage | | 175 | | |
| | | Term Loan / Revolver | | | | |
| Adverse Classification Current | | Smart Pay | | | | |
| | | BRC | | | | |
| | | MPBL / PPBL | | | | |
| | | BCP / VBCP | | | | |
| | | Other | | | | |

Fed Availability

Key Background Information

Business Since    1990              Borrower Since 5/1/1997    Depositor Since
FYE    10/31/1995                    Sales    4400                Employees    13
CPA    Dewey Cheatham, CPA                                        Quality           Audited Statement
Avg Ann DDA Bal   63                Avg Ann Inv Bal 0            Avg Ann Personal   18
                                                                 Liab Bal

Key Evaluation Data

| Decision | APPROVE | Credit Quality | GOOD | Rating | 3.0 | Covenant |

Page 1 of 3

Start  Exit Windows   Microsoft PowerPoint-[P...   Windows NT Task Manager   Loans   3:01 PM 421
422
420

FIG. 27

*Credit Memo*

430

431 — Relationship Name [ABC Corporation Group]
432 — Responsible Officer [Jones] [Jane]
433 — Date [4/10/1997]

Summary And Conclusion
434

434a — Debt Service Coverage [6.82472]  Liquidation Coverage [0.55452]
434c — Conversion Of Business Assets [1.11039]  Personal Asset Coverage [0.4404]  Full Amortization DSC [3.04521]
434d  434b  434e

*Expert System Assessment*
435

435a — Decision Recommendation [APPROVE]  Credit Quality Assessment [GOOD]  Rating [3.0]
435b  435c 435d — Any Factors That The System Did Not Evaluate 435e — Key Strengths / Weaknesses
+ Repayment sources is GOOD (4.7 of 5.0)
+ Dsc is 6.82 coverage ratio (.7 of 1.2)
+ Additional sources is EXCELLENT (.5 of 2.8)
+ Additional dsc is 3.05 ratio to debt payments (.1 of .9)

[View Report] 436    [Close] 437

Start | Exit Windows | Microsoft PowerPoint-[P... | Windows NT Task Manager | Loans    3:18 PM

FIG. 28

METHOD AND SYSTEM FOR COMMERCIAL CREDIT ANALYSIS

FIELD OF THE INVENTION

This invention generally relates to computerized commercial credit analysis and, more particularly, a method and system for assimilating data, applying reasoning, mechanisms, and emulating the thought processes of a credit officer.

BACKGROUND OF THE INVENTION

Commercial credit evaluation typically is a process that requires a great deal of expertise. The existing approach to the credit process may consist of a number of primarily manually-driven steps. These steps can include: (1) Acquisition, the process of receiving the loan application, and pipelining and tracking the application; (2) Pre-Underwriting, a process typically conducted by service officers, including searching databases and other computer assisted activities; (3) Underwriting, which is typically conducted by credit officers and other personnel with computer assistance, including spreading of business financials, assigning of debt rating, and evaluation of risk; (4) Approval, typically conducted by a credit officer, which involves reviewing the package, obtaining signatures, and making decision notification; (5) Documentation, including creation of appropriate legal documents; (6) Booking, including typically computer assisted ledger recording and disbursing of funds; (7) Maintenance, which is usually conducted by personnel with computer assistance, including monitoring the portfolio and performing reviews; (8) Collection, which includes classified credit reporting and remedial management; and (9) Management Information System (MIS), typically computer systems that create reports.

Present primarily personnel-heavy elements of the process for determining credit can be very inefficient. For example, the turnaround time for loan application packages can often be several weeks or more. In addition, inconsistencies may result from the subjective nature of the process, even when personnel are highly trained and use clear guidelines. Further, the decisionmaking process involves an extremely wide range of possible decisions, which can often require a great deal of experience.

As a result of these factors, conservative decisions may sometimes be made by the credit officer, resulting in loss of business. Conversely, poor decisions are sometimes made which result in loan loss.

A useful method for assisting with the decisionmaking process such as that necessary for loan analysis is artificial intelligence systems. Artificial intelligence systems first began to be developed in the early 1950s, beginning in the medical diagnostics field. In the 1980s, tremendous growth in application of artificial intelligence occurred, including application to the finance arena; this growth has resurged in the 1990s.

A particular type of artificial intelligence application is an expert system. Expert systems are used for problem solving areas such as diagnosis, analysis, and classification and are good at dealing with ill-defined problems. A number of different approaches using expert systems have been taken in dealing with either the credit recommendation or the decision type of problem as applied to loan analysis. These approaches include decision trees and evidence trees. Typically existing methods for using decision trees is to apply a series of gates with probabilities and degrees of certainty to the gates. Based on the results of these gate analyses, a recommendation can be developed.

Another approach deals with loan analysis on a case-specific reasoning basis; this approach is often referred to as frame-based, a technical term for making actual comparisons to established norms.

Yet another approach is to use simple types of procedural rule-based analysis, such as a series of rules. In this approach, each yes or no answer to a particular rule results in another rule, depending on the answer. By stringing together such rules and answers, a simplified credit evaluation can be developed.

An example of existing art for an expert system for credit evaluation is O. Castillo and P. Melin, *An Expert System for Credit Evaluation*, (IN Proceedings; The Second Annual International Conference on Artificial Applications on Wall Street: Tactical and Strategic Computing Technologies, Proceedings of AI Applications on Wall Street, April 1993, Software Engineering Press). This system is a very simple procedural rule-based approach that utilizes a series of questions for which the user answers yes or no. Drawbacks of the system include that it is inflexible and not easily transferrable to other applications. It contains no graphical interfaces that ease user understanding of the loan application process. No explanations are included.

Another example of existing art is R. Beshinske, et al., *Margin Credit Evaluation System* (IN Proceedings; The First International Conference on Artificial Intelligence on Wall Street (Cat. No. 91TH0399-6) October 1991). This system evaluates a portfolio of securities for an individual company based on a one-time up front review. The system utilizes a weighting of factors based on a statistical regression technique. The system was not designed for loan analysis. It does not provide the user with guidance or extensive graphical analysis assistance with decisionmaking.

An example of existing patented art is Saladin, et al., *Expert Credit Recommendation Method and System*, U.S. Pat. No. 5,262,941. This system utilizes a series tables and a decision matrix to determine an overall credit recommendation. The system requires input of information by a user in a particular predetermined series of queries. Information cannot be provided out of sequence. The system uses a scoring system to proceed through the series of tables and decision matrix in reaching a decision. No weighting method is used for scoring the loan application.

In general, many of these approaches are very simple, using only very basic types of processes. In addition, the approaches to loan analysis that have been developed in the existing art are only applicable to very limited sets of circumstances, such as determining margin loans, rather than commercial credit situations. They also do not provide extensive assistance to the user in understanding the factors that make up the decisionmaking process or explain their purpose. In general, they are not designed with a graphical or otherwise user-friendly format.

SUMMARY OF THE INVENTION

It is an object of the present invention to provide an expert system to assist with the analysis and evaluation of loan applications. It is a further object of the present invention to provide a system that provides for input of data supporting automatic evaluation of a loan application.

It is further object of the present invention to check automatically the inputted data for completeness.

It is a further object of the present invention to transmit automatically the inputted data to an expert analysis system for operation of a loan evaluation and decision assessment model.

It is a further object of the present invention to use automatically an evidence tree analysis method with weights for different nodes and factors in the evidence tree.

It is a further object of the present invention to flag automatically within the evidence tree risk acceptance criteria (RAC), underwriting guideline failure, and overriding rules.

It is a further object of the present invention to provide automatically a summary narrative of exceptionally positive and negative weights.

It is a further object of the present invention to identify automatically qualitative aspects of weights involved in the assessment model.

It is a further object of the present invention to make automatically a loan decision recommendation.

It is a further object of the present invention to provide automatically a summary analysis of assessment model results.

It is a further objective of the present invention to provide automatically alternative analyses for the loan decision.

It is a further object of the present invention to seek automatically relevant data in publicly available databases.

It is a further object of the present invention to develop and print automatically appropriate forms.

The invention comprises a system that stores critical credit data, analyzes and makes recommendations for credit requests, and communicates key data to external devices within a single system. Two distinct components are included within the invention: 1) a conventional relational data base management system that manages and collects data via electronic access; 2) user data entry and reporting subsystem; and 3) a decision support expert subsystem that applies a knowledge base and inference engine (together known as the assessment model) to analyze credit requests.

An important aspect of the invention is the graphical interface that works in conjunction with the expert system to provide the user with specific information about the weights and other factors involved in the decisionmaking process. The system allows the user to input information as the user wants, without following a specific procedure or order. The graphical interface includes the specific weights assigned by the system, rules applied, access to explanations, and flags and tags that indicate key aspects of the information presented. In addition, the system provides a summary and collection of important data and presents a narrative summary to accompany the credit recommendation it makes. This information allows the user, typically a credit officer, to understand in much greater detail the specific factors involved in a credit decision, the relative weights of these factors, and how the loan application information impacts these factors. As a result, the user can identify specific strengths and weaknesses and use this information in making the final loan decision.

The data base management system serves as a central server repository for data storage and retrieval. In addition, this component serves as a vehicle for exportation of data, such as MIS data. The assessment model assimilates and organizes client information and produces recommendations and supporting documentation. Results of the credit analysis are available for further inspection and manipulation by the user.

To achieve the stated and other objects of the present invention, as embodied and described below, the invention includes entering and importing via links with databases data relating to a loan application into a data management system, automatically checking the entered data for completeness, automatically generating relevant documents for the loan applicant relating to the application, and automatically transmitting the data to an expert analysis system. In addition, the invention includes the step of the expert analysis system automatically assessing and recommending a loan decision using an assessment model and the data. If the loan application is approved, the invention automatically generates reports relating to the loan and transmits applicant information from the expert analysis system to the data management system.

To achieve the stated and other objects of the present invention, as embodied and described below, the invention further includes automatically preprocessing data to align assessment model elements based on the profile of the loan application, automatically analyzing inputted data in preparation for input to evidence tree elements, automatically executing a debt rating model, which is a validated risk rating score, automatically evaluating the evidence tree elements based on the weights assigned and the inputted data, automatically determining a risk rating, automatically determining an overall risk rating to the obligor, automatically calculating the relationship profitability after all direct and indirect expenses, automatically producing an explanation of strengths and weaknesses of the loan application based on inputs to and results of assessment model analysis, and automatically making a loan recommendation.

Additional objects, advantages and novel features of the invention will be set forth in part in the description which follows, and in part will become more apparent to those skilled in the art upon examination of the following or may be learned by practice of the invention.

BRIEF DESCRIPTION OF THE DRAWINGS

In the drawings:

FIG. 3a is a simple schematic overview of the system of the present invention;

FIG. 3b is a schematic diagram of aspects of expert system portability.

FIG. 4 is a flow diagram of the process of user data input and operation of the system for an embodiment using specific steps for a large lending institution.

FIG. 13 is the pop-up window for business financials.

FIG. 17 is the window for key coverage ratios.

FIG. 23 is the first part of the window for CAS.

FIG. 26 is the window for view report for CAS.

FIG. 27 is the first part of the window for credit memo.

FIG. 28 is the second part of the window for credit memo.

DETAILED DESCRIPTION

Figure 1A:
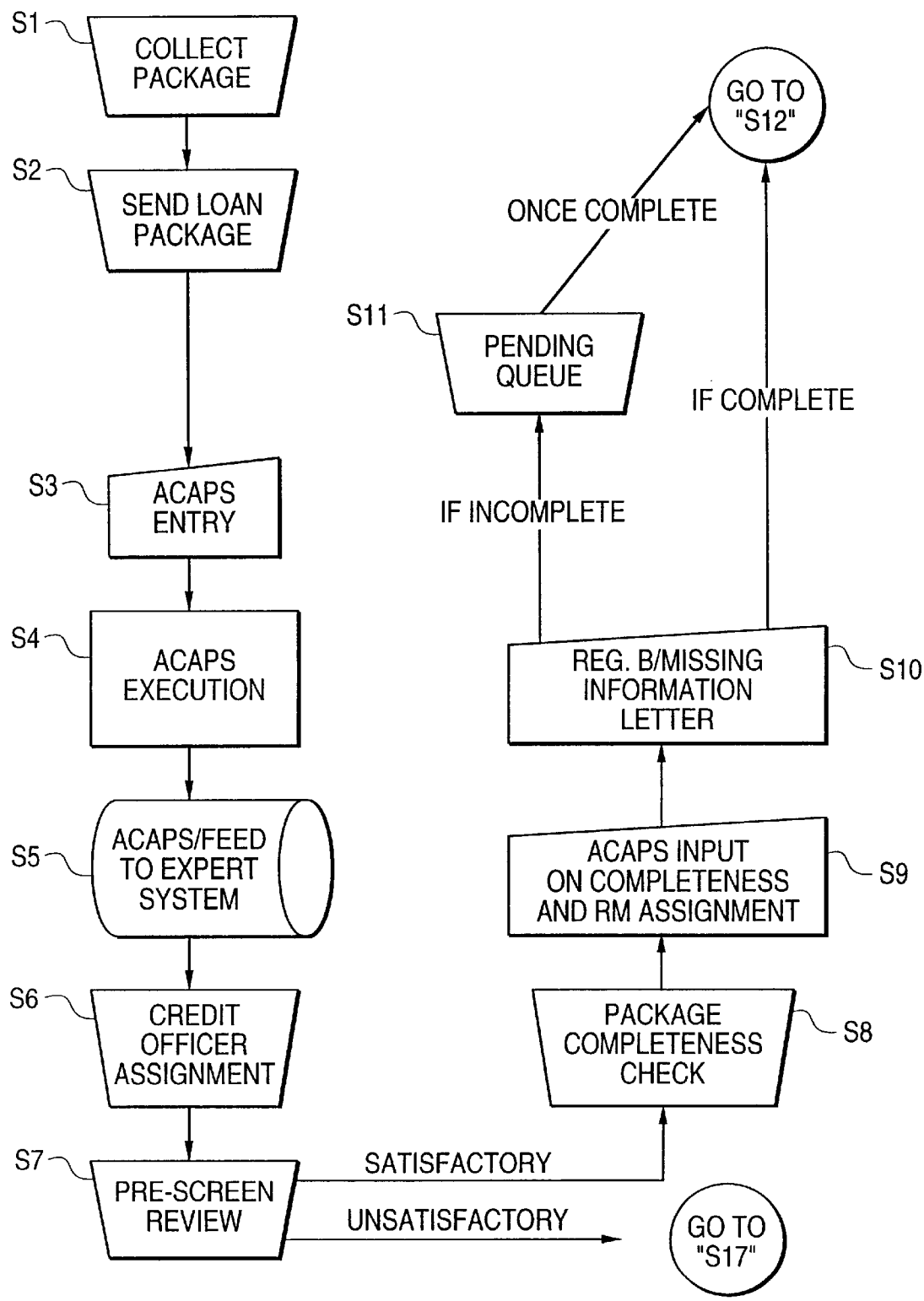
FIGS. 1a–1c contain block diagrams of the Application Processing steps, the Underwriting steps, and the Documentation & Booking steps of the overall system process.

The present invention solves the problems of the existing art by utilizing powerful analysis tools within a generalized and malleable framework to automatically perform loan analysis functions, thus eliminating subjective, manual and unconnected automated functions presently used. The tools of the present invention include graphical interfaces that provide clear ongoing explanation of the system's processes. These graphical interfaces allow the user to identify the specific strengths and weaknesses relating to a particular loan application. The present invention also provides a powerful model for developers and management within loan processing organizations because the graphical interface provides a clear understanding of the logic process used in making loan determinations.

An important aspect of the invention is the interface that works in conjunction with the expert system to provide the user with specific information about the weights, rules, and other factors involved in the decisionmaking process. The system allows the user to input information as the user wants, without following a specific procedure or order. The graphical interface includes the specific weights assigned by the system, access to explanations, and flags and tags that indicate key aspects of the information presented. In addition, the system provides a summary and collection of important data and presents a narrative summary to accompany the credit recommendation it makes. This information allows the user, typically a credit officer, to understand in much greater detail the specific factors involved in a credit decision, the relative weights of these factors, and how the loan application information impacts these factors. As a result, the user can identify specific strengths and weaknesses and use this information in making the final loan decision.

An embodiment of the invention comprises a client/server computer program that stores critical credit data, analyzes and makes recommendations for credit requests, and communicates key MIS data to external devices within a single system. Two distinct components are included within the system: 1) a conventional data base management system that manages and collects data via electronic access and end-user data entry; and 2) a decision support expert system that applies a knowledge base and inference engine (together known as the assessment model) to analyze credit requests and the results of these analyses.

The data base management system element of the invention serves as a central server repository for data storage and retrieval, both as inputted by the user and by linkages, such as by networks, to external databases, housed in systems such as mainframes, Wide Area Networks (WANs), Local Area Networks (LANs), and servers. In addition, this component serves as a vehicle for exportation of data. The expert system component assimilates and organizes client information and produces recommendations and supporting documentation. In addition, the expert system provides the capability for contacting other databases, including publicly available databases, retrieving information from those databases, such as UCC, litigation, and lien information, and incorporating that data into the analysis. Results of the credit analysis are available for further inspection and manipulation by a user.

In an embodiment of the invention, the assessment model is an automated process that utilizes an evidence tree that includes a generalized weighing approach to represent how credit officers evaluate objective and subjective elements of a credit decision. The weighing includes elements that add strength to a decision, by adding positive points, and elements that detract from a decision, by subtracting points. The system groups risk elements into logical groups through the use of intermediary risk concepts or nodes. Some of the elements raise red flags that are noted during the underwriting process and may require comment form a credit officer. Some of the risk elements are overriding rules that "override" the weighing process, thereby driving the decision. Risk elements are identified as either objective or subjective.

In an embodiment of the invention, commercially available software may be used to develop some aspects of the system, including a user interface consisting of a series of screens in a Windows™-based format. It is understood that the software and operating system used in this embodiment are representative only; many similar available system may be used to build and display the various components of the system. Commercially available software used in an embodiment includes the following: 1) Delphi 2.0 from Borland Corporation of Scotts Valley, Calif., for the front end data entry, functions associated with the front end, and reporting; 2) Sybase SQL Server from Sybase, Inc., of Emeryville, Calif., which is utilized as the Data Base Management System (DBMS) for storage and manipulation; 3) ART*Enterprise 2.0 from Brightware, Inc., of Navato, Calif., which is utilized to build the assessment model, perform the loan analysis, and display the loan characteristics through a graphical interface; 4) Orpheus, for additional data base components, and SysTools and additional system utilities by TurboPower of Colorado Springs, Colo.; InfoPower for enhanced data base manager components by Woll2Woll of San Jose, Calif.; ABC Advanced Business Components by Object Software Technology PTY, Ltd., of Queen Victory Terrace ACT 2600 Australia, for various system components; and QuickReports by QuSoft AS of Oslo, Norway, for reporting.

The evidence tree modeling of logic utilized in reaching a credit decision has a number of benefits, including the following. It mimics the common sense approach that people utilize to make many decisions, e.g., pros (positive elements) and cons (negative elements). It allows for modeling of decision logic without a lot of rules. The system has the ability to represent all the decision logic in one part of the expert system program. It allows credit experts to compare the relative importance of elements (e.g., element "x" is twice as important as element "y") and to see how positive elements might be offset by negative ones. The use of intermediary risk concepts or nodes helps to express clearly the risk elements utilized because this approach 1) is beneficial in understanding and evaluating the risk elements and their importance during the model development process, 2) makes future modifications to the risk assessment easy to execute, and 3) results in a simple method for the system to generate decision explanations for particular loan applications or other decisions(strengths and weaknesses). The system includes the capability to identify how much subjective information either adds to or detracts from an application.

Another key aspect of the expert system of the present invention is a conventional data base input and tracing system that has functionality to perform financial calculations and manipulations and other functions, such as the creation of reports and the generation of textual analyses with the evidence tree results. In addition, such features as tallying of flags and other signals relating to specifics of data input for a particular scenario are included in this element of the system.

A particular feature is listing of strengths followed by weaknesses where the loan application is approved, and weaknesses followed by strengths where declined. This approach highlights to the user the most important factors in the particular application first.

References will now be made in detail to an embodiment of the invention, an example of which is illustrated in the accompanying drawings.

Figure 1B:
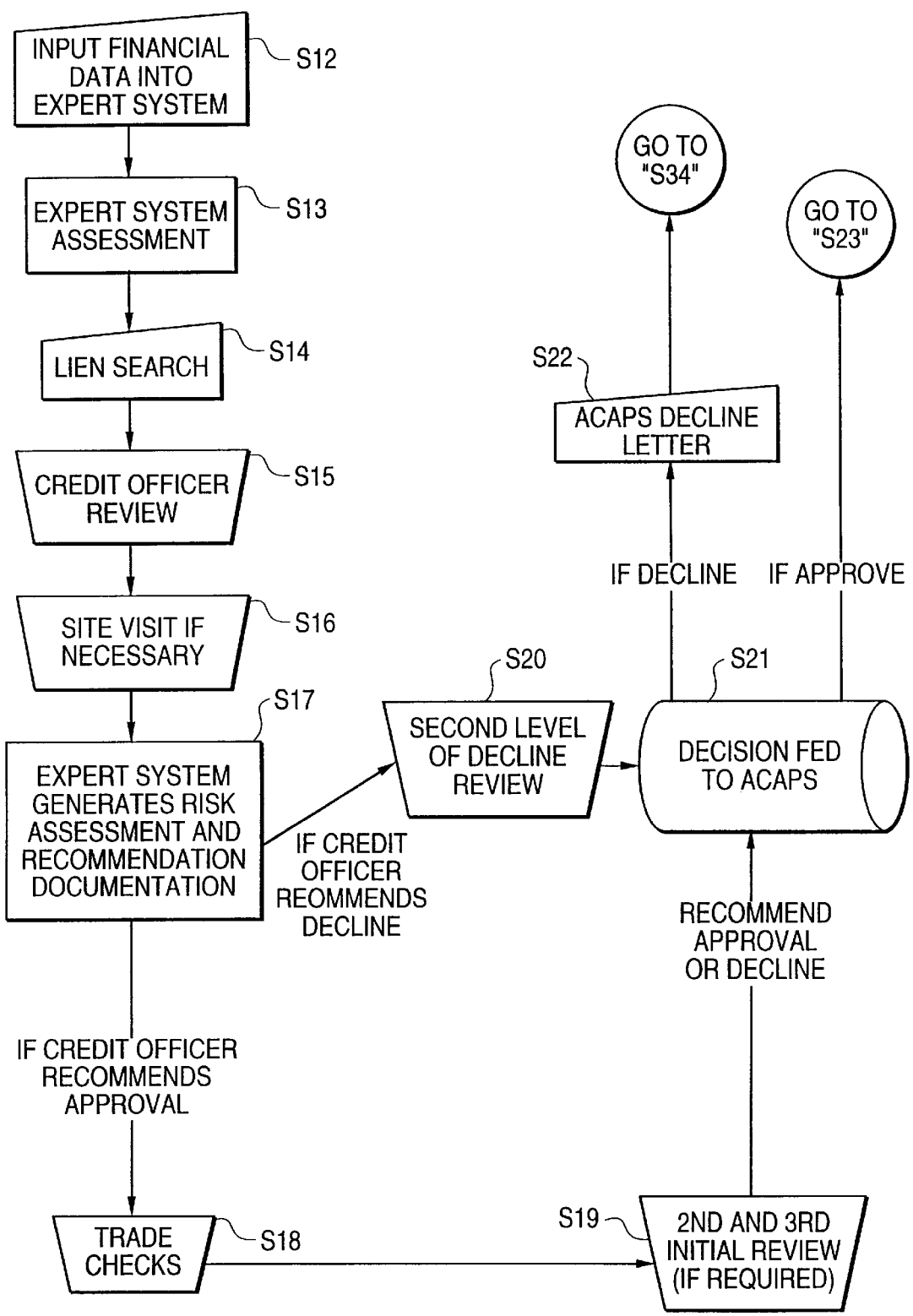
Figure 1C:
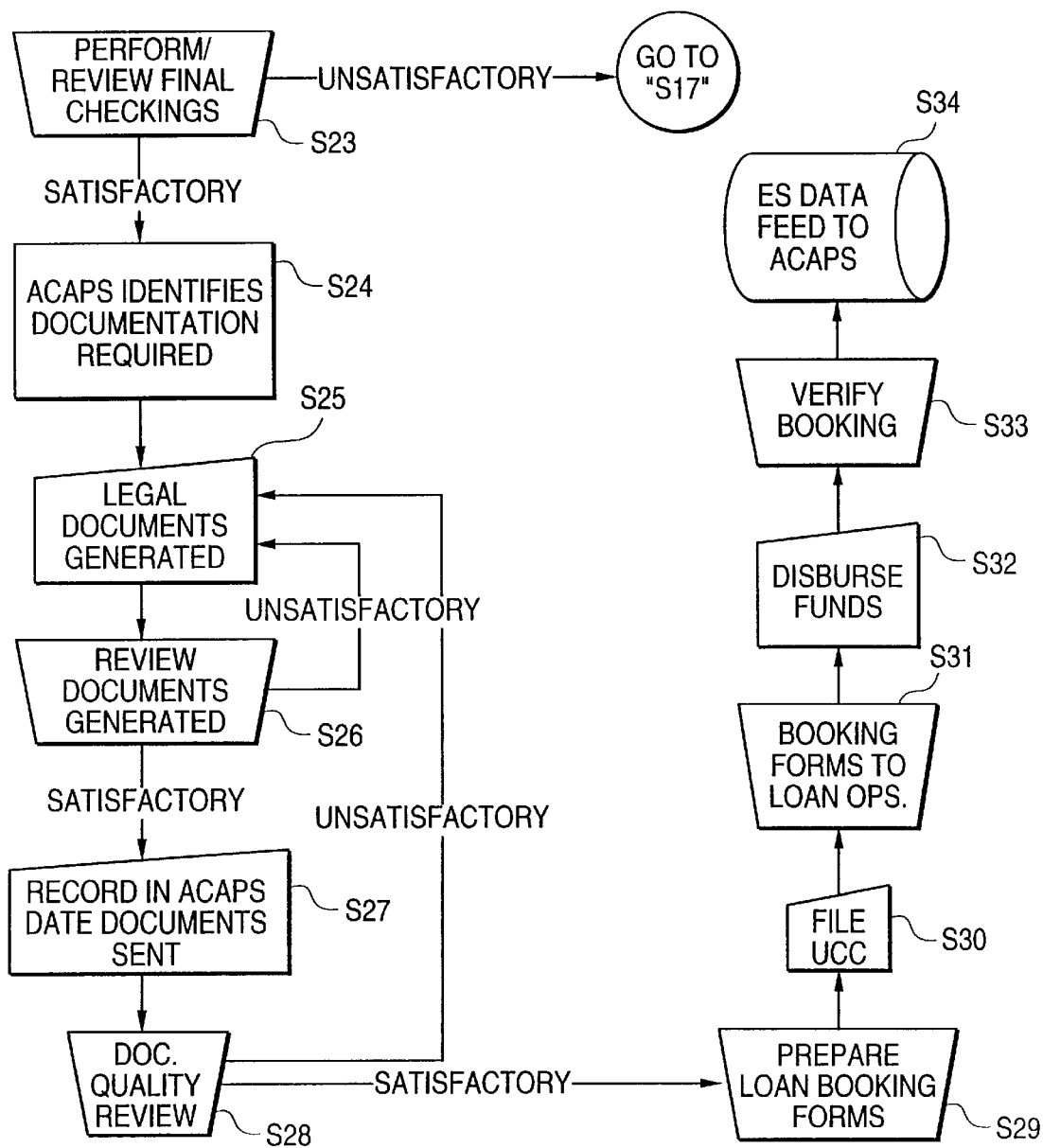

FIGS. 1a–1c contain a block diagram of an overview of the steps involved in a typical loan analysis process, using information specific to the process at a bank such as Citibank. The description of this process is intended to illustrate a possible range of steps in a loan application. It is not intended to reflect all aspects of the present invention, nor is it intended to limit the invention to the steps presented. These steps merely reflect some of the details that may be present as part of the decisionmaking process. The invention has the capability to automate many of these steps. Focus on the details of this process thus highlights the value of the automatic features of the invention, as described further below, and the usefulness for the non-automated steps for the user to access a system and the explanation supporting the process comprising that system.

FIG. 1a shows the application processing portion of the process. In step S1 (Collect Package), a business banker collects a package of information from the applicant for credit. In step S2 (Send Loan Package), the business banker sends the loan package to a credit center. In step S3 (entry in the ACAPS system), a service officer in the credit center enters key loan request, guarantor, and demographic data into the Automated Credit Application Processing System (ACAPS) screens (ACAPS is a mainframe credit processing system internal to Citibank in this example). At a future point, the business banker in the branch can perform the data entry for the applicant. In step S4 (ACAPS Execution), the ACAPS system automatically performs the following tasks: de-dupe, fraud check, personal bureaus, disaster screen, score, and D&B.

In step S5 (ACAPS/Feed to Expert System), the expert system imports data from ACAPS. In step S6 (Credit Officer Assignment), a credit officer is assigned to handle the deal and is given the credit file if the matter involves an existing customer. In step S7 (Pre-Screen Review), the credit officer preliminarily reviews the ACAPS results, and determines if the results are satisfactory or unsatisfactory.

If the credit officer determines that the results of the Pre-Screen Review are unsatisfactory, the process proceeds to step S17 (Expert System Generates Risk Assessment & Recommendation Documentation). If the credit officer determines that the results are satisfactory, the process proceeds to step S8 (Package Completeness Check). In step S8, the package is reviewed for completeness.

In step S9 (ACAPS input on completeness and RM assignment), the package completeness and RM assignment directly into the ACAPS system. In step S10 (Reg. B/Missing Information Letter), an ACAPS generated letter is issued that contains Reg. B rights and missing information, if the package is incomplete. If the package is complete, the process proceeds to step S12 (Input Financial Data Into Expert System), which constitutes the first step in the next stage of the system, Underwriting, shown in FIG. 1b. If the package is incomplete, the process proceeds to step S11 (Pending Queue), where the deal is held in a pending queue until the package is complete. Once the package is complete, the process proceeds to step S12.

FIG. 1b shows the Underwriting portion of the process. In step S12, an underwriter inputs business financial and personal data into the expert system and answers questions required for the Assessment Model. In step S13 (Expert System Assessment), the expert system analyzes financial trends, assigns debt rating, identifies sources of repayment, highlights strengths and weaknesses, and makes recommendations.

In step S14 (Lien Search), UCC, litigation, and lien search is ordered on-line if the Expert System results are satisfactory; results are input into the Expert System. In step S15 (Credit Officer Review), the credit officer reviews the expert system assessment, comments on red flags and weaknesses identified, and makes a recommendation. In step S16 (Site Visit if Necessary), the credit officer performs a site visit if necessary for approval.

In step S17, the Expert System generates an output package on its assessment (see further description of Expert System below). The credit officer then recommends either approval or decline. If the credit officer recommends decline, the system proceeds to step S20 (Second Level of Decline Review). If the credit officer recommends approval, the system proceeds to step S18 (Trade Checks). In step S18, trade checks are requested. In step S19 (2nd and 3rd Initial Review (if required), a 2nd and 3rd credit officer review the loan approval package. These credit officers either recommend approval or decline. The process then proceeds to step S21 (Decision Fed to ACAPS).

In step S20, a second credit officer reviews the decline decision and notes concurrence. In step S21, the credit decision is fed into ACAPS by the Expert System. If the package comprises a counter product, amounts are included. If the decision was an approval, the procedure proceeds to step S23 (Perform/Review Final Checkings), shown on FIG. 1c as part of the section on Documentation & Booking; if the decision was a decline, the procedure proceeds to step S22 (ACAPS Decline Letter), shown in FIG. 1b. In step S22, ACAPS generates a decline letter. Following step S22, the procedure proceeds to step S34 (ES Data Feed to ACAPS).

In step S23, shown in the section of the procedure on Documentation & Booking in FIG. 1c, a trade check is reviewed, and a bank check is performed. If the checks are unsatisfactory, the process returns to step S17. If the checks are satisfactory, the process proceeds to step S24 (ACAPS Identifies Documentation Required). In this step, based on deal approval information input from the Expert System, ACAPS identifies typical documentation required.

In step S25 (Legal Documents Generated), the service officer generates legal documents from ACAPS. In step S26 (Review Documents Generated), a credit officer reviews the documents and forwards them to the customer. If the documents are unsatisfactory, the process returns to step S25.

If the documents are satisfactory, the process proceeds to step S27 (Record in ACAPS Date Documents Sent). In step S27, the date the documents are sent is recorded directly into ACAPS screens. In step S28 (Doc. Quality Review), upon receiving the documents from the customer, they are reviewed to ensure that they are properly executed. If unsatisfactory, the process returns to step S25.

If satisfactory, the process proceeds to step S29 (Prepare Loan Booking Forms). In this step, loan booking forms are prepared by the service officer. In step S30 (File UCC), a UCC filing is ordered on-line through Intercounty Clearance. In step S31 (Booking Forms to Loan Ops.), booking forms are transmitted to appropriate processing offices.

In step S32 (Disburse Funds), funds are disbursed by the loan group. In step S33 (Verify Booking), booking is verified by a Credit Center. In step S34 (ES Data Feed to ACAPS), key demographic, business, and personal financial and subjective risk elements are sent from the Expert System to ACAPS.

The present invention automates and links together nearly all aspects of this process, using an expert system to simulate decisionmaking aspects of the process to create a loan decision recommendation. For those aspects of the process that are not or cannot be automated, the present invention serves as a graphical analysis and support tool that greatly eases the user's decisionmaking and other non-automated functions.

Figure 2:
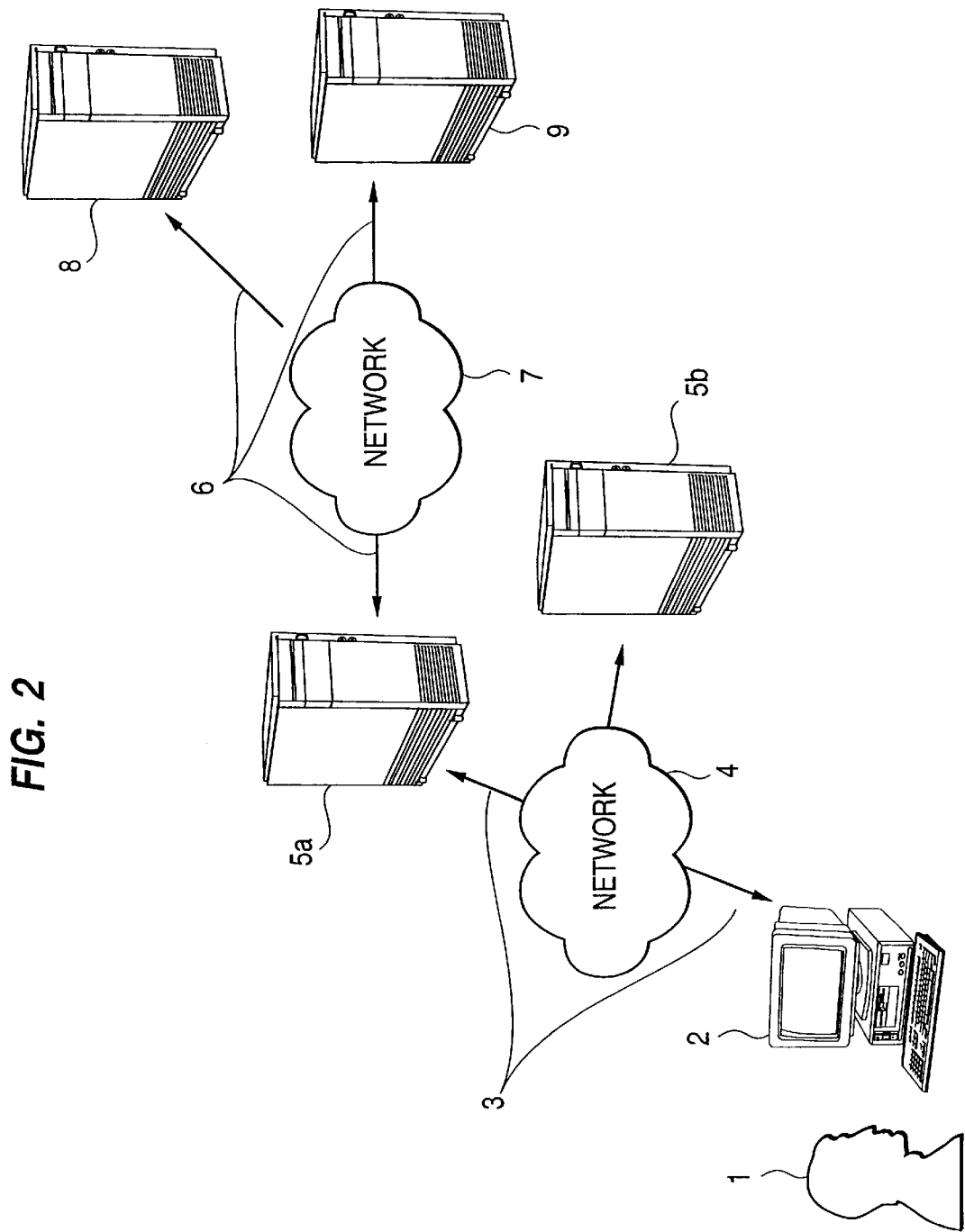
FIG. 2 is a simple overview of the various components of an embodiment of the present invention.

FIG. 2 provides a simple overview of the various components of an embodiment of the present invention. A user 1 inputs loan information at a terminal 2. The terminal 2 is connected 3 via a network 4 to hosts 5a and 5b, such as computers, mainframes, local area networks (LANs), servers, or any combination of these systems. The system of the present invention receives inputted data and performs functions to support the loan analysis. The host computers 5a and 5b are connected 6 via a network 7 to various other databases and systems housed on other hosts 8 and 9, such as computers, servers, or LANs. The system of the present invention accesses these other systems 8 and 9 to obtain relevant information and to perform additional analyses. In an embodiment of the present invention, the expert system is housed on one server 5b and other elements of the system operate via another server 5a, which is connected to a mainframe 8 that collects data and performs other analyses.

FIG. 3a provides a simple schematic overview of the system of the present invention. The expert system 10 comprises an assessment model using various risk elements and weights. Manual input 11 is provided to the expert system along with other data from a database systems, such as a mainframe link 12. The results 13 of the assessment model are analyses regarding such elements as strengths, weaknesses, loan application RACs, and decisional advice. A credit officer 14 at a terminal 15, such as a personal computer, then reviews and evaluates this information in order to make a credit decision. The expert system 10 comprises a front end element 16 and an assessment model 17 that contains risk elements 18 and weights 19.

FIG. 3b is a schematic diagram of aspects of expert system element portability. Portability refers to the usefulness of each element of the system for other applications besides loan application processing in this domain. The front end of the system 20 includes user screens 21, a data repository 22, and other functions 23, which are of low portability. The front end 20 interfaces 24 with the inference engine 25. The inference engine 25 includes pre-processing 26, assessment mechanisms 27, and explanation mechanisms 28, all of which are of relatively high portability. The inference engine 25 interfaces 29 with the knowledge base 30. The knowledge base 30 contains a highly portable framework 31, which includes a knowledge element 32 that is moderately portable.

FIG. 4 contains a flow diagram of the process of user data input and operation of the system for an embodiment using specific steps for a large lending institution. The input and operation process may be divided into four categories: Input 40, Analysis 41, System Assessment 42, and Approval 43. The input process includes the steps of Establish relationship name S40a; Enter names of businesses S40b; Enter names of people S40c; Define business relationship and enter business details S40d; Enter details on guarantors and owners S40e; Enter personal bureau information S40f; Enter loan request details S40g; Spread information in a database system S40h, such as FAST, software licensed from Financial Proforma, Inc.; and Import the spread information into the expert system and review S40i. The Analysis 41 process includes the steps of Establish baseline business income S41a; Analyze surplus personal income S41b; Review DSC calculation S41c; Analyze conversion of assets S41d; Analyze liquidation of assets S41e; Enter and evaluate personal net worth S41f; and Review key ratio analysis S41g.

The System Analysis 42 process includes Execute system assessment S42a; Review risk rating S42b; Review relationship profit S42c; Evaluate system credit assessment S42d; Create/review counter offer S42e; and Review analysis completeness S42f. The Approval 43 process includes Prepare CAS S43a; Prepare credit memo S43b; and After booking change deal status S43c.

The database portion of the invention includes a computerized system for input of information to support analysis of credit. As noted in the system overview, the database element of the invention provides input for the expert system and performs other functions. Data collection and input by the user can include the following broad areas: key company data; loan products requested; management and ownership/ guarantors; summary information on personal bureaus, trade checks, bank checks, and supplier references; business financial statements; personal tax returns and personal financial statements; RAC and other requirements; risk elements, weights, and definitions per Assessment Model Functional Specifications.

The system also performs a series of other automatic functions regarding the data. In an embodiment, these functions are performed using computer programs on systems, such as mainframes, LANs, or servers, and access via networks or other connections to other systems, such as mainframes, LANs, or servers. These functions include checking the data for completeness and generating relevant documents.

In an embodiment, the loan assessment and recommendation element of the system identifies key strengths and weaknesses (risks) based on the expert system's knowledge base and data inputted. It also enables the user to identify additional strengths and risks, and note mitigating factors if necessary. In addition, this aspect of the system indicates credit worthiness of the request (range from excellent to very poor). The results of the analysis are correlated to one of the following five outcomes for an overall loan application recommendation: Approve; Decline; Neutral; Defer; and Refer. Refer typically occurs when an overriding rule is triggered, which requires referral to an additional credit officer or another part of a bank for further review. If the system determines that key pieces of information are missing, the recommendation will likely be Defer. Approve, Decline, and Neutral refer to acceptance of the loan, decline of the loan, and an indeterminate system result, respectively. The user may also override specific factors or the system overall recommendation, for which user actions the system indicates override has occurred. If the system recommends Decline, it has the capability to generate automatically a decline letter for the applicant.

If the loan requested is not recommended as approved, the invention allows the user to determine specific amount and product mix that would result in approval. Further, the invention allows the user to conduct the following activities at all times: 1) determine basis of decision at time of that decision; 2) enter new data without overwriting the old for certain kinds of information; and 3) consider increase in existing product without deleting old request or adjusting new request.

Selected fields in each input screen are color coded (red) to identify that the information is mandatory for the execution of the debt rating model.

Assessment execution occurs based on a command from the operator either through the main menu or the speed button. All data required from the data bases is retrieved automatically to perform the assessment, and the DRM and profitability assessment are executed. The assessment generally includes implementation of the evidence tree, described further below. Other steps by the expert system may also be performed, such as automatically analyzing financial records, assigning a debt rating, and identifying sources of repayment. In an embodiment, these functions are performed using computer programs on systems, such as mainframes, LANs, or servers, and access via networks or other connections to other systems, such as mainframes, LANs, or servers.

A counter-offer worksheet is provided so that the officer can vary the credit products and amounts requested to determine the optimal mix. The screen displays the original requests next to a series of 5 columns of alternate mixes. As the officer varies each scenario, a shortcut button to the assessment model is available for an instant update to a new assessment. The results of all prior scenarios are visible on the screen for comparison purposes, even after a new assessment has been completed.

The system also automatically generates appropriate documents, such as applicant approval documents and legal documents, and forms relating to the loan. The database element of the system transmits this information, as appropriate, to the expert system component. The system also has the capability to search publicly available databases, such as databases containing Uniform Commercial Code (UCC), litigation, and lien information, and to analyze retrieved information using the expert system.

The Credit Approval Summary (CAS) includes features that produce these results based on information already entered in through database functions or the Expert System, or calculated by the Expert System (e.g. facilities, company information, product information, debt rating, RAC exceptions). The CAS enables the user to enter supplementary information on, for example, the purpose of the CAS or any individual product if deemed necessary, and to make changes to other fields; the invention also allows combination of facilities for all related borrowers on same CAS and saves each CAS for historical reference and analysis.

After the assessment, the credit officer is provided with comment boxes to view or input the following comments: weaknesses and mitigation, red flag comments, and reason for variance from system recommendation (if applicable). The results of the section being commented on at all times remain on the screen, so that the user can review the results while formulating comments. A comment field is also included that allows the user to comment on issues uncovered with the assessment results.

FIGS. 5–33 contain sample screens for the user interface for the system. These sample screens are tailored to a specific loan institution, Citibank, but are not intended to limit or restrict the method and system of the present invention. The sample screens are intended to provide representative examples of system input and operation information relevant to a loan application; they are not intended to comprehensively describe all possible inputs and functions of the invention.

Figure 5:
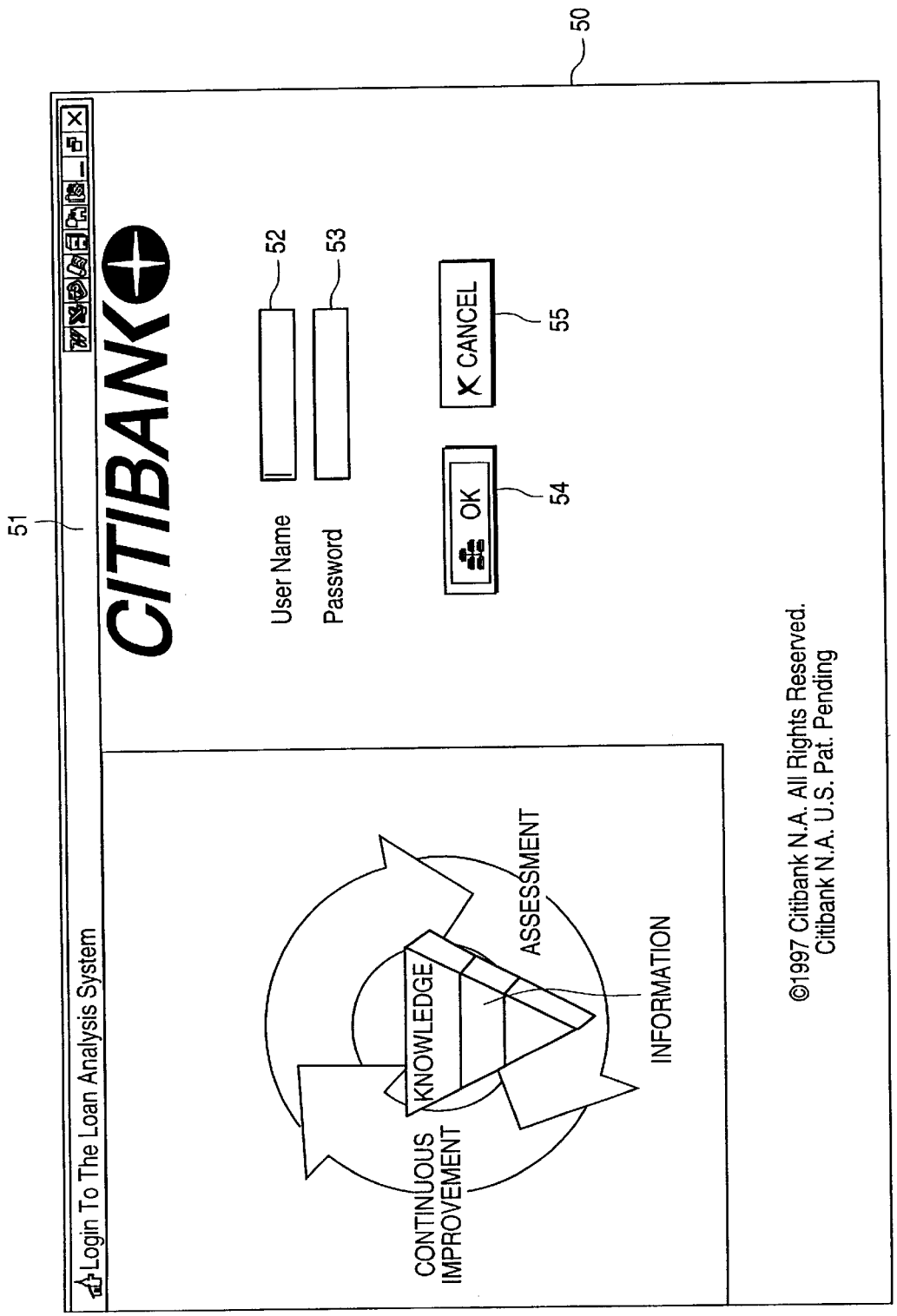
FIG. 5 is a sample login screen for the system.

FIG. 5 presents the login screen for the front-end portion of the system, for an example lending institution such as Citibank. A window 50 contains a menu bar 51. A user inputs a user name 52 and a password 53. The user then selects a button for OK 54 to continue or Cancel 55 to reenter information.

Figure 6:
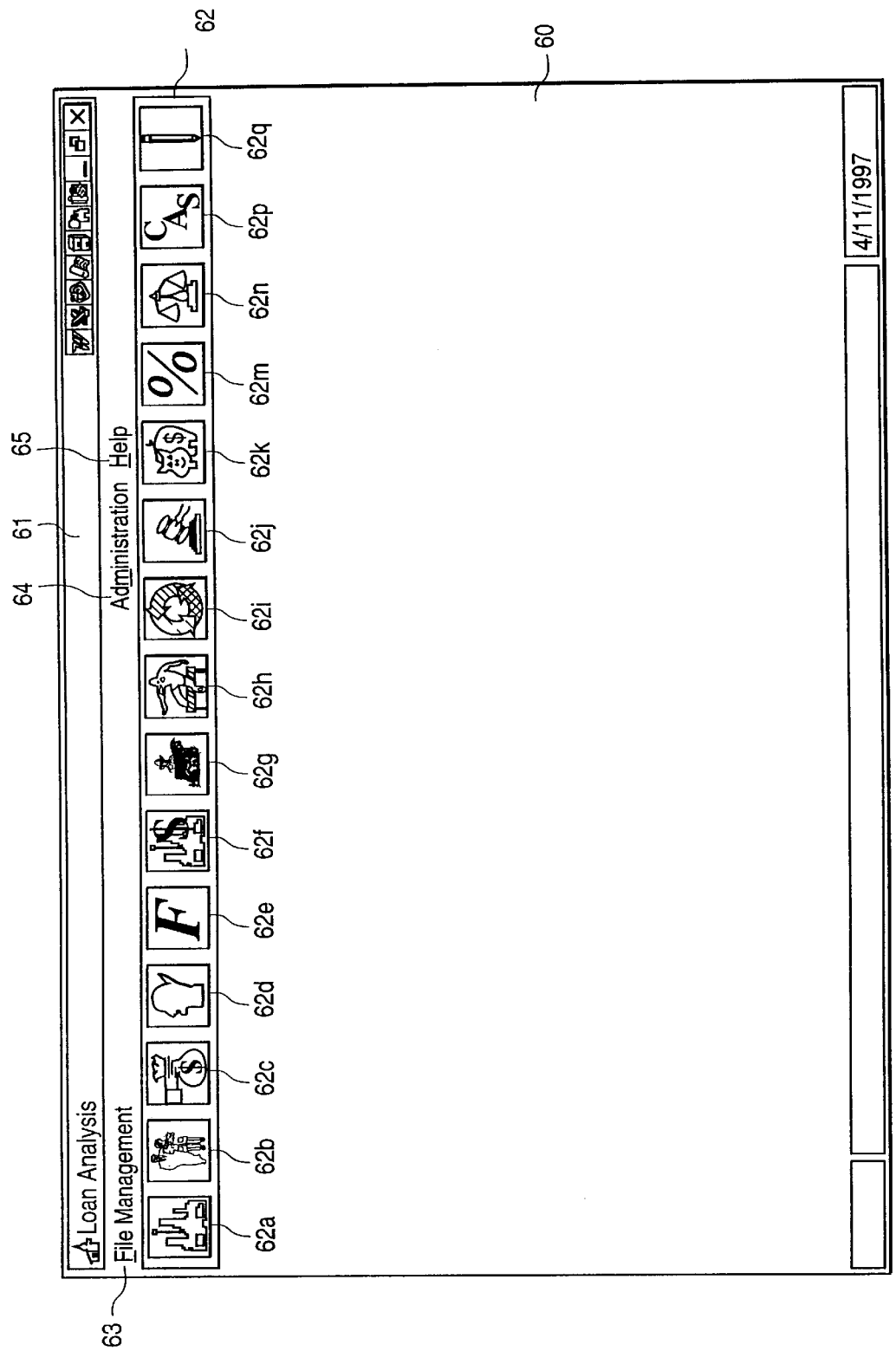
FIG. 6 is a sample startup screen for the system.

After the user selects OK 54, the system proceeds to a startup screen, shown in FIG. 6. A window 60 contains a menu bar 61 and a tool bar 62. The user may also select pull-down menus for File Management 63, Administration 64, or Help 65. The toolbar functions include buttons for Business details 62a, Owner/guarantor 62b, Loan request 62c, Personal checks 62d, Business financials 62e, Business income analysis 62f, Surplus personal income analysis 62g, Debt service coverage analysis 62h, Conversion of assets analysis 62i, Liquidation of assets analysis 62j, personal net worth 62k, Key analysis ratios 62m, Launch assessment 62n, Prepare CAS 62p, and Prepare memo 62q.

Figure 7:
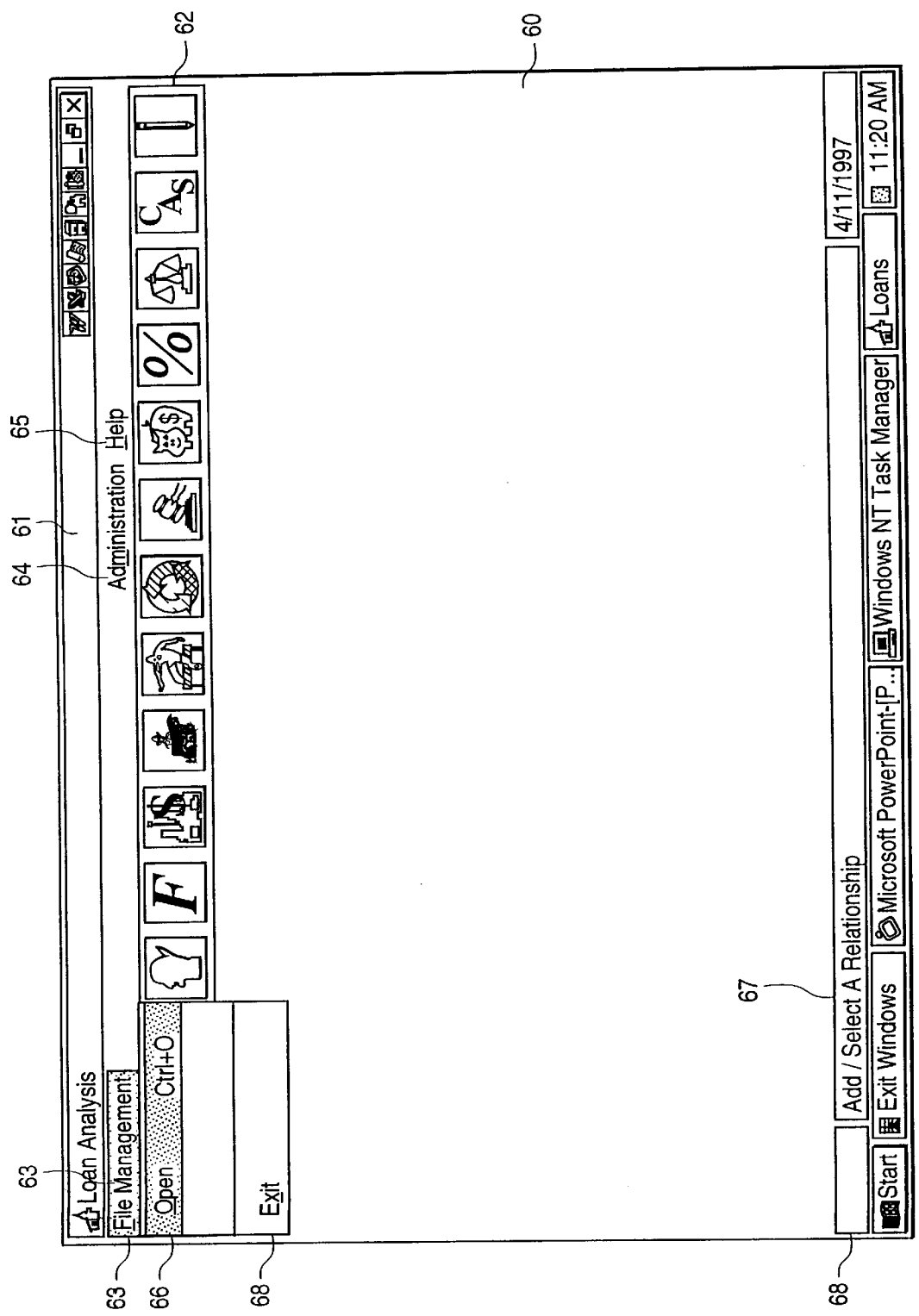
FIG. 7 shows a pulldown menu for the startup screen.
Figure 8:
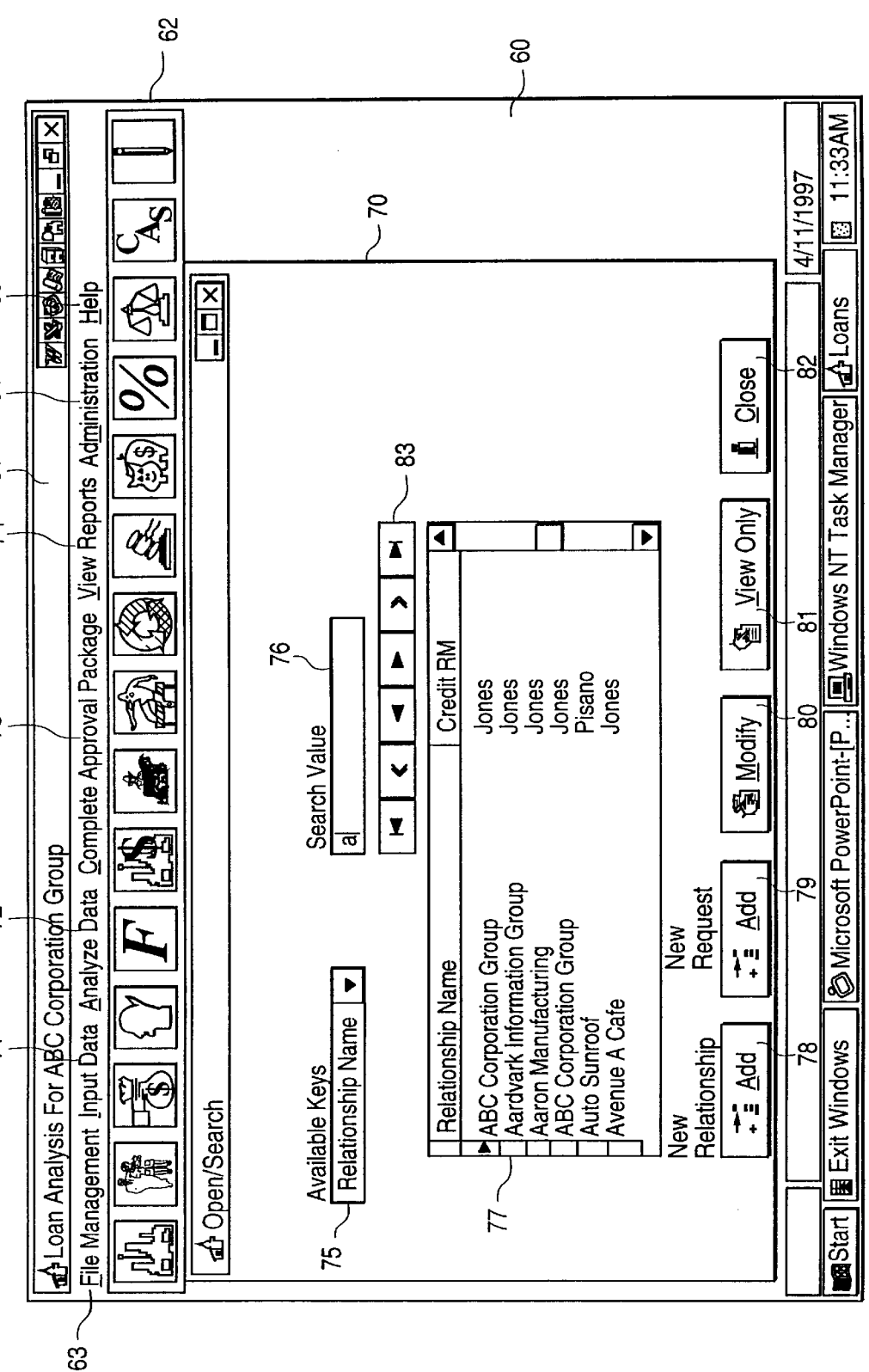
FIG. 8 is a pop-up window for opening or searching for a file.

As shown in FIG. 7, if the user selects the pull-down menu for File Management 63, menu options appear for Open 66 and Exit 68. Note that highlighting a menu option, such as Open 66, produces an explanation 67 in the comments area 68 at the bottom of the window 60. If the user selects Open 66 in FIG. 7, a pop-up window 70 appears, as shown in FIG. 8. In addition to the pop-up window 70 appearing, selection of this option results in additional pull-down menu activation. These additional pull-down menus include Input Data 71, Analyze Data 72, Complete Approval Package 73, and View Reports 74. The pop-up window 70 contains search functions for files to open. The search areas are selectable using a pull-down menu for Available Keys 75. Within the search area, Search Values 76 may be provided by which the user may search. The search results appear within a subwindow 77 of the pop-up window 70. The pop-up window 70 also contains buttons for adding a new item 78, adding a new request 79, modifying an existing item 80, viewing a selected item 81, or closing 82 the window 70. The user scrolls through the list using the toolbar items 83.

Figure 9:
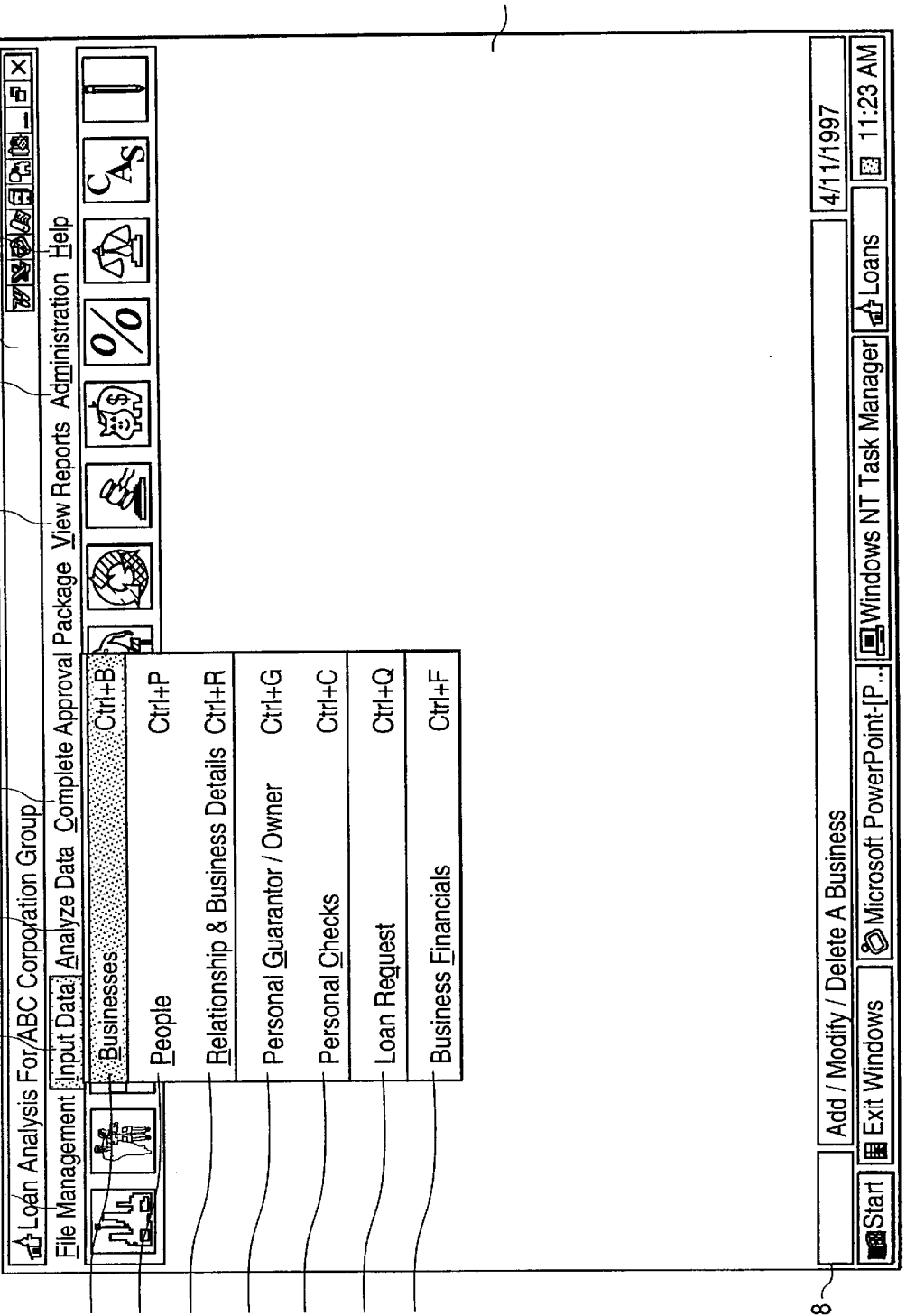
FIG. 9 is a pulldown menu for inputting data.

As shown in FIG. 9, the user may select a number of items from the pulldown menu for Input Data 71. These items include Businesses 90, People 91, Relationship & Business Details 92, Personal Guarantor/Owner 93, Personal Checks 94, Loan Request 95, and Business Financials 96.

Figure 10:
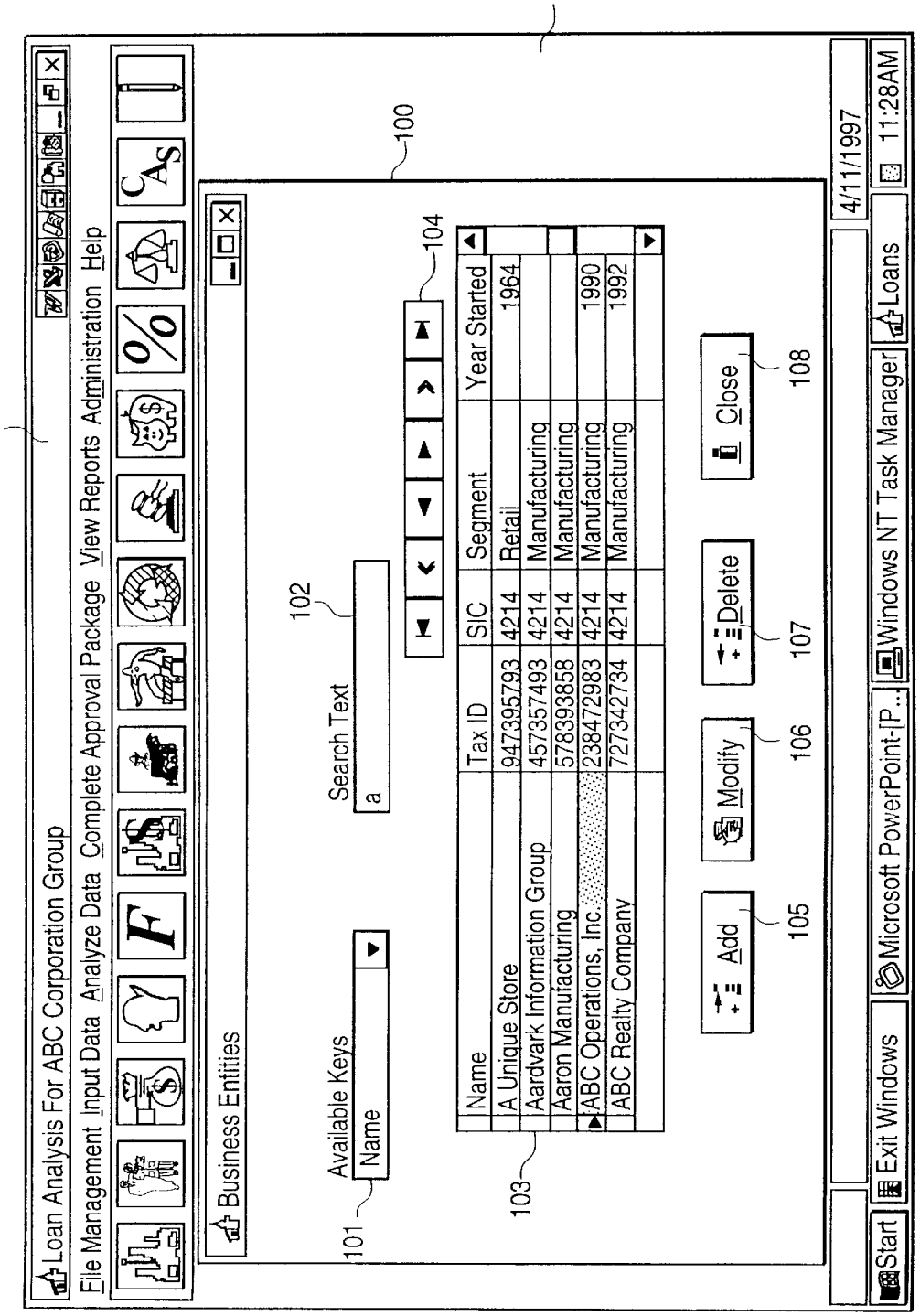
FIG. 10 is the pop-up window for inputting business data.

In FIG. 9, if the user selects Businesses 90 from the Input Data 71 pulldown menu, a pop-up window 100 appears, as shown in FIG. 10. The user may select a business entity for inputting data from a pulldown menu of choices of Available Keys 101, and search by inputted Search Text 102. The search results appear within a subwindow 103. Once the user has selected an item, the user scrolls through the list using the toolbar 104 within the window 100. Buttons are also available for adding an item 105, modifying an existing item 106, deleting an existing item 107, or closing 108 the window 100.

Figure 11:
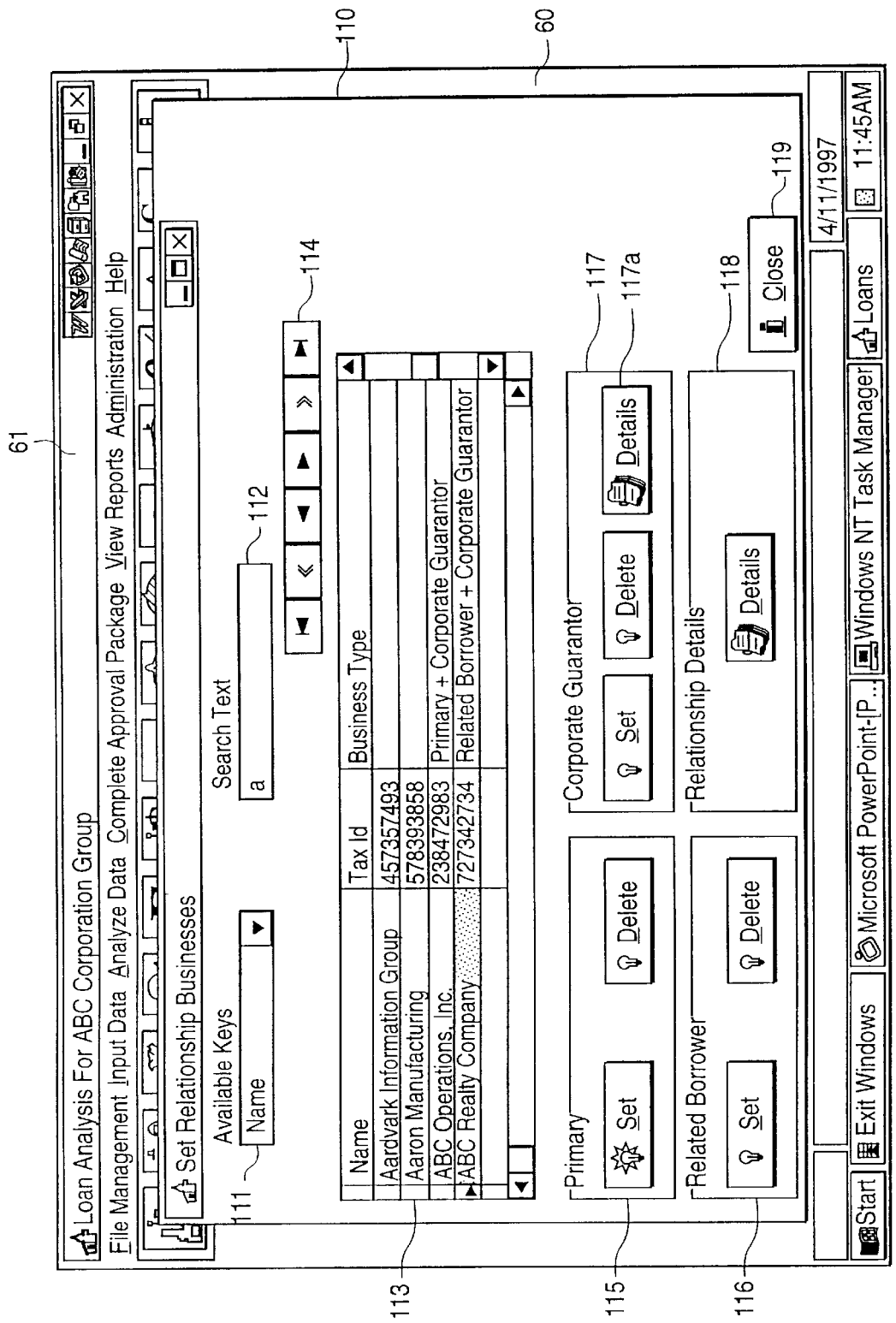
FIG. 11 is the pop-up window for inputting relationship and business details.

In FIG. 9, if the user selects Relationship & Business Details 92 from the Input Data 71 pulldown menu, a pop-up window 110 appears, as shown in FIG. 11. The user may search among Available Keys 111 using inputted Search Text 112. A list appears 113 based on search results. The user scrolls through the list 113 using the toolbar 114. The user tags each entry for business type classifications using buttons to set or delete the tag; these tags include Primary 115, Related Borrower 116, and Corporate Guarantor 117. In addition, if the user designates the business as a Corporate Guarantor 117, the user may add details by selecting the Details button 117a. In addition, the user can add Relationship Details 118. A button is also available to Close 119 the pop-up window 110 when the user is finished adding or modifying information.

Figure 12:
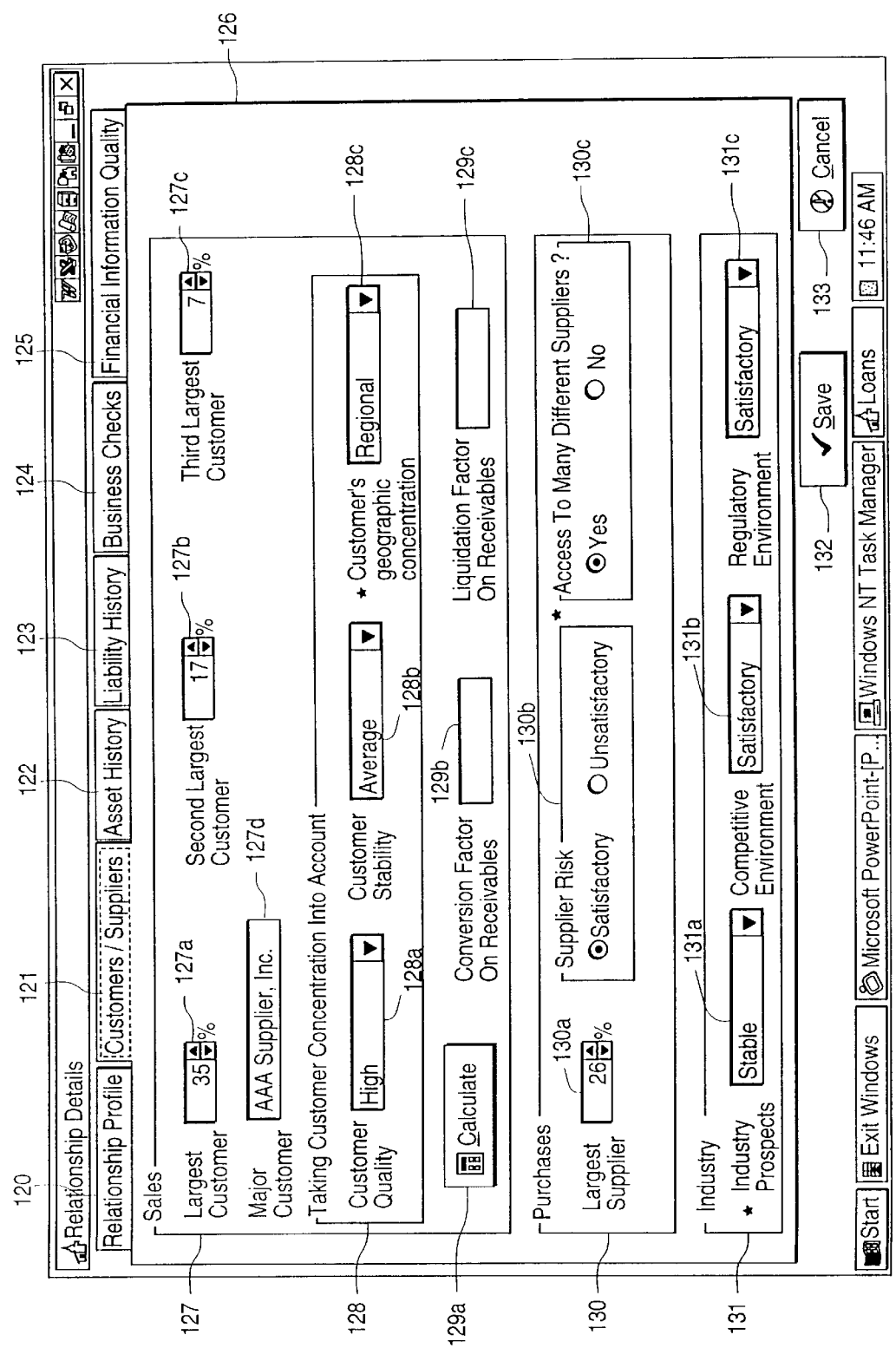
FIG. 12 is a window for customers/suppliers for relationship details data entry.

In FIG. 11, if the user selects Relationship Details 118, a series of windows appears, which include Relationship Profile 120, Customers/Suppliers 121, Asset History 122, Liability History 123, Business Checks 124, and Financial Information Quality 125. FIG. 12 presents the window 126 for Customers/Suppliers 121. The pop-up window 126 for Customers/Suppliers 121, includes groups of tags for the user to designate. One group of tags is for Sales 127, which contains a number of subtags: Largest Customer % 127a; Second Largest Customer % 127b; Third Largest Customer % 127c; Major Customer name 127d; Taking Customer Concentration Into Account subtag group 128, including Customer Quality 128a, Customer Stability 128b, and Customer's geographic concentration 128c; also included are a button for calculating 129a a Conversion Factor on Receivables 129b and a Liquidation Factor on Receivables 129c, based on information inputted on sales. A second tag group is for Purchases 130, which includes subtags for Largest Supplier % 130a, Supplier Risk 130b, and Access to Many Different Suppliers? 130c. The third tag group is for Industry 131, which includes subtags for Industry Prospects 131a, Competitive Environment 131b, and Regulatory Environment 131c. The user may also select buttons to Save 132 information or to Cancel 133.

In FIG. 9, if the user selects Business Financials 96 from the Input Data 71 pulldown menu, a pop-up window 140 appears, as shown in FIG. 13. A series of windows is available from which the user may scroll among. These windows include Income Statement 141, Related Income Statement 142, Assets 143, Liabilities and Net Worth 144, and Assessment Ratios 145. FIG. 13 presents the information for Income Statement 141. This information includes a table of information 146. The table 146 includes rows of information regarding Net Sales 146a, Gross Profit 146b, Officers Compensation 146c, Wages and Salaries 146d, Depreciation and Amortization 146e, Bad Debt Expense 146f, Other SGA Expense 146g, Total Operating Expenses 146h, Operating Profit 146i, Other Items 146j, Interest Expense 146k, Taxes 146m, Extraordinary Items 146n, Net profit 146p, and Div and Oth Adj to Ret Earn 146q. The table 146 contains columns for Full Year Actuals 146r, Interim 146s, and Projected 146t. The window 140 also contains buttons for Import from FAST and Display 147, Display Only 148, and Go To FAST 149. The user may Save 150 or Cancel 151 inputted information.

Figure 14:
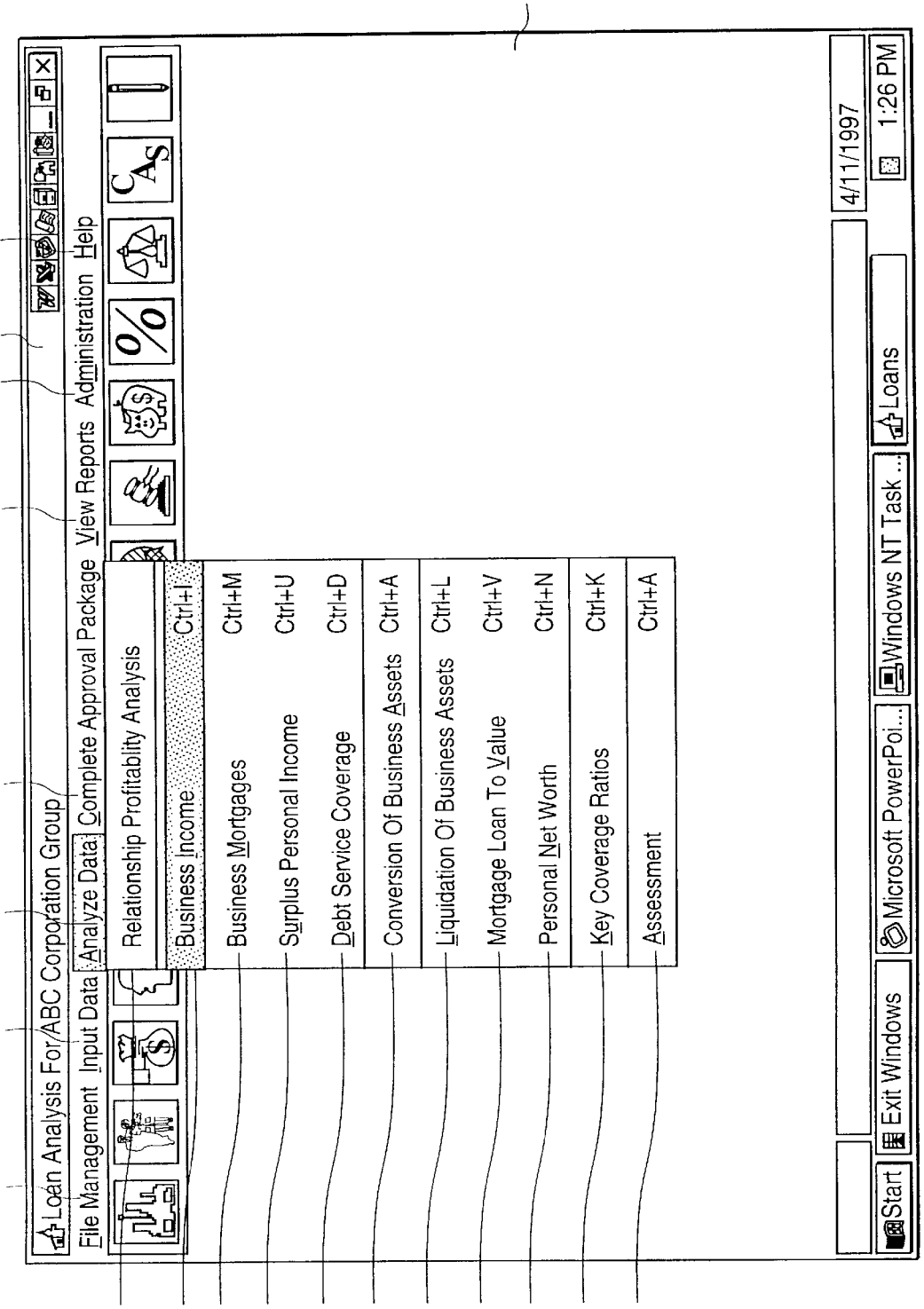
FIG. 14 is the pulldown menu for analyze data.
Figure 15:
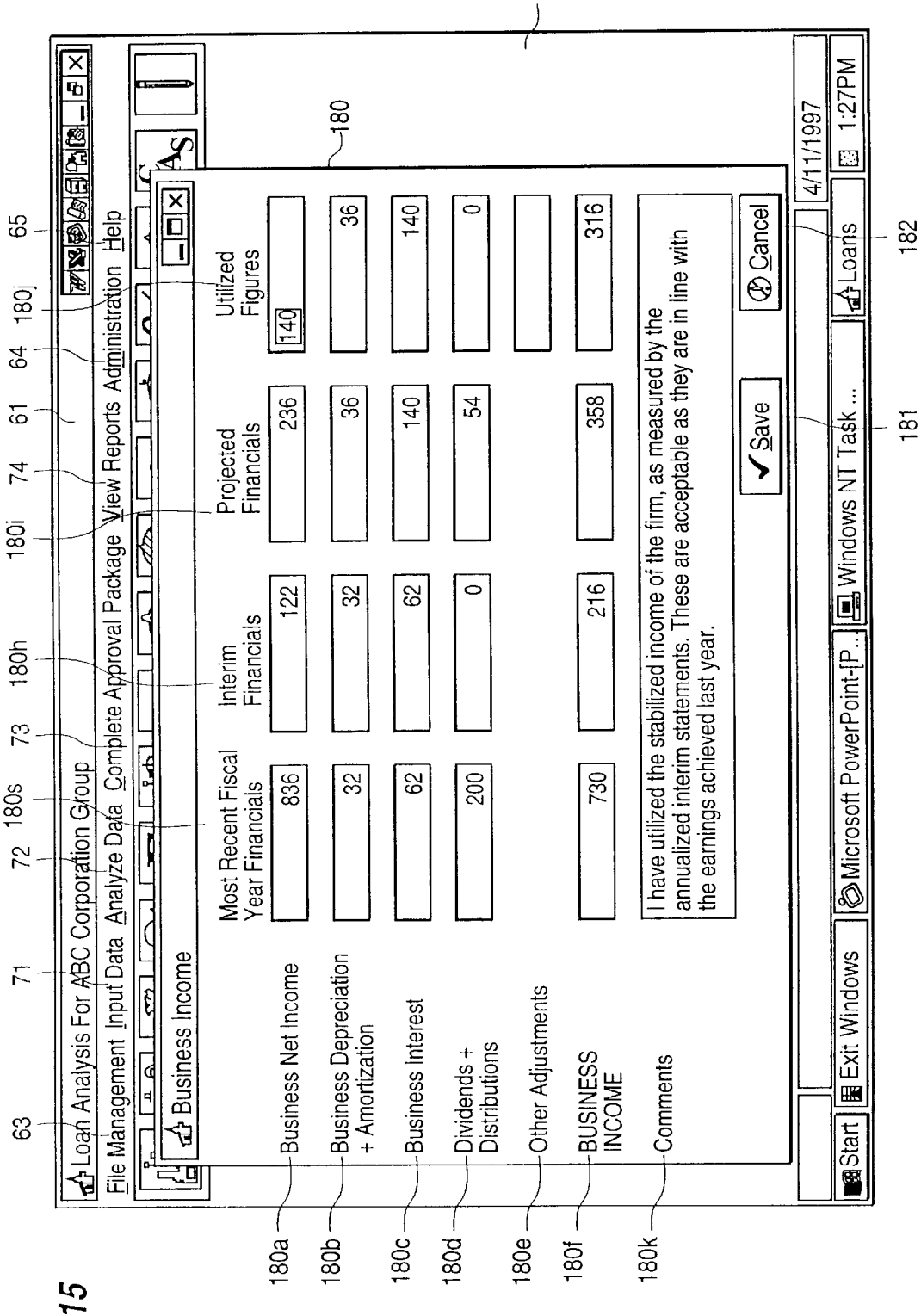
FIG. 15 is the pop-up window for business income.

FIG. 14 presents the pulldown menu for Analyze Data 72. This pulldown menu includes Relationship Profitability Analysis 160, Business Income 161, Business Mortgages 162, Surplus Personal Income 163, Debt Service Coverage 164, Conversion of Business Assets 165, Liquidation of Business Assets 166, Mortgage Loan to Value 167, Personal Net Worth 168, Key Coverage Ratios 169, and Assessment 170. If the user selects Business Income 161 from the Analyze Data 72 pulldown menu, a pop-up window 180 appears, as shown in FIG. 15. The window 180 includes tabular information, including rows of information regarding Business Net Income 180a, Business Depreciation+ Amortization 180b, Business Interest 180c, Dividends+ Distributions 180d, Other Adjustments 180e, and Business Income 180f; and columns for Most Recent Fiscal Year Financials 180g, Interim Financials 180h, Projected Financials 180i, and Utilized FIGS. 180j. The window 180 also contains a section for entering Comments 180k. The user may Save 181 or Cancel 182 inputted information.

Figure 16:
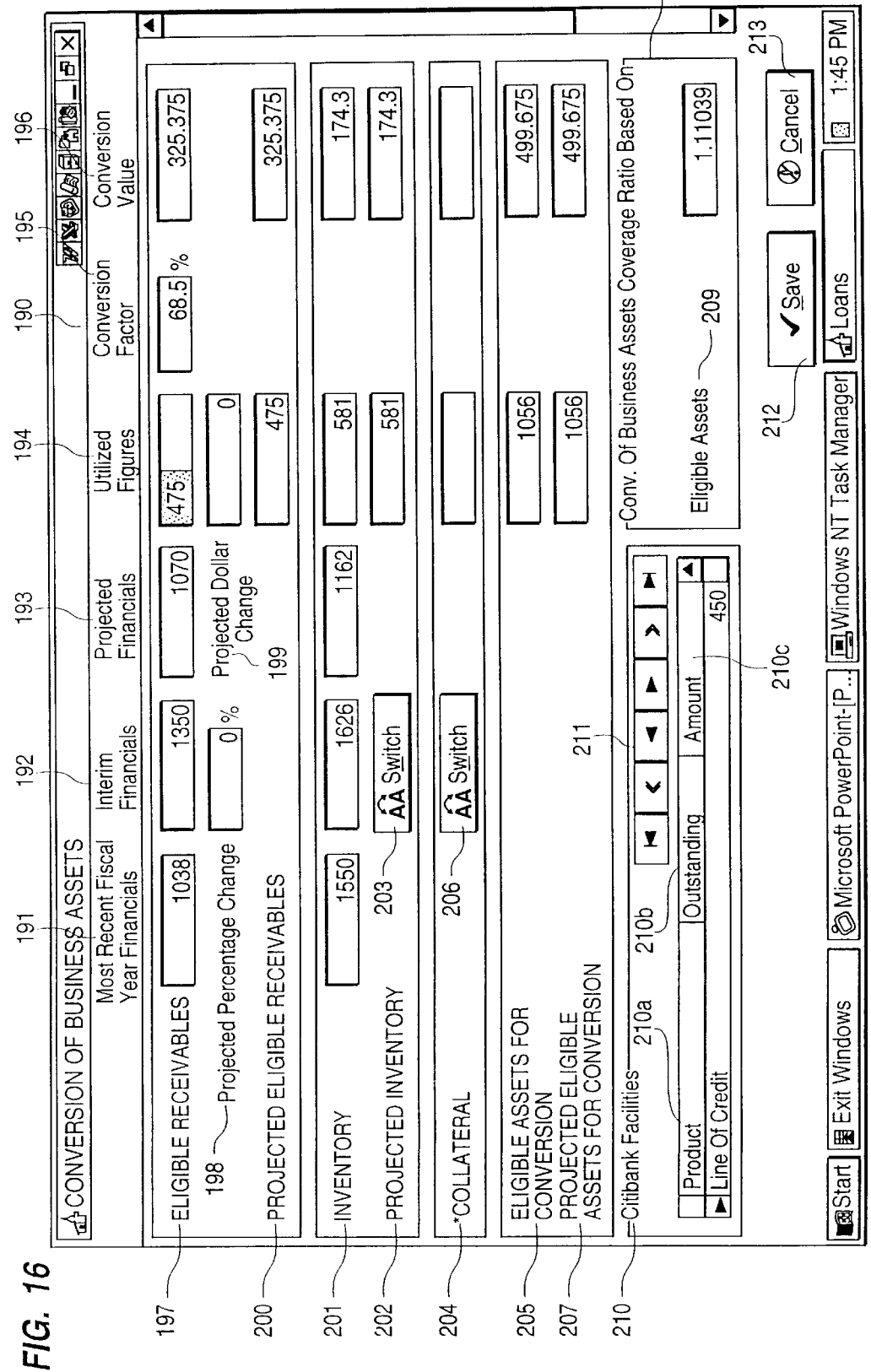
FIG. 16 is the window for conversion of business assets.

In FIG. 14, if the user selects Conversion of Business Assets 165 from the Analyze Data 72 pulldown menu, a window 190 appears, as shown in FIG. 16. The window 190 allows the user to input information tabularly regarding conversion of business assets. The columns for the tabular information are for Most Recent Fiscal Year Financials 191, Interim Financials 192, Projected Financials 193, Utilized FIGS. 194, Conversion Factor 195, and Conversion Value 196. The rows for the tabular information include user input for Eligible Receivables 197, Projected Percentage Change 198, and Projected Dollar Change 199; the system then determines Projected Eligible Receivables 200; the user inputs rows for Inventory 201 and Projected Inventory 202. The user may select the Switch button 203 to change Projected Inventory 202 information. The rows for tabular information also include Collateral 204 and Eligible Assets for Conversion 205. The user may select the Switch button 206 to change Collateral information. The system determines Projected Eligible Assets for Conversion 207; and the system determines the Conversion of Business Assets Coverage Ratio Based on 208 Eligible Assets 209. The window 190 also includes a list of Citibank Facilities 210, which includes information on Product 210a, Outstanding 210b, and Amount 210c; the user may scroll through the list of Citibank Facilities 210 using a toolbar 211. The user may Save 212 or Cancel 213 inputted information.

In FIG. 14, if the user selects Key Coverage Ratios 169 from the Analyze Data 72 pulldown menu, a window 310 appears, as shown in FIG. 17. The window 310 allows the user to input information regarding Summary of Key Coverage Ratios in boxes. The boxes include Primary Repayment Source 311, with rows for Debt Service 311a and Conversion of Business Assets 311b; Additional Repayment Source 312, with a row for Liquidation of Total Assets to Non-Mortgage Facilities 312a; Distress Coverage (If Applicable) 313, with rows for Full Amortization Debt Service 313a and Non-Mortgage Scheduled Debt Coverage 313b; a list of information on Mortgages Only 314, which includes information on Product 314a, Amount 314b, Appraised Value 314c, Loan to Value (%) 314d, and Special Use 314e; and Others 315, including rows for Liquidation of Business Assets to Total Facilities 315a, Liquidation of Personal Assets to Total Facilities 315b, and Full Amortization Debt Service (If Applicable) 315c. The user may select the button to Close 316 when data input is finished.

Figure 18:
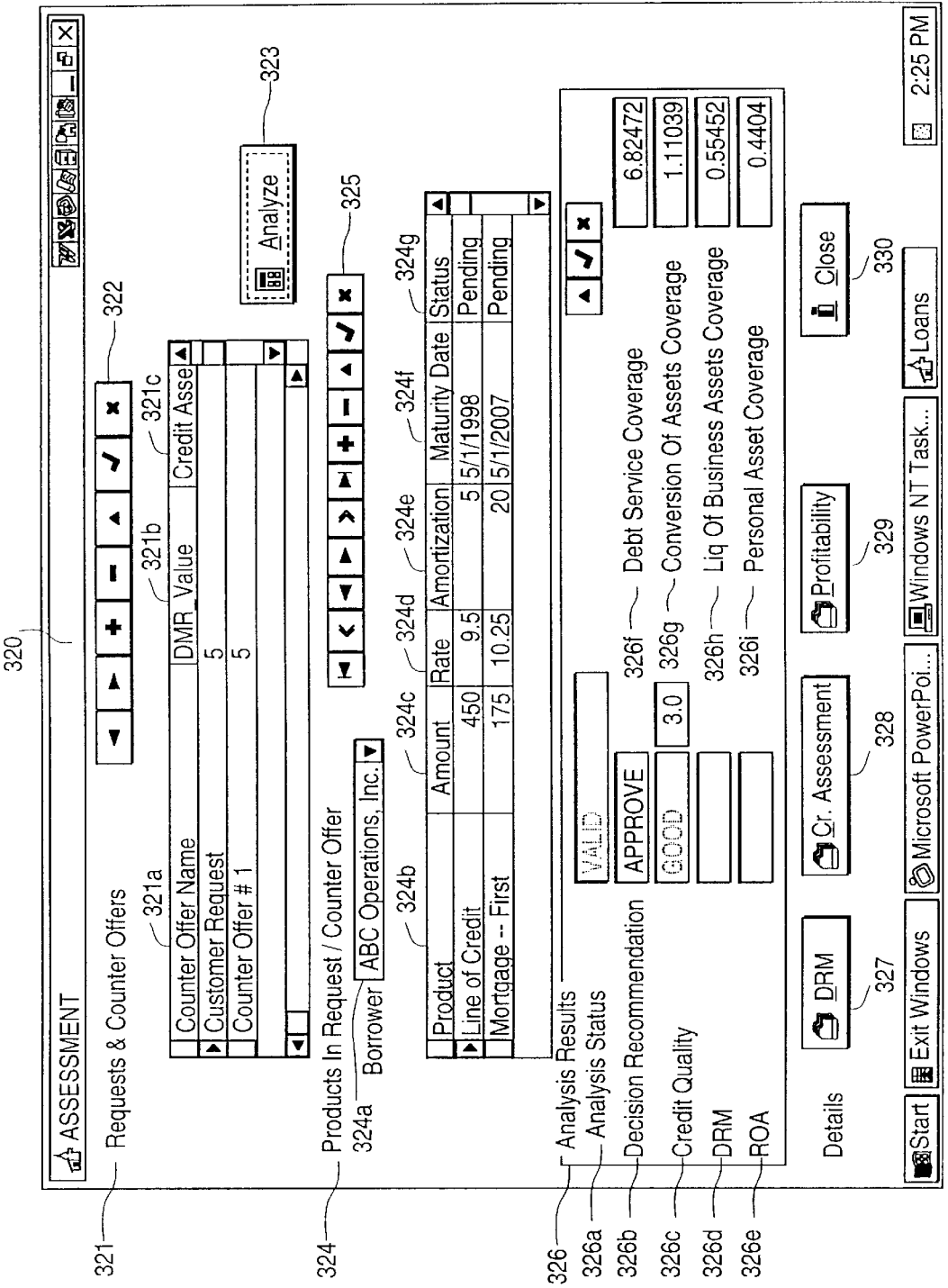
FIG. 18 is the window for assessment.

In FIG. 14, if the user selects Assessment 170 from the Analyze Data 72 pulldown menu, a window 320 appears, as shown in FIG. 18. The window 320 allows the user to input information regarding Assessment. The information may be inputted into lists and a box. The first list contains information on Requests and Counteroffers 321, including information on Counter Offer Name 321a, DRM__Value 321b, and Credit Assessment 321c. The user may scroll the list using a toolbar 322. The user may select a button for Analyze 323 to assess a selected item. A second list contains information on Products in Request/Counter Offer 324, including a selection for Borrower 324a, and list items for Product 324b, Amount 324c, Rate 324d, Amortization 324e, Maturity Date 324f, and Status 324g. The user may scroll the list using a toolbar 325. After the user has selected the button for Analyze 323, the system provides information into a box for Analysis Results 326, including Analysis Status 326a, which tells the user if the user has entered additional data since performing the analysis, Decision Recommendation 326b, which is the system's recommendation, Credit Quality 326c, containing the system credit assessment and rating, DRM 326d, which is the obligor risk rating, ROA 326e, Debt Service Coverage 326f, Conversion of Assets Coverage 326g, Liquidation of Business Assets Coverage 326h, and Personal Asset Coverage 326i. The user may also select buttons for DRM 327, Credit Assessment 328, and Profitability 329. The user may select the button to Close 330 when finished.

Figure 19:
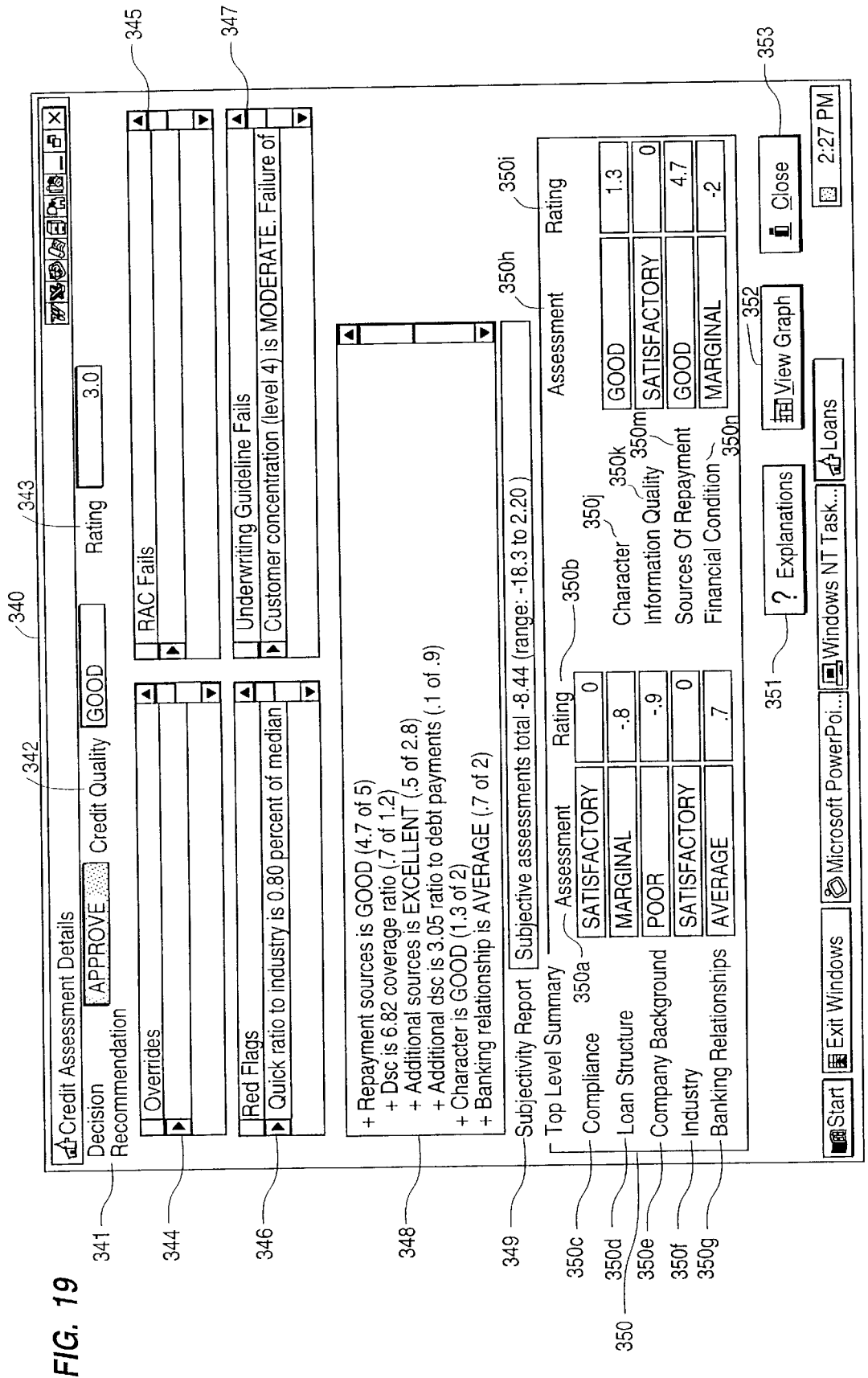
FIG. 19 is the window for credit assessment.

In FIG. 18, if the user selects the button for Credit Assessment 328, a window 340 appears, as shown in FIG. 19. The window 340 indicates the Decision Recommendation 341, and provides information on Credit Quality 342, Rating 343, Overrides 344 that have been triggered, RAC Fails 345, Red Flags 346, Underwriting Guideline Fails 347, and other details 348. The details 348 include a system created narrative summary of strengths and weaknesses, by level of importance. In addition, the window 340 contains a Subjectivity Report 349, which provides a summary of subjective information making up the assessment, and a box of information regarding Top Level Summary 350 in tabular format of the nine major risk categories, which include columns for Assessment 350a and Rating 350b, with rows for Compliance 350c, Loan Structure 350d, Company Background 350e, Industry 350f, and Banking Relationship 350g; a second set of columns for Assessment 350h and Rating 350i correspond to rows for Character 350j, Information Quality 350k, Sources of Repayment 350m, and Financial Condition 350n. The user may select buttons for Explanations 351 or View Graph 352; or the user may select the button to Close 353 the window 340.

Figure 20:
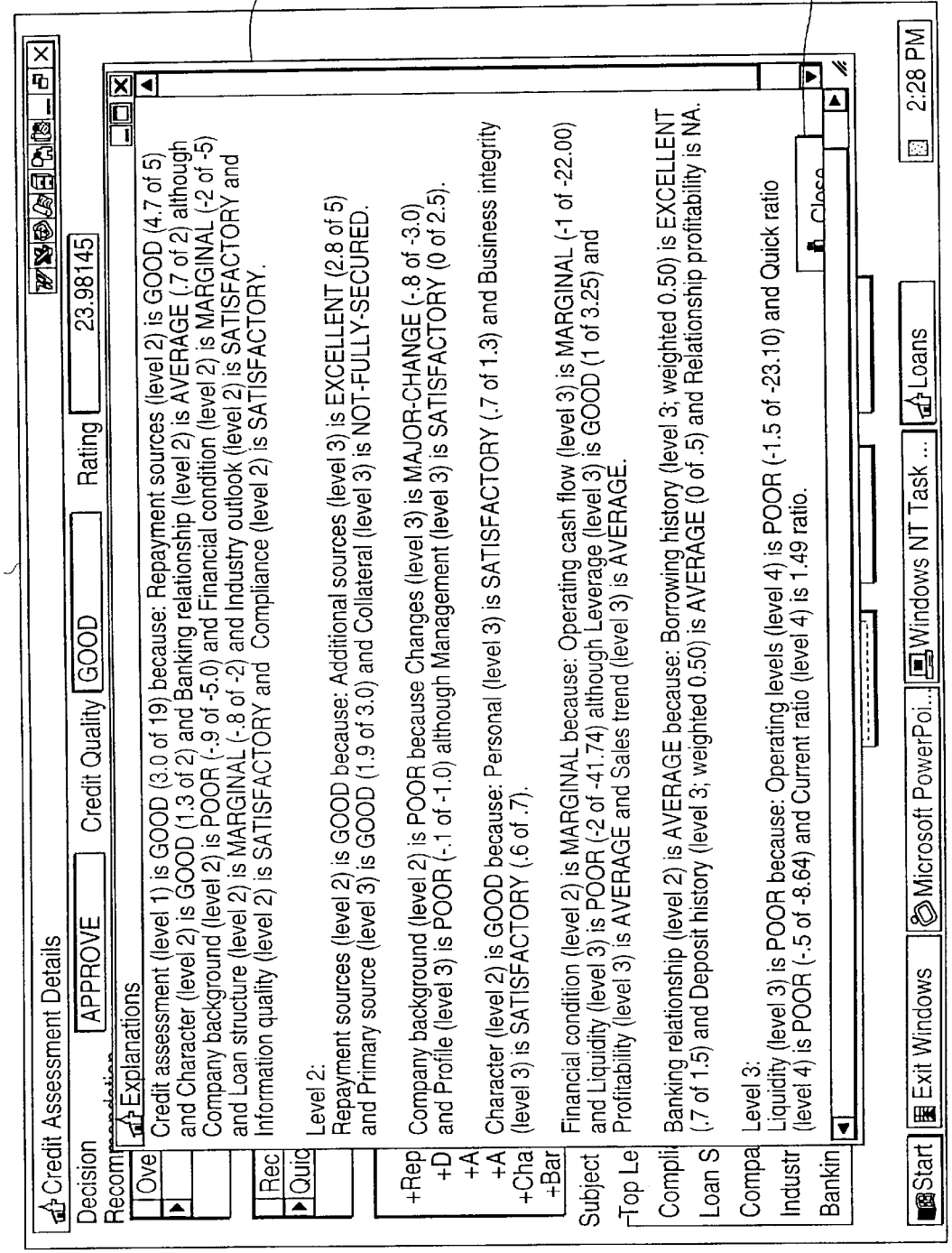
FIG. 20 is the pop-up window for explanations.

In FIG. 19, if the user selects the button for Explanations 351, a pop-up window 355 appears, as shown in FIG. 20. This pop-up window 355 contains sample explanatory information. The user may select the button to Close 356 the window 355.

Figure 21:
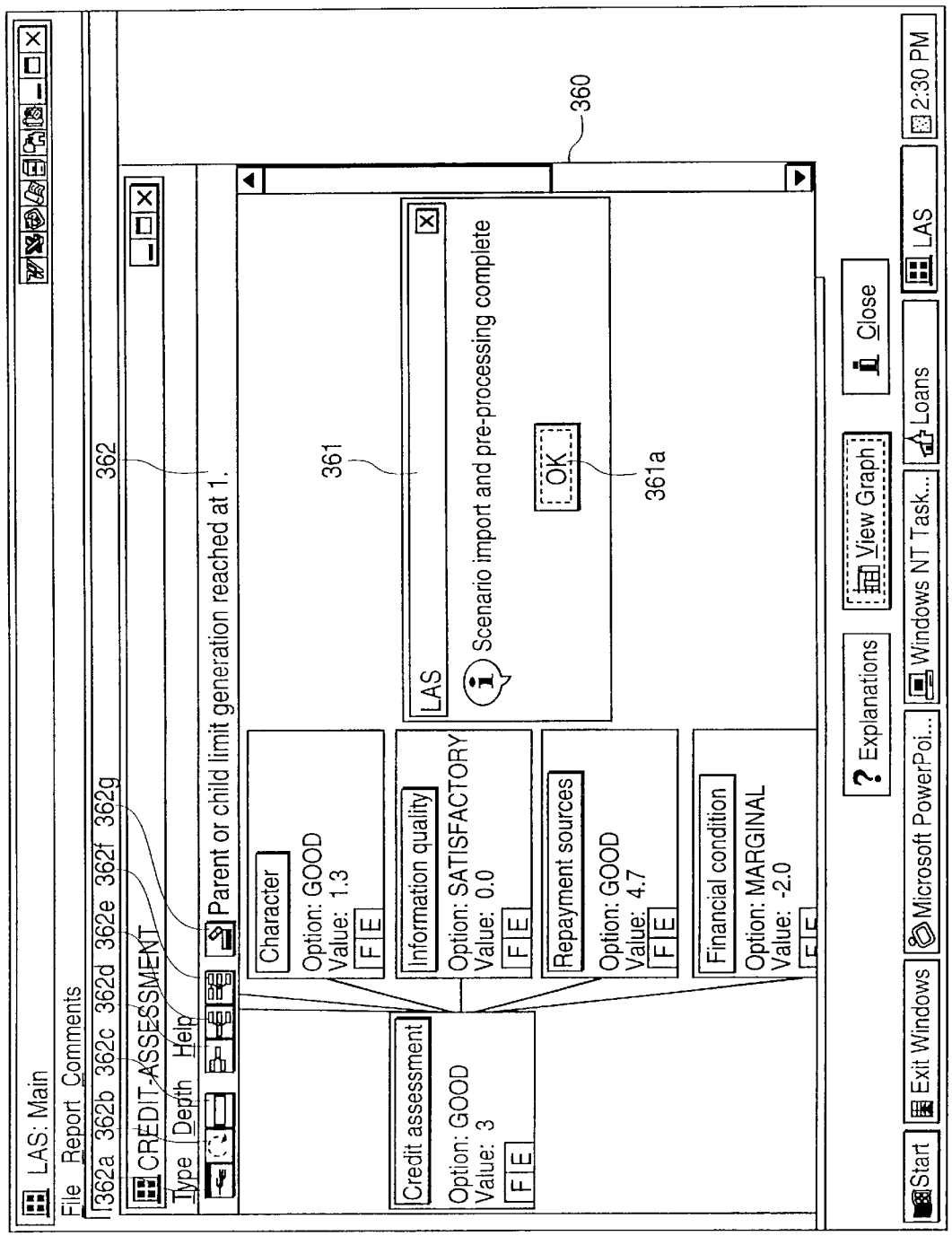
FIG. 21 is the pop-up window for view graph.

In FIG. 19, if the user selects the button for View Graph 352, a pop-up window appears, as shown in FIG. 21. Once the view graph information import is complete, a pop-up window 360 appears, which prompts the user that the import and preprocessing is complete. The user may select from a pop-up window 360 the button for OK 361a to then view window 360. The window 360 also includes a series of shortcut buttons on a toolbar 362. These buttons include Short Overview 362a, which opens the node browser overview window, Flip View Left/Right 362b, which toggles the node view from right to left or top to bottom, Set Source Node 362c, which sets the selected node to the source node and recalculates the display, View Parents 362d, which toggles the generation of parent objects in the node browser, View Children 362e, which toggles the generation of child objects in the node browser, View Cousins 362f, which toggles the generation of cousins in the node browser, and Refresh 362g, which recalculates the display based on the current object model. (The credit assessment portion of the system is described further below.)

Figure 22:
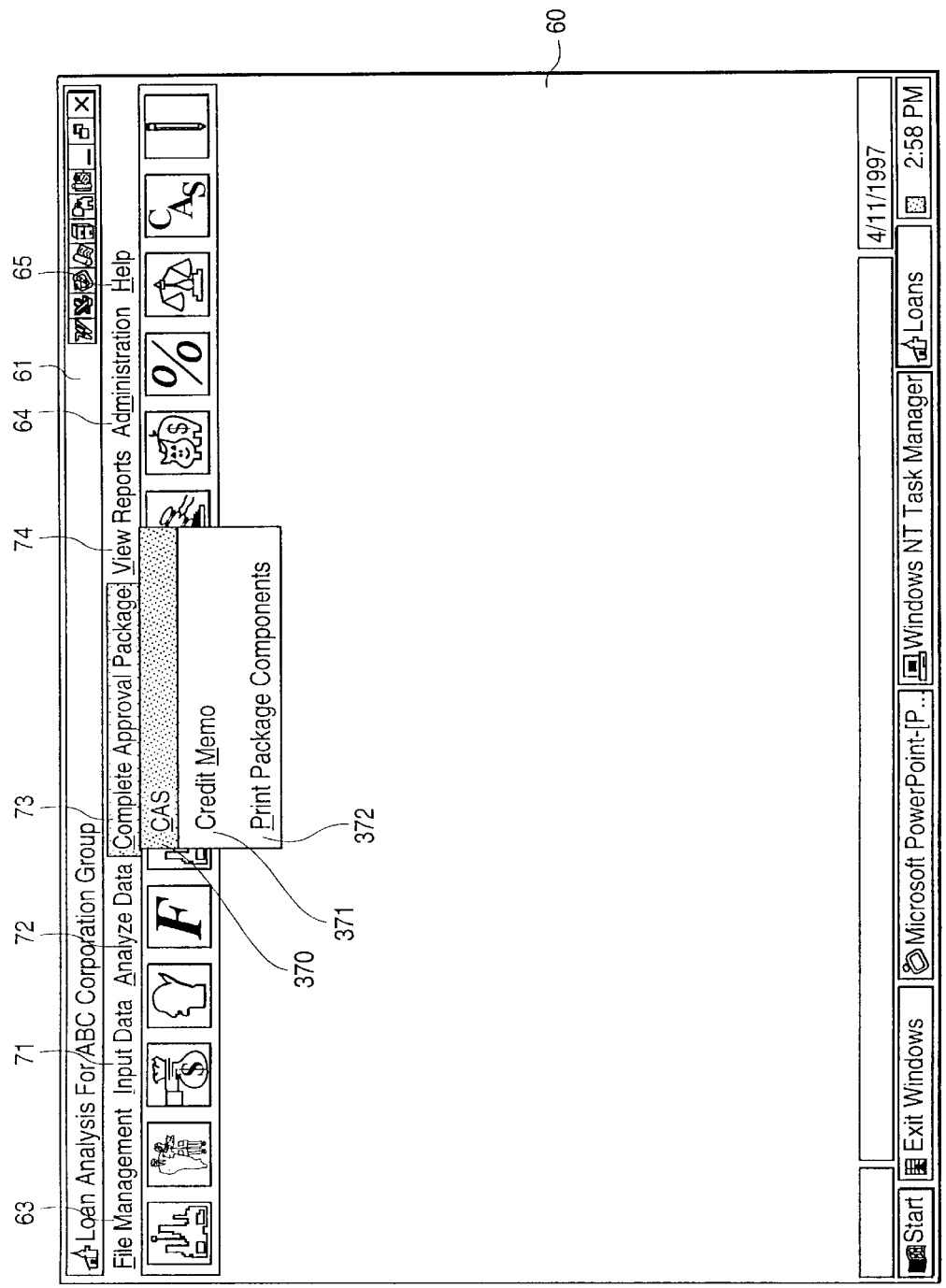
FIG. 22 is the pulldown menu for complete approval package.
Figure 23:
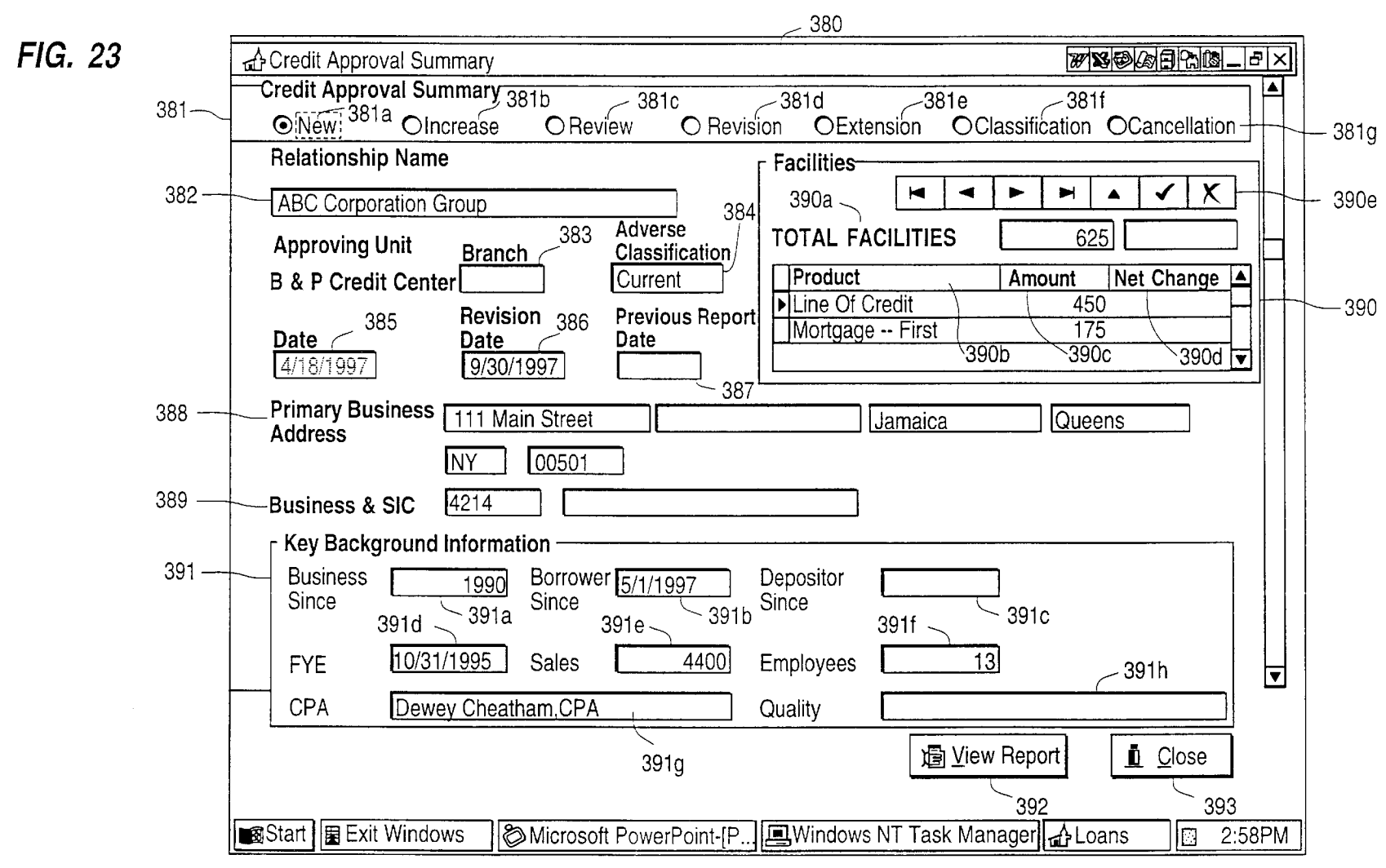

FIG. 22 presents the pulldown menu for Complete Approval Package 73. The pulldown menu includes CAS 370, Credit Memo 371, and Print Package Components 372. As shown in FIG. 22, if the user selects CAS 370 from the Complete Approval Package 73 pulldown menu, a window 380 appears, as shown in FIG. 23. The window 380 allows the user to view Credit Approval Summary information. This information includes a box for Credit Approval Summary 381, including New 381a, Increase 381b, Review 381c, Revision 381d, Extension 381e, Classification 381f, and Cancellation 381g. The user may enter information regarding Relationship Name 382, Approving Unit B&P Credit Center Branch 383, Adverse Classification 384, Date 385, Revision Date 386, Previous Report Date 387, Primary Business Address 388, and Business and SIC 389. The window 380 contains a box for Facilities 390, which includes Total Facilities 390a, a list containing Product 390b, Amount 390c, and net Change 390d, and a toolbar 390e for the user to scroll the list. The window 380 contains a second box for Key Background Information 391, including information on Business Since 391a, Borrower Since 391b, Depositor Since 391c, FYE 391d, Sales 391e, Employees 391f, CPA 391g, and Quality 391h. The user may select buttons to View Report 392 and to Close 393.

Figure 24:
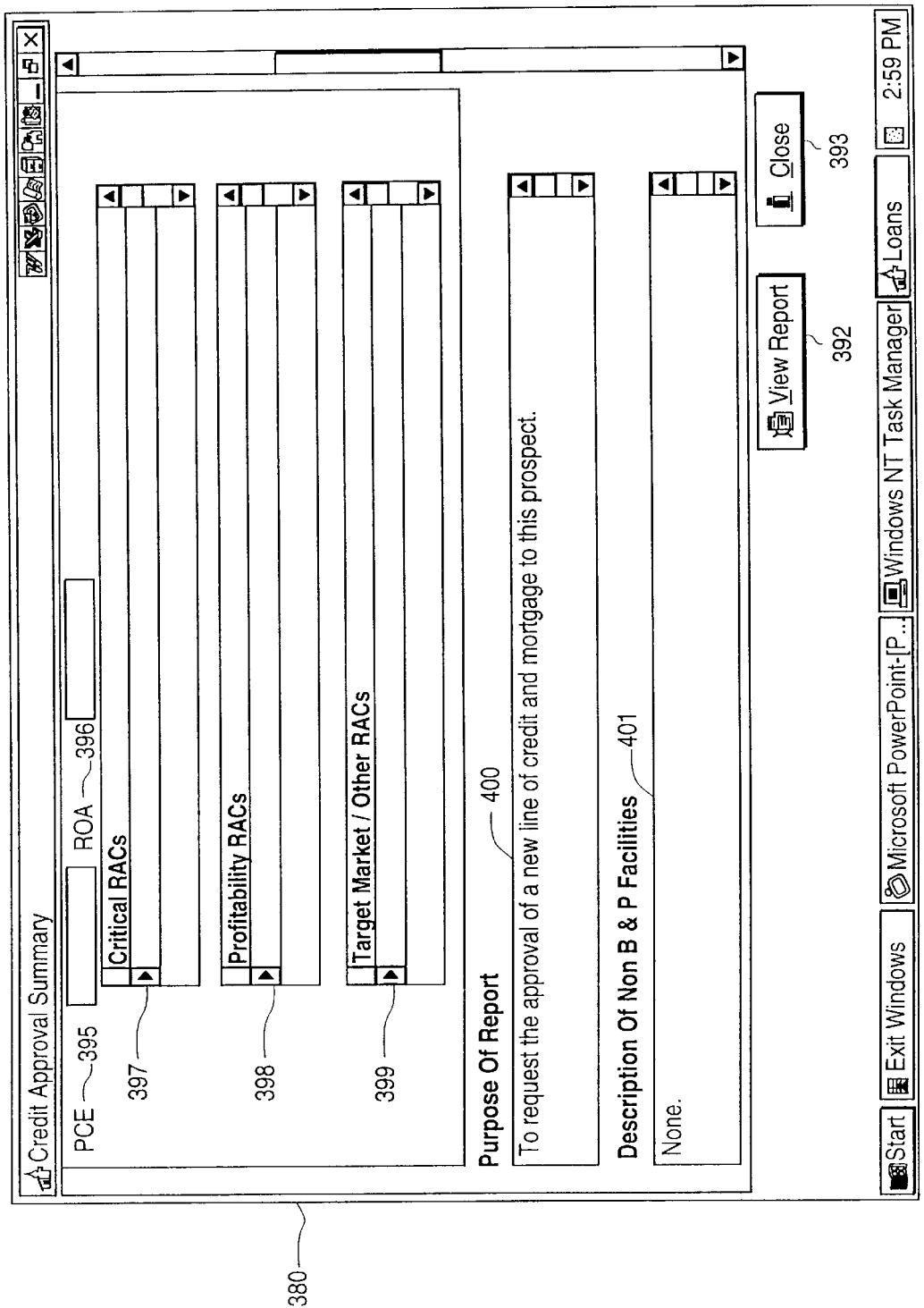
FIG. 24 is the second part of the window for CAS.

In FIG. 22, if the user continues scrolling down the page, the next part of the window 380 appears, as shown in FIG. 24. Information in this part of the window 380 includes PCE 395, ROA 396, Critical RACs 397, Profitability RACs 398, and Target Market/Other RACs 399, and comment boxes for Purpose of the Report 400 and Description of Non-B&P Facilities 401. The user may select buttons to View Report 392 and to Close 393.

In FIG. 24, if the user continues scrolling down the page, the next part of the window 380 appears, as shown in FIG.

25. Information in this part of the window 380 includes Description of Total Facilities and Security 405, which includes a list of Borrowers 406, comprising Name 406a and Tax ID 406b, which the user may scroll using a toolbar 407; a comment box for Description of Other Security 408, which the user may scroll using a toolbar 409; a list of Products 410, comprising Product 410a and Amount 410b, which the user may scroll using a toolbar 411; and a box for Comments 412. The user may select buttons to View Report 392 and to Close 393.

Figure 25:
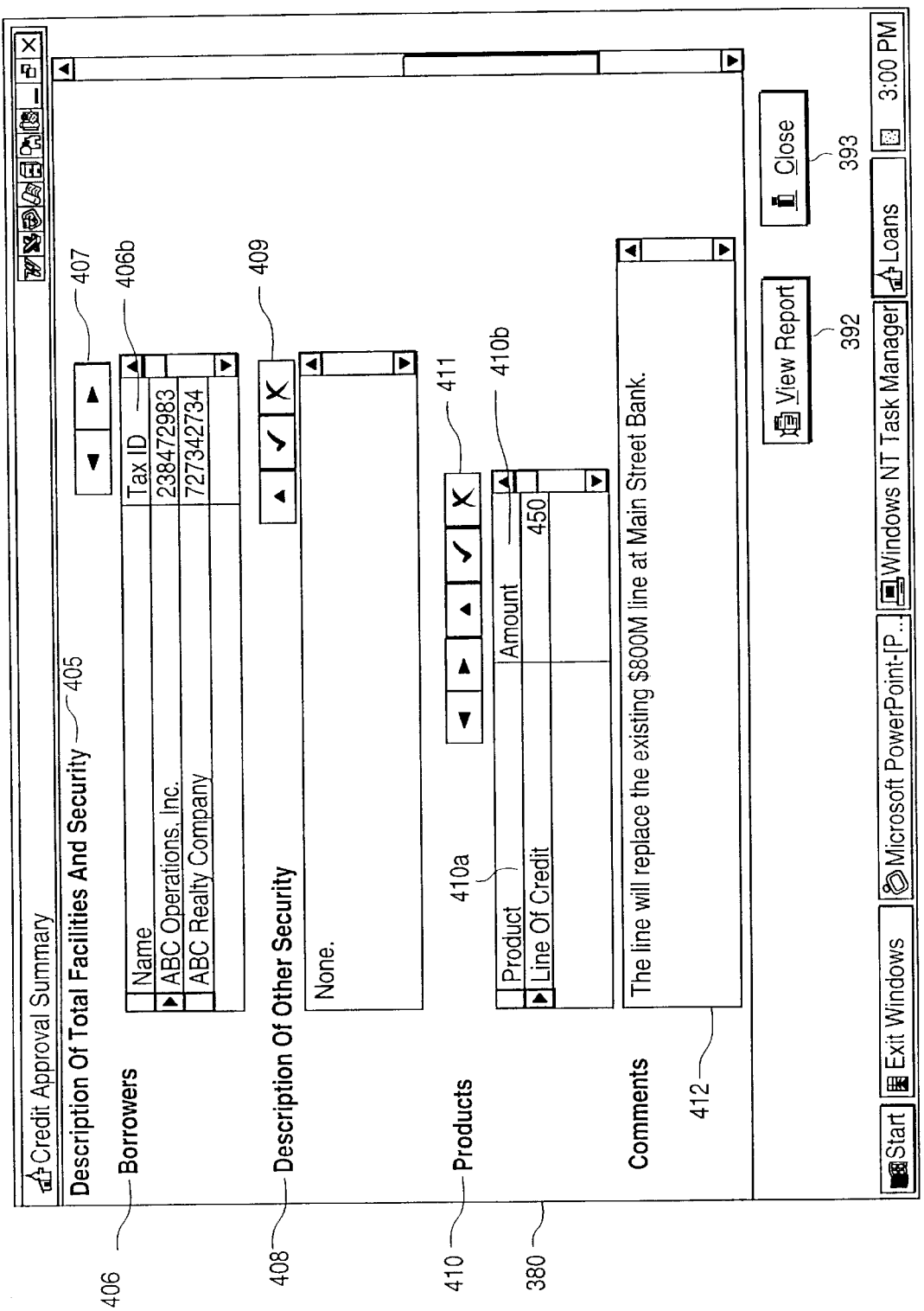
FIG. 25 is the third part of the window for CAS.

In FIGS. 23–25, if the user selects the button for View Report 392, a window 420 appears, as shown in FIG. 26. This window 420 contains information on Credit Approval in a report format; in the example as shown in FIG. 26, the window 420 shows page 1 of 3. The window 420 includes a toolbar 421 for the user to apply to the report, which includes a button for Close 422.

In FIG. 22, if the user selects Credit Memo 371 from the Complete Approval Package 73 pulldown menu, a window 430 appears, as shown in FIG. 27. The window 430 allows the user to view or input Credit Memo information, including Relationship Name 431, Responsible Officer 432, and Date 433; Summary and Conclusion information 434, including Debt Service Coverage 434a, Liquidation Coverage 434b, Conversion of Business Assets 434c, Personal Asset Coverage 434d, and Full Amortization DSC 434e; Expert System Assessment information 435, including Decision Recommendation 435a, Credit Quality Assessment 435b, Rating 435c, a comment box for Any Factors that the System Did Not Evaluate 435d, and a comment box for Key Strengths/Weaknesses 435e. The user may select buttons to View Report 436 or Close 437.

Figure 28:
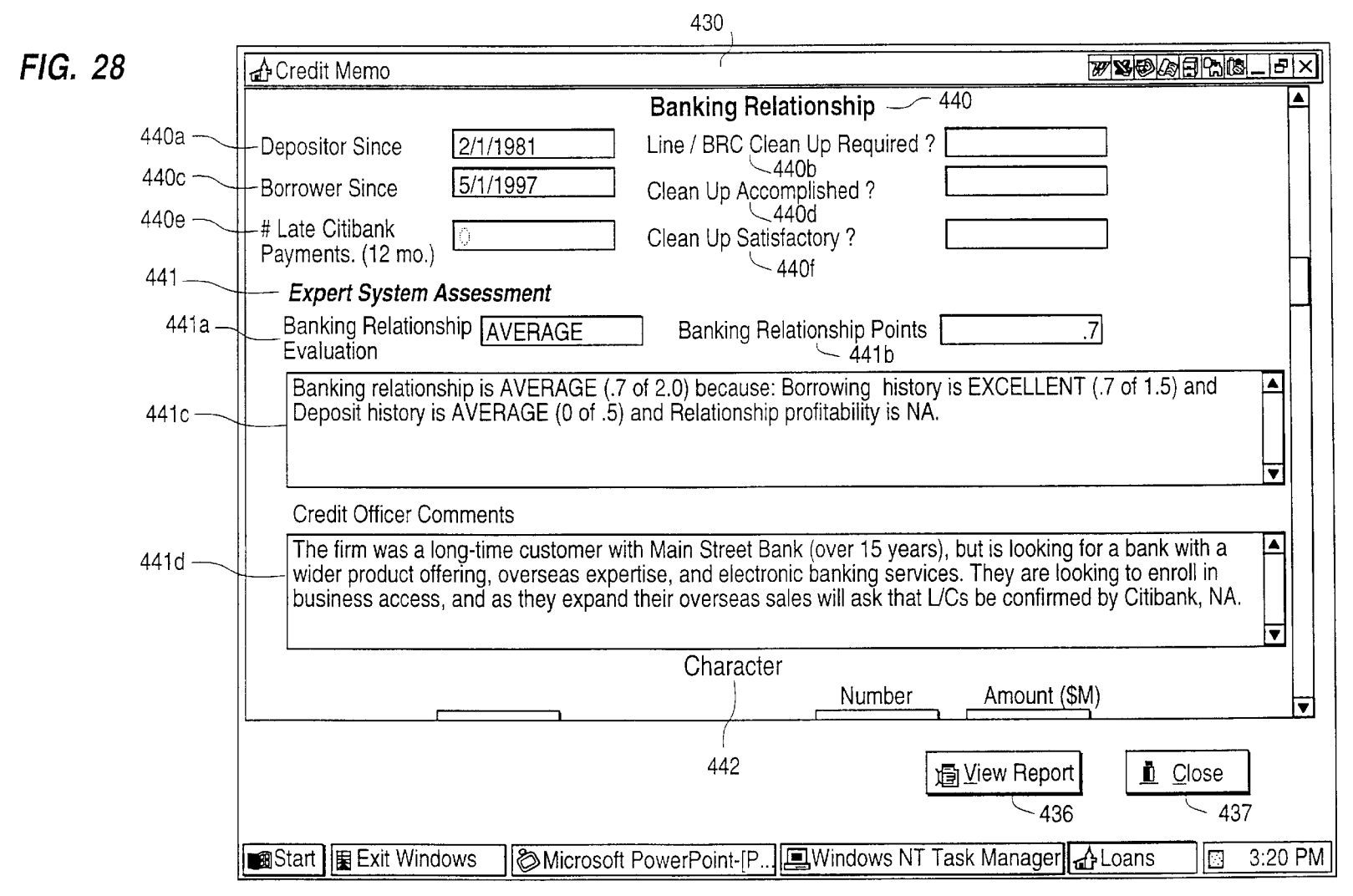

In FIG. 27, if the use continues to scroll down the window 430, the next part of the window 430 appears, as shown in FIG. 28. The next part of the window allows the user to view or update information regarding Banking Relationship 440, including Depositor Since 440a, Line/BRC Clean Up Required? 440b, Borrower Since 440c, Clean Up Accomplished 440d, # Late Citibank Payments (12 mo.) 440e, and Clean Up Satisfactory? 440f; Expert System Assessment Information 441, including Banking Relationship Evaluation 441a, Banking Relationship Points 441b, and comment boxes for general comments 441c, and Credit Officer Comments 441d; and Character information 442, which the user may continue to review or update by scrolling down the window 430. The user may select buttons to View Report 436 or Close 437.

Figure 29:
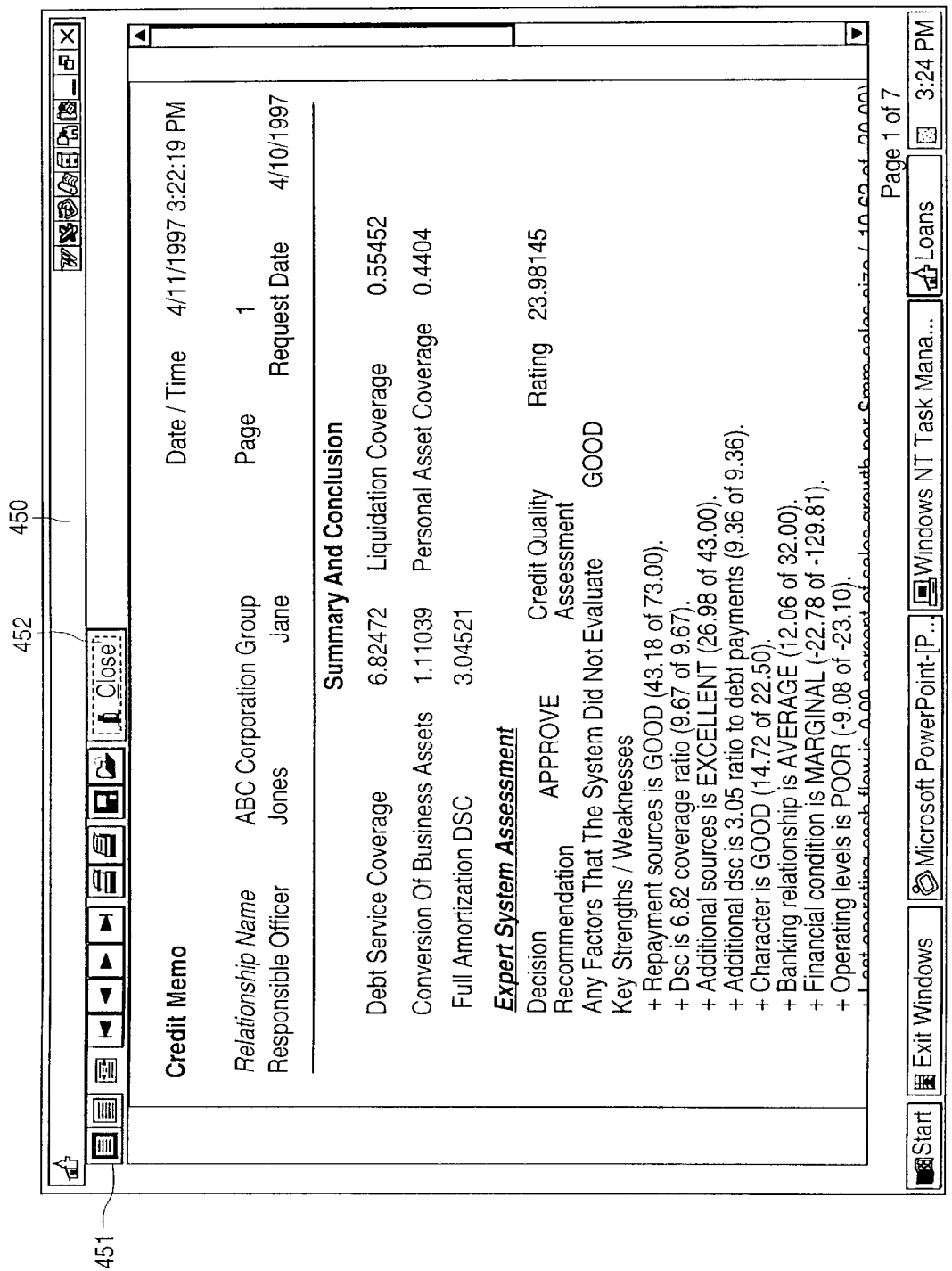
FIG. 29 is the window for view report for credit memo.

In FIGS. 27 or 28, if the user selects the button for View Report 436, a window 450 appears, as shown in FIG. 29. This window 450 contains Credit Memo information in a report format; in the example as shown in FIG. 29, the window 450 shows page 1 of 7. The window 450 includes a toolbar 451 for the user to apply to the report, which includes a button for Close 452.

Figure 30:
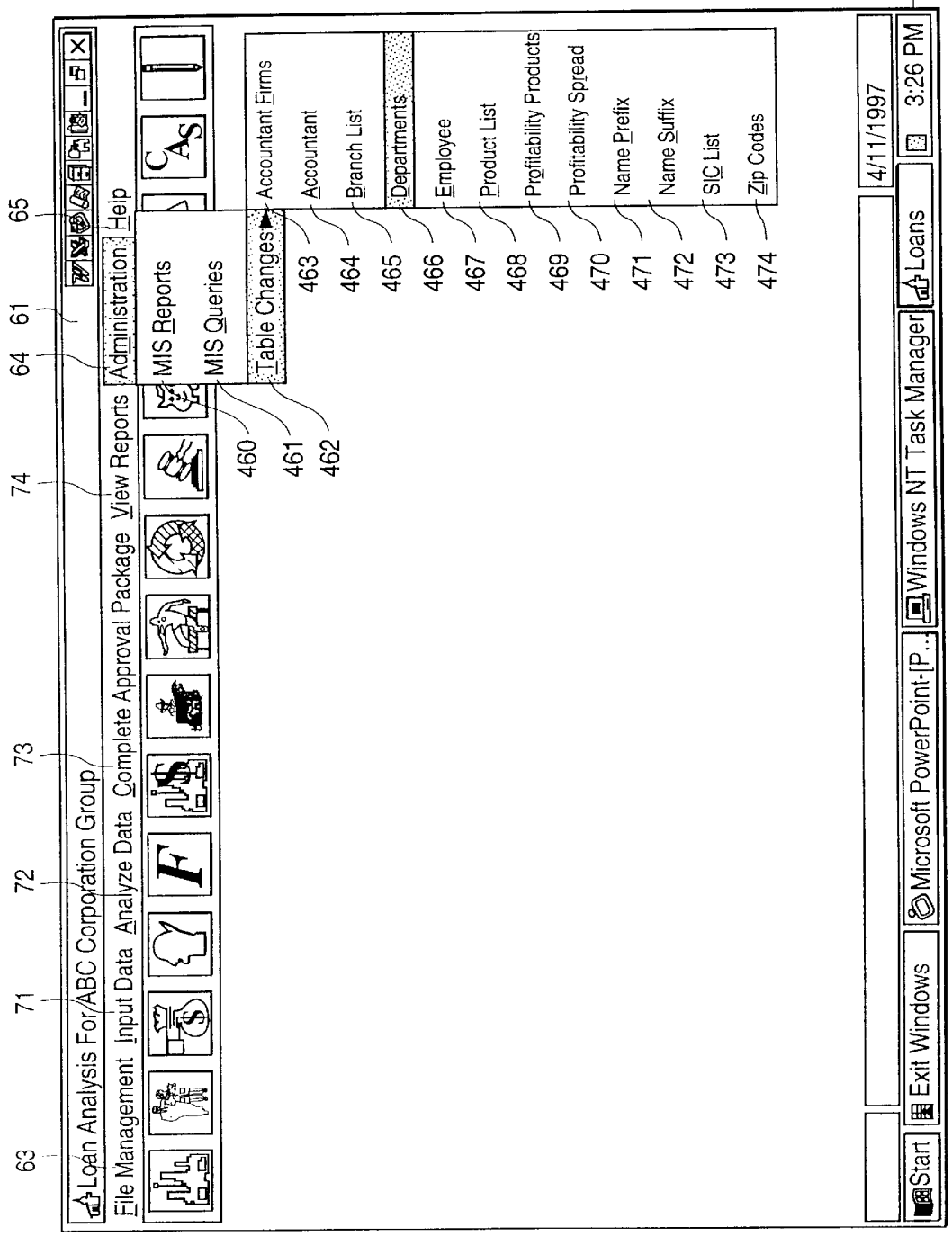
FIG. 30 is the pulldown menu for administration.

FIG. 30 presents the pulldown menu options for Administration 64, which include MIS Reports 460, MIS Queries 461, and Table Changes 462. Selection of the Table Changes 462 option produces a submenu that includes Accountant Firms 463, Accountant 464, Branch List 465, Departments 466, Employee 467, Product List 468, Profitability Products 469, Profitability Spread 470, Name Prefix 471, Name Suffix 472, SIC List 473, and Zip Codes 474.

Figure 31:
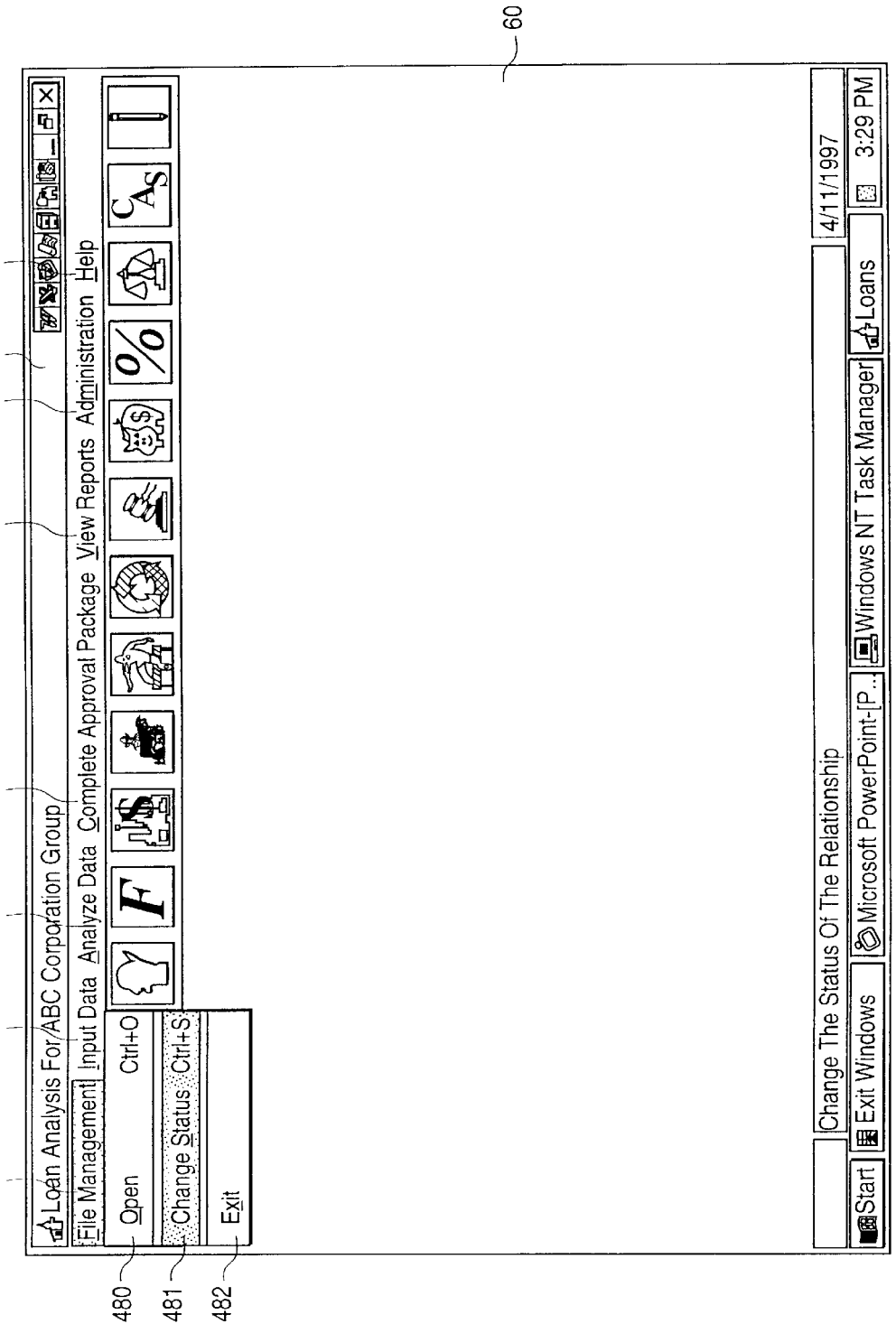
FIG. 31 is the file management pulldown menu.
Figure 32:
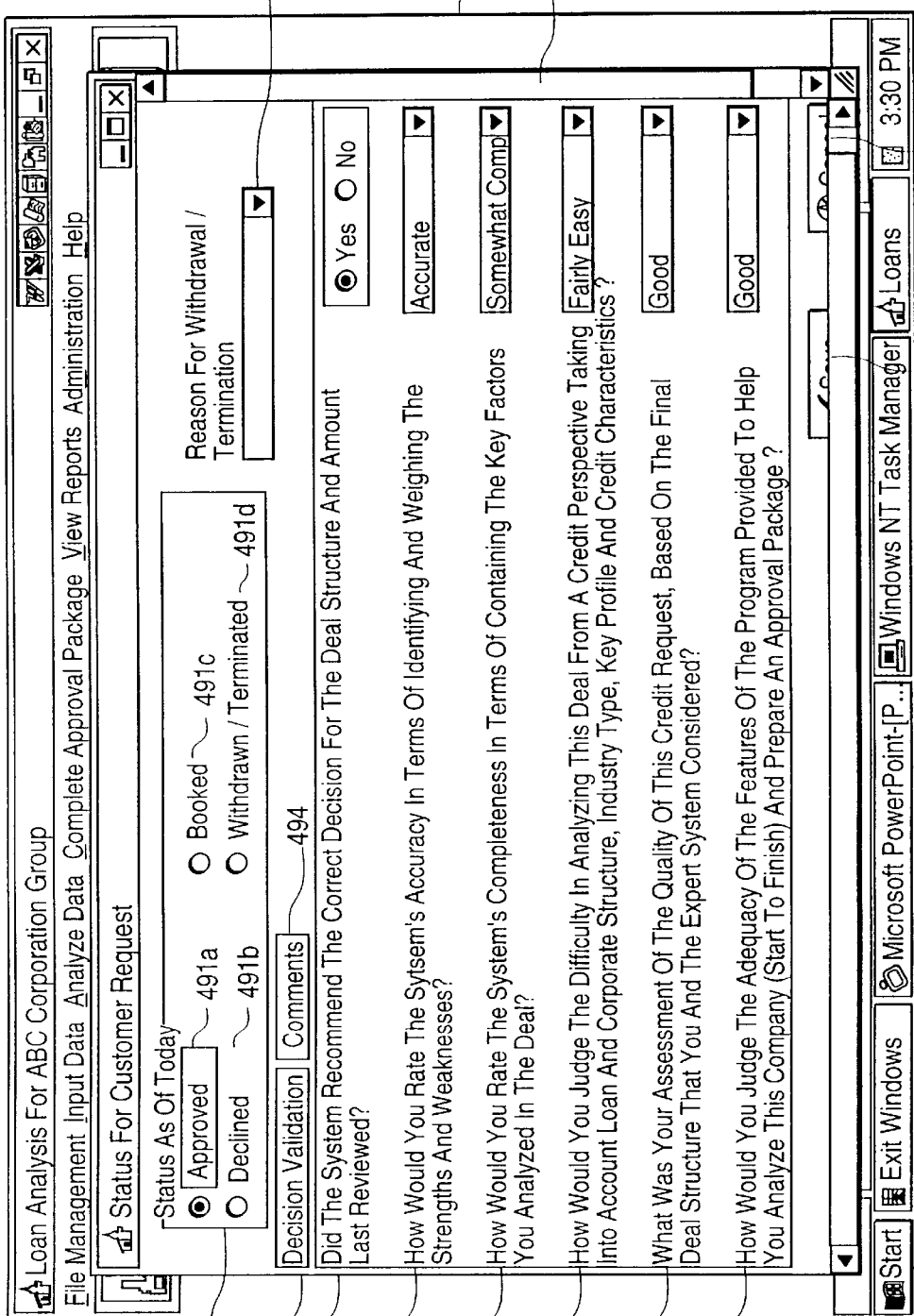
FIG. 32 is the window for change status.

As shown in FIG. 31, the user may select Open 480 from the File Management 63 pulldown menu to open an existing file, and the user may select Exit 482 to exit the system. If the user selects Change Status 481, a window 490 appears, as shown in FIG. 32. The window 490 contains a box for Status as of Today 491, including Approved 491a, Declined 491b, Booked 491c, and Withdrawn/Terminated 491d; and user input areas for Reason for Withdrawal/Termination 492. Two window buttons, Decision Validation 493 and Comments 494 allow additional information input by the user. The window 495 corresponding to Decision Validation 493, as shown in FIG. 32, includes Did the System Recommend the Correct Decision for the Deal Structure and Amount Last Reviewed? 495a; How Would You Rate the System's Accuracy in Terms of Identifying and Weighing the Strengths and Weaknesses? 495b; How Would You Rate the System's Completeness in Terms of Containing the Key Factors You Analyzed in the Deal? 495c; How Would You Judge the Difficulty in Analyzing This Deal From a Credit Perspective Taking Into Account Loan and Corporate Structure, Industry Type, Key Profile and Credit Characteristics? 495d; What Was Your Assessment of the Quality of This Credit Request Based on the Final Deal Structure That You and the Expert System Considered? 495e; and How Would You Judge the Adequacy of the Features of the Program Provided to Help You Analyze the Company [Start to Finish] and Prepare an Approved Package? 495f. The user may select buttons to Save 496 or Cancel 497 inputted information.

Figure 33:
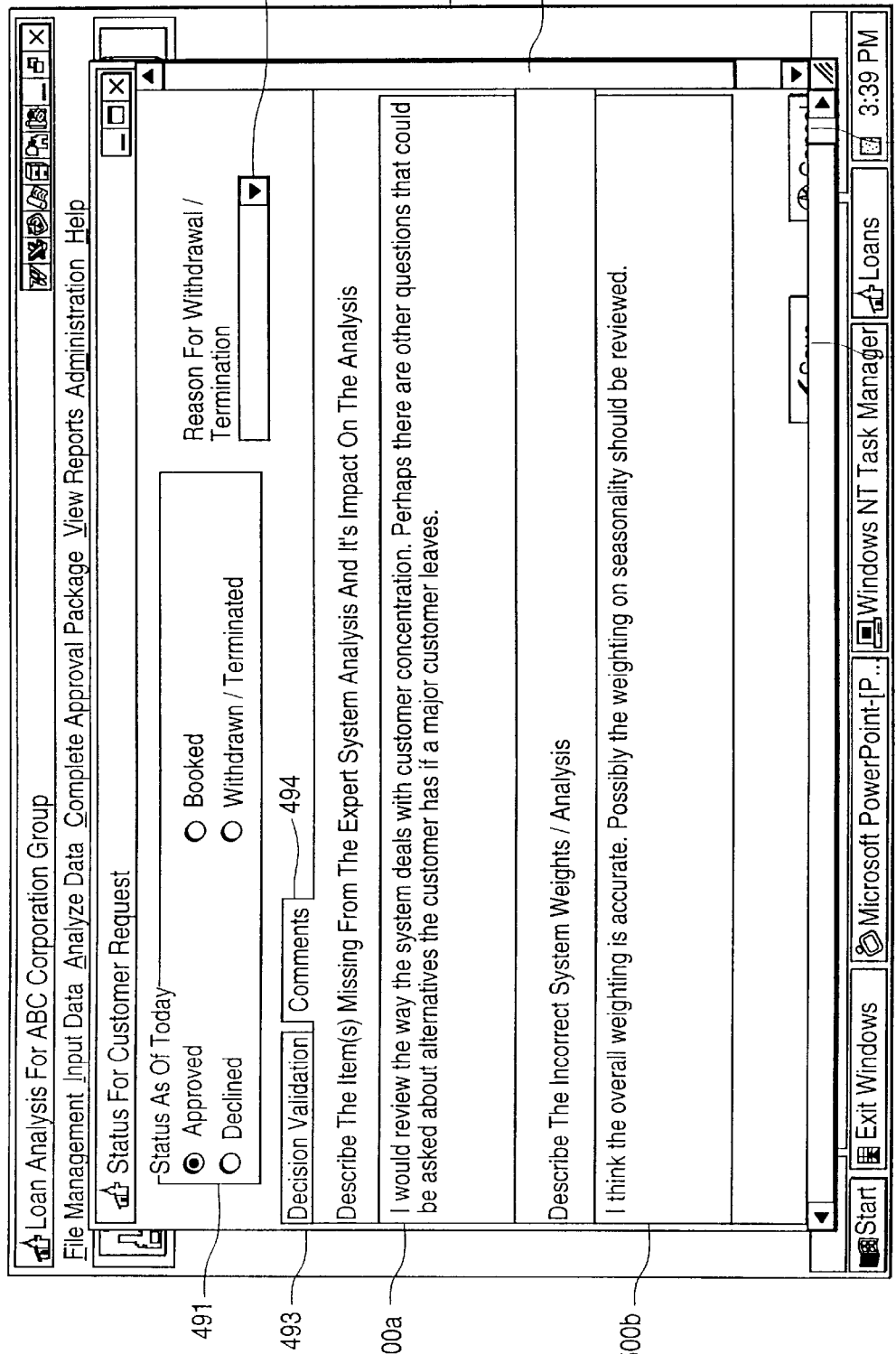
FIG. 33 is the comments window for change status.

In FIG. 32, if the user selects the window button for Comments 494, a window 500 appears, as shown in FIG. 33. This window 500 includes comment areas for Describe the Item(s) Missing From the Expert System Analysis and Its Impact on the Analysis 500a; and Describe the Incorrect System Weights/Analysis 500b. As in FIG. 31, the user may Save 496 or Cancel 497 inputted information.

As noted, an embodiment of the expert system risk assessment component includes a computerized evidence tree that assists a user with evaluating loan applications and making decisions. The evidence tree serves as an engine for a number of functions, including determining an overall credit recommendation and identifying specific strengths and weaknesses relating to the application. The evidence tree may be viewed by the user in any of three modes. In the first mode, the system presents the evidence tree elements to the user by branches simply by the name of the node or factor. (Note: elements of the evidence tree above the lowest level of the tree (lower levels are to the right as shown in the figures) are referred to as "nodes"; the elements of the lowest level of the evidence tree are referred to as "factors"; a branch is a series of connected nodes and/or factors.) In the second mode, the evidence tree includes nodes and factors containing information about the range of possible values (i.e., weights) that are associated with those nodes and factors and the range of possible verbal descriptors, or tags (e.g., Maximum, Excellent, Good, Average, Marginal, Poor, Minimum weights). In the third mode, the evidence tree includes nodes and factors containing weights, flags, tags, colors, and other markers indicating to the user information about that node or factor for a particular scenario being assessed.

The expert system includes automatically analyzing data using the evidence tree, which includes preprocessing data to align evidence tree elements based on the profile of the loan application, automatically analyzing inputted data in preparation for input to evidence tree elements, automatically executing a debt rating model, automatically evaluating the evidence tree elements based on the weights assigned and the inputted data, automatically determining a risk rating, automatically determining an overall risk rating to the obligor, automatically calculating the relationship profitability after all direct and indirect expenses, automatically producing an explanation of strengths and weaknesses of the loan application based on inputs to and results of evidence tree analysis, and automatically making a loan recommendation.

Figure 34:
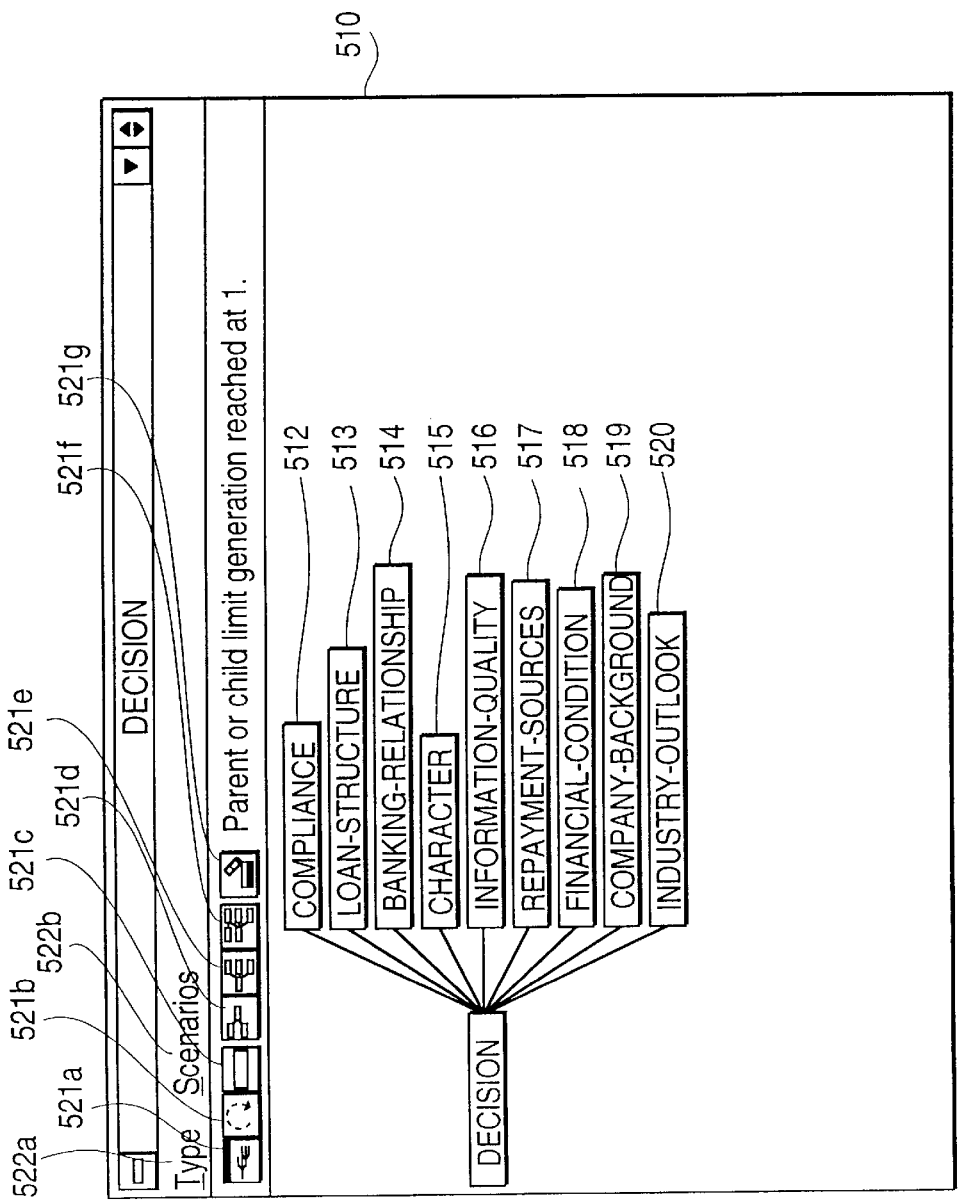
FIG. 34 is the first node and branches of an example evidence tree process.
Figure 35:
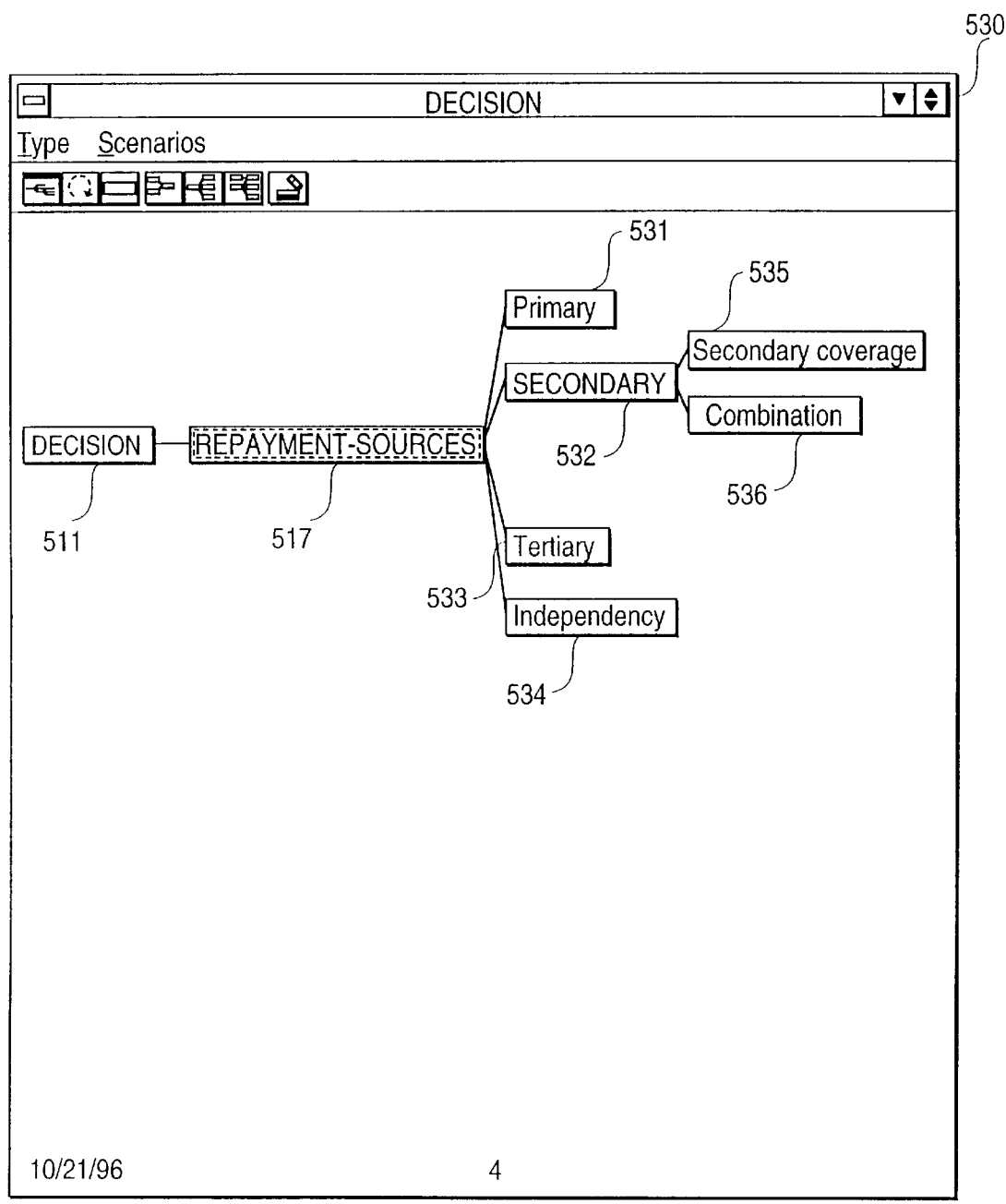
FIG. 35 is a branch for the repayment sources node.
Figure 36:
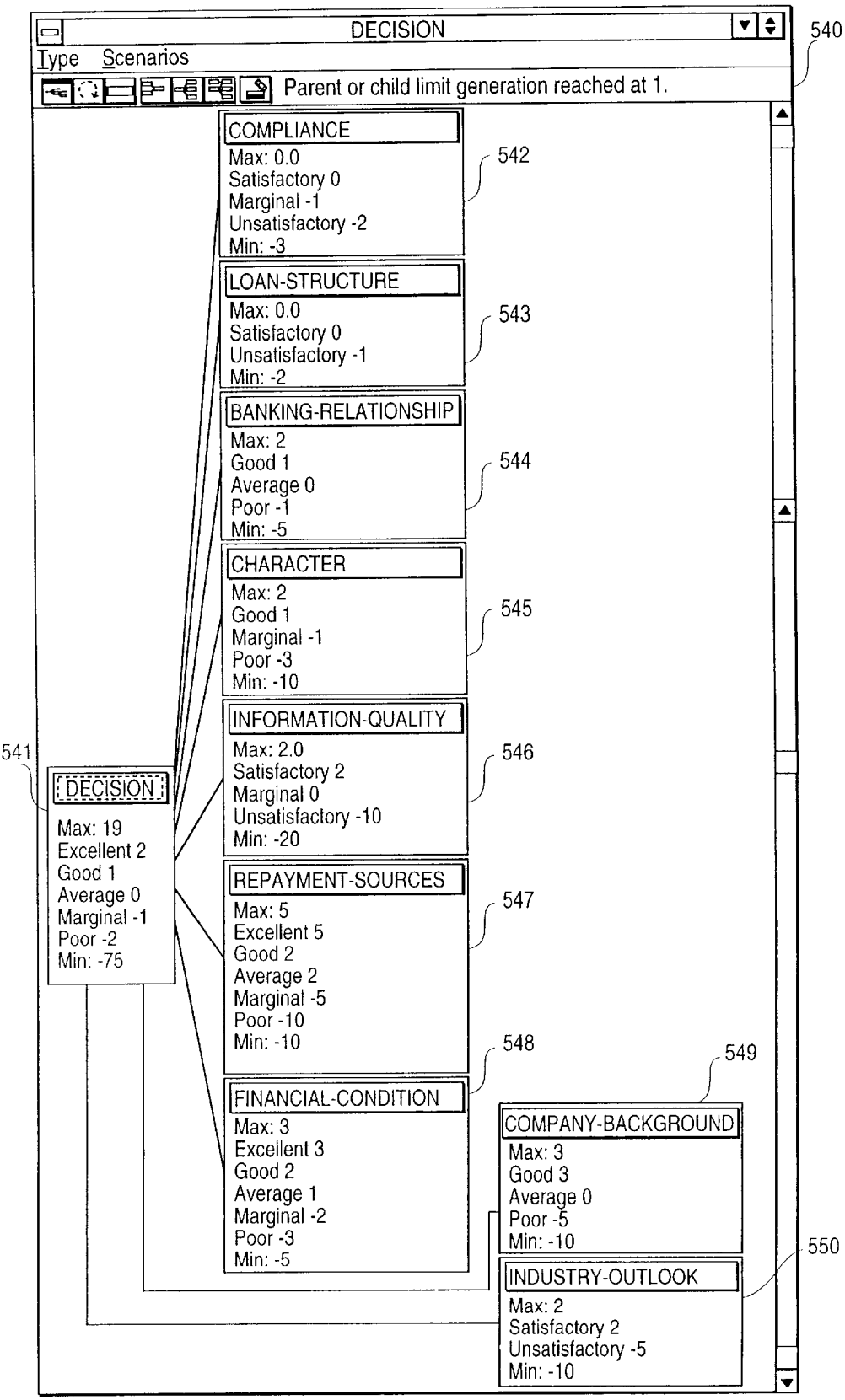
FIG. 36 is the first node and branches for an example evidence tree process with nominal weights included.
Figure 37:
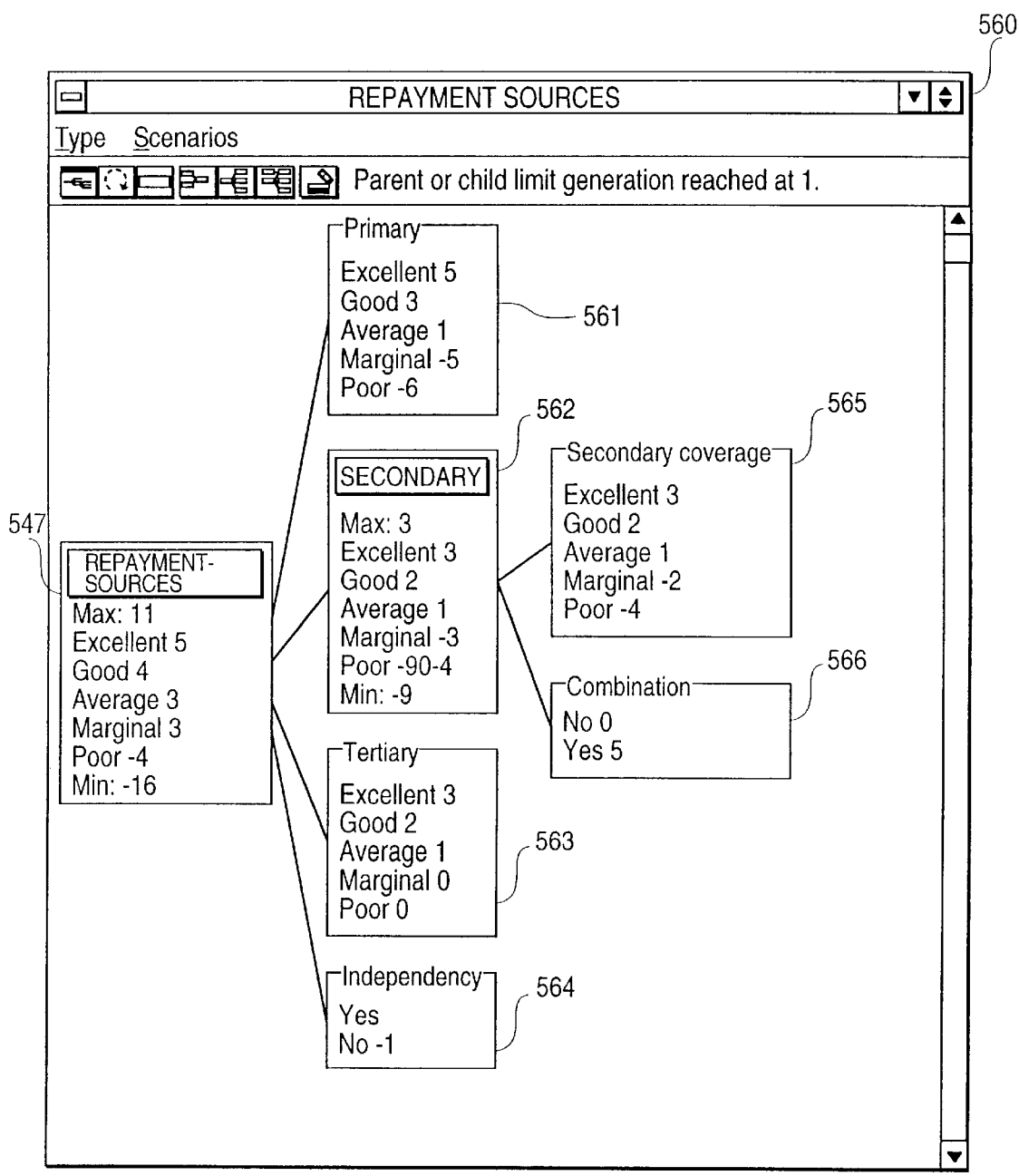
FIG. 37 is the repayment sources node and selected branches.
Figure 38:
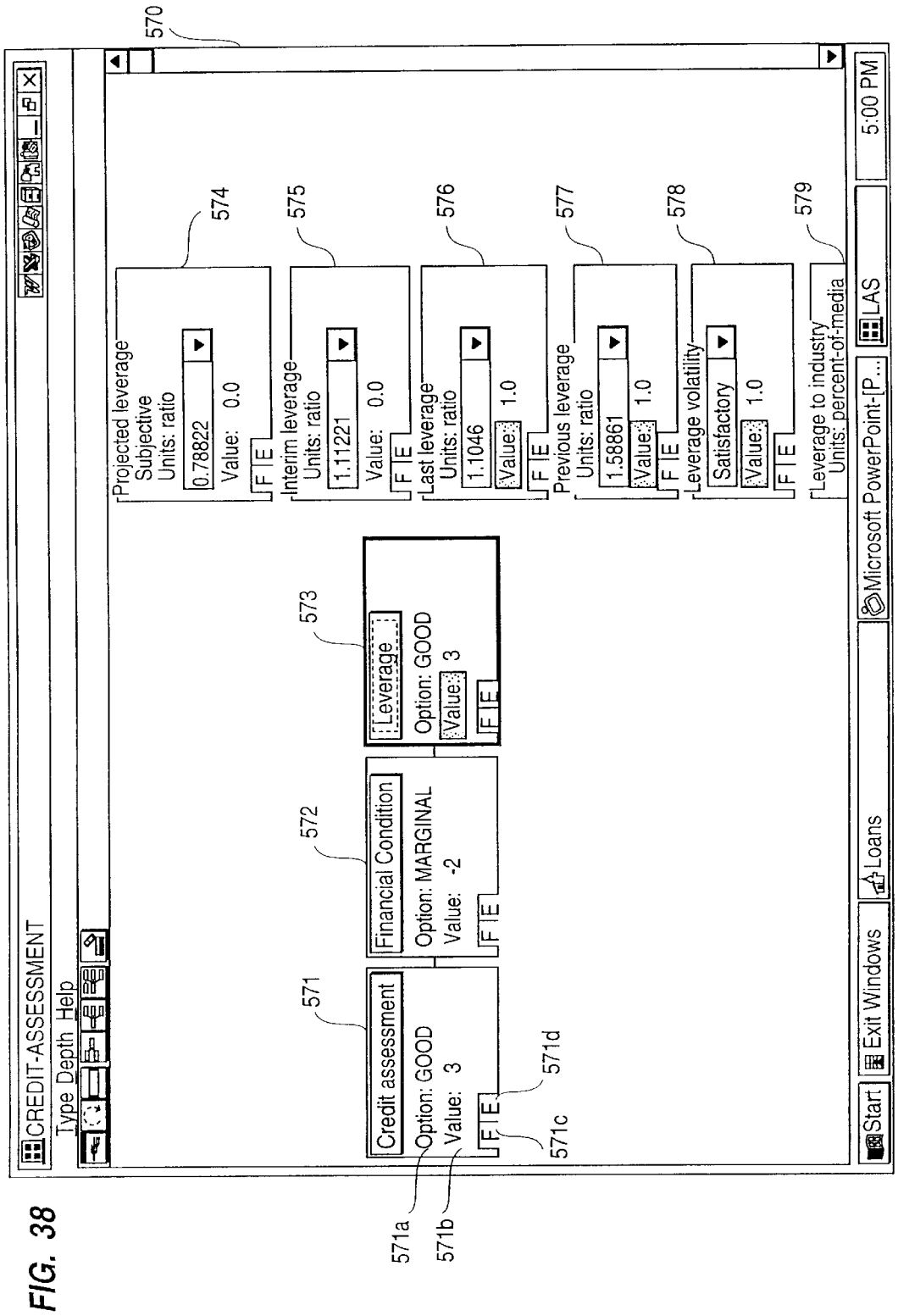
FIG. 38 is a window containing details for a selected sample branch and series of nodes for an actual credit request evaluated by the system.
Figure 39:
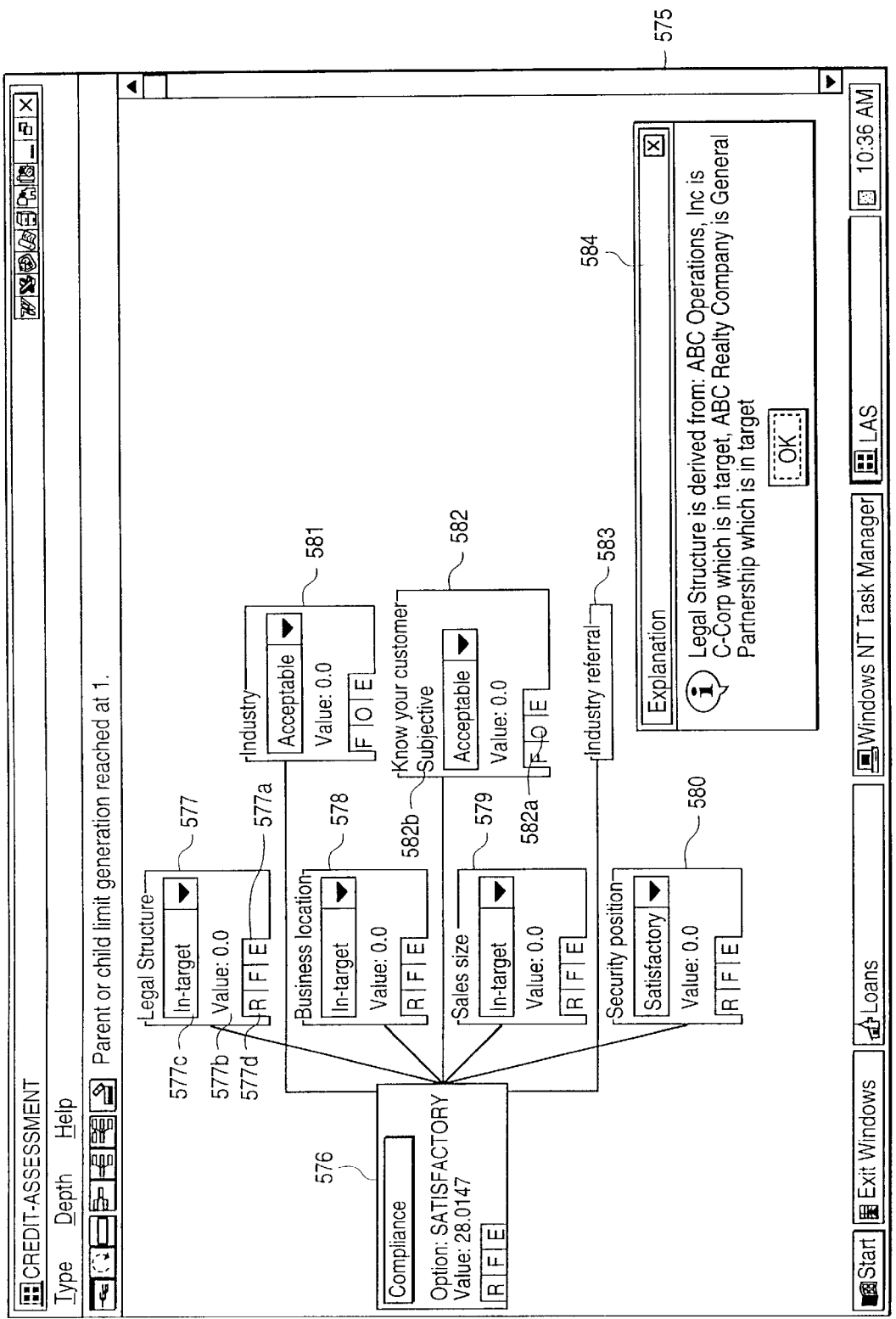
FIG. 39 contains a window with nodes and branches showing flags and tags and an explanation from the system.
Figure 40:
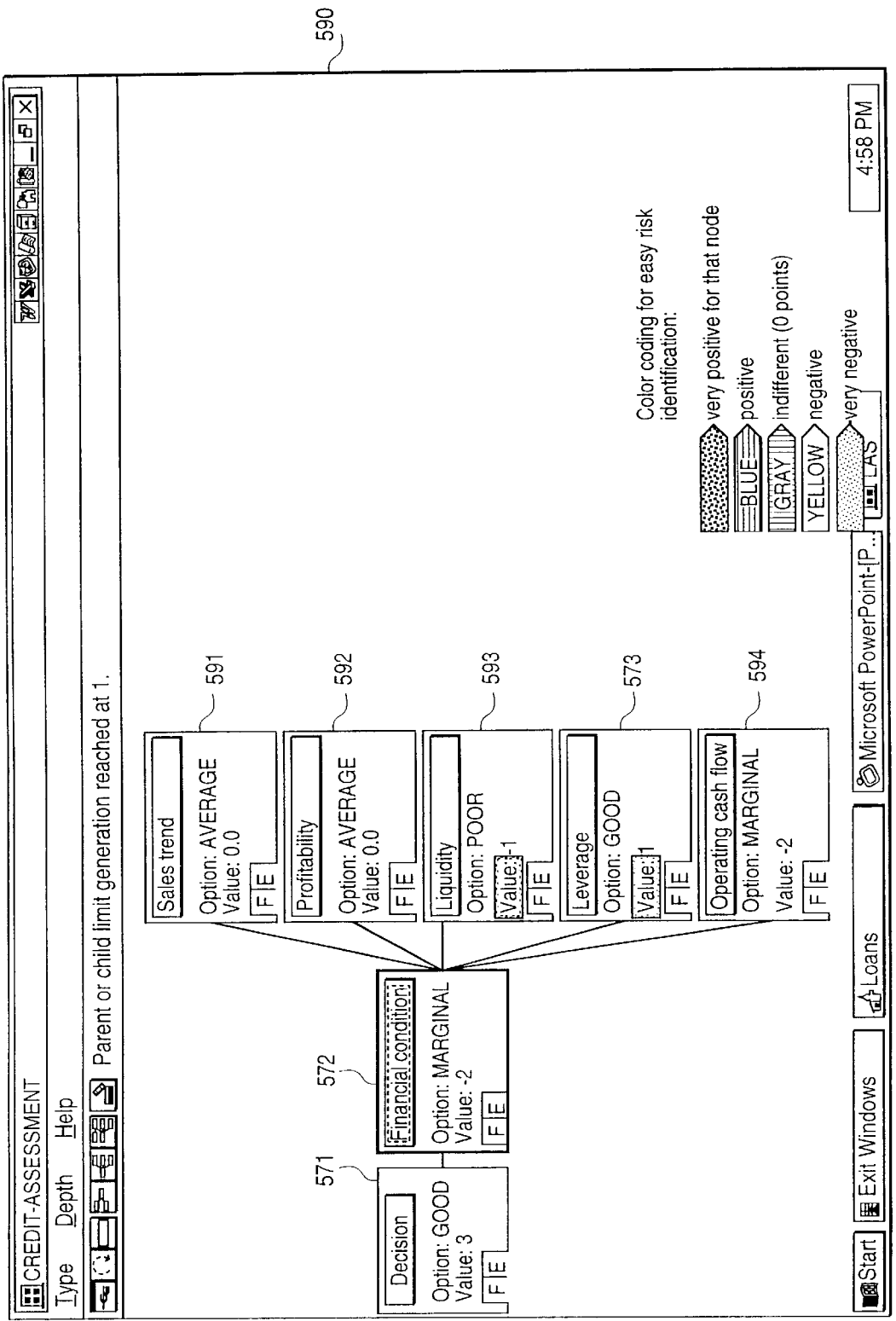
FIG. 40 is a window with sample sections of an evidence tree with details highlighted.

FIGS. 34-35 show sample elements of an evidence tree process for the risk component in the first mode, which contains no weights. FIGS. 36-37 show an evidence tree process for sample information in the second mode, which includes simple example weights and the range of possible verbal descriptors. FIGS. 38–40 show additional branches, nodes, and factors of the evidence tree as incorporated into the system in the third mode, with such features as flags and tagged information.

FIG. 34 shows the first node and branches of an evidence tree process. A window 510 contains a tree for making a Decision 511, with the nodes for nine branches. These nodes include Compliance 512, Loan Structure 513, Banking Relationship 514, Character 515, Information Quality 516, Repayment Sources 517, Financial Condition 518, Company Background 519, and Industry Outlook 520. The nodes are organized into logical groupings, and other concepts may be freely added. Buttons 521a–521g at the top of the window 510 allow alteration in views of the model, vertically and horizontally oriented. The Type 522a pulldown menu allows viewing as a tree, a tree with options, or an actual case.

FIG. 35 shows the branch for the Repayment Sources (517 in FIG. 34) node. A window 530 shows the Decision 511 with the Repayment Sources 517 branch selected. The nodes for Repayment Sources 517 include Primary 531, Secondary 532, Tertiary 533, and Independency 534. The Secondary 532 branch further depends on nodes for Secondary coverage 535 and Combination 536.

FIG. 36 shows the first node and branches for that node of the evidence tree process with example nominal weightings to illustrate the operation of the system and method of the present invention. A window 540 contains a tree for making a Decision 541, with nine branches containing nodes. These nodes include Compliance 542, Loan Structure 543, Banking Relationship 544, Character 545, Information Quality 546, Repayment Sources 547, Financial Condition 548, Company Background 549, and Industry Outlook 550. Within each of these nodes are weighting factors, rules, and functions. For the Decision 541, overall score can range from a maximum of 19, which is a total of each of the maximums for the nine nodes, to a minimum of −75, which is a total of each of the minimums for the nine nodes. An excellent score is 2, a good score is 1, an average score is 0, a marginal score is −1, and a poor score is −2.

Note that each node of the evidence tree contains verbal descriptors of the "buckets" for rating. Positive weights for descriptors indicate "pros" for rating, and negative weights indicate "cons." Relative importance of weights are reflected in the ranges produced within each box. Also note that, in this example with dummy data, both positive and negative weightings for repayment sources 547 carry heavier weights than the financial condition 548 node because the repayment source 547 node relates to actual amount of credit requested to key cash flow and asset coverage analysis, and therefore is more important to the overall decision.

For Compliance 542, the maximum score is 0, a satisfactory score is 0, a marginal score is −1, an unsatisfactory score is −2, and a minimum score is −3. For Loan Structure 543, the maximum score is 0, satisfactory is 0, unsatisfactory is −1, and the minimum is −2. For Banking Relationship 544, the maximum is 2, good is 1, average is 0, poor is −1, and the minimum is −5.

For Character 545, the maximum is 2, good is 1, marginal is −1, poor is −3, and the minimum is −10. For Information Quality 546, the maximum is 2, satisfactory is 2, marginal is 0, unsatisfactory is −10, and the minimum is −30. For Repayment Sources 547, the maximum is 5, excellent is 5, good is 3, average is 2, marginal is −5, poor is −10, and the minimum is −10.

For Financial Condition 548, the maximum is 3, excellent is 3, good is 2, average is 1, marginal is −2, poor is −3, and the minimum is −5. For Company Background 549, the maximum is 3, good is 3, average is 0, poor is −5, and the minimum is −10. For Industry Outlook 550, the maximum is 2, satisfactory is 2, unsatisfactory is −5, and the minimum is −10.

FIG. 37 shows the branches of the Repayment Sources (547 in FIG. 36) node. A window 560 shows the Repayment Sources 547 node and branches selected. The branches for Repayment Sources 547 include Primary 561, Secondary 562, Tertiary 563, and Independency 564. For Primary 561, excellent is 5, good is 3, average is 1, marginal is −5, and poor is −6. For Secondary, the maximum is 3, excellent is 3, good is 2, average is 1, marginal is −3, poor is −4, and the minimum is −9. For Tertiary, excellent is 3, good is 2, average is 1, marginal is 0, and poor is 0. For Independency 564, yes is 0 and no is −1.

The Secondary 562 node further depends on nodes for Secondary coverage 565 and Combination 566. For Secondary coverage 565, excellent is 3, good is 2, average is 1, marginal is −2, and poor is −4. For Combination 566, no is 0 and yes is −5.

FIGS. 38–40 provide examples of additional details provided in conjunction with the evidence tree as viewed by the user using the third mode of viewing. In this mode, flags, tags, colors, and other signals reflecting analyzed data as entered are presented.

FIG. 38 presents a window containing more detail for a selected sample branch with a series of nodes and the factors at the lowest level. This example presents a window 570 containing dummy information for the node of Credit assessment 571. Nodes for Credit assessment 571 include Financial condition 572, and Leverage 573. Leverage 573 further depends on factors for Projected leverage 574, Interim leverage 575, Last leverage 576, Previous leverage 577, Leverage volatility 578, and Leverage to industry 579. Example tags and information are included for these factors. For example, the Credit assessment factor contains a textual tag for option 571a, which is Good and the factor's value 571b, which is 3. Note also that a flag F 571c and an E 571d are included for this factor. The color of the flag F 571c indicates its meaning.

If the F 571c is red, it signals a red flag; if it is white, it signals a white flag. A red flag constitutes an extremely negative weight or other element; a white flag signals an extremely positive weight or other element. For example, a white flag could be issued with respect to the length of the relationship the loan applicant has had with the particular bank. The system may assign weighting to the length of the relationship, with a maximum of some number of months, such as 36. Positive points will be assigned incrementally for lengths of time greater than 0 up to a maximum at 36. If the applicant has had an extremely long relationship with the bank, such as 120 months, this would not be reflected to any greater degree in the weighting than 36 months. In order to account for this additional "extremely positive" aspect of the relationship, a white flag could be automatically issued, such as for all relationships exceeding 60 months.

These flags are intended to assist the credit officer during the evaluation stage. For example, a large number of white flags may help the credit officer determine that a decline should be overridden; a large number of red flags may signal a decline should occur, even though the system recommendation may be Approve.

In FIG. 38, the E 571d indicates that an explanation is available for this node if the E 571d is highlighted in white. The explanation provides key data elements or key explanations of importance to the system operation. If the user selects the E 571d, an explanation pop-up window will appear (similar to pop-up window 584, shown in FIG. 39).

FIG. 39 contains more details regarding some of these flags and other tags. FIG. 39 presents a window 575 with factors for the node for Compliance 576. These factors include Legal structure 577, Business location 578, Sales Size 579, Security position 580, Industry 581, Know your customer 582, and Industry referral 583. In this example, the user has selected the explanation E 577a within the factor for Legal structure 577, which has produced the pop-up window 584. Note that the factors contain textual information regarding the values they contain; for example, the Legal structure 577 branch indicates that the value 577b is In-target 577c. Another flag presented in this window is the RAC failure flag (a RAC is a policy criterion). For example, within the Legal structure factor 577, an R 577d is included. If the R 577d is highlighted (e.g., appears in yellow), it signals a RAC failure. Similarly, factors and nodes can contain a highlighted O indicating that an Overriding Rule has been triggered; for example, the Know your customer factor contains an O 582a, which indicates an Overriding Rule has been triggered for this factor. Note also that this factor contains a textual indication that it is a Subjective 582b factor or is based on subjective information.

FIG. 40 contains a window 590 presenting a sample section of an evidence tree with additional details highlighted. The window 590 shows a branch for the Decision node (571 in FIG. 38), including the node for Financial condition (572 in FIG. 38) and its factors, Sales trend 591, Profitability 592, Liquidity 593, Leverage (573 in FIG. 38), and Operating cash flow 594.

Figure 41:
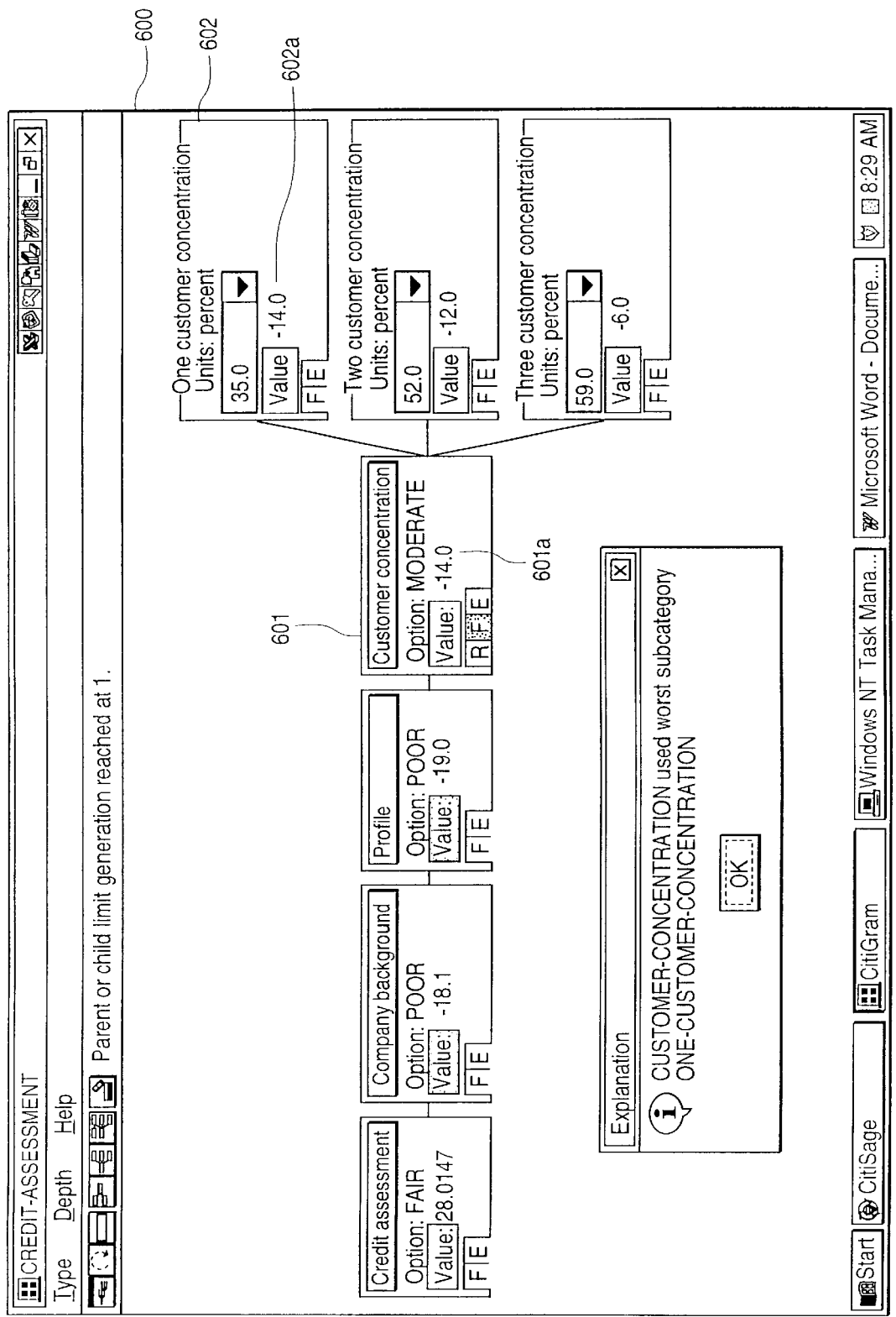
FIG. 41 presents an example for an embodiment of the present invention containing value totaling at a node.

FIGS. 41–44 illustrate several example methods that weighing factors may be totaled for analysis purposes and ways of viewing these analyses. An embodiment includes simply summing the values of various nodes or factors in a particular part of the evidence tree. FIG. 41 illustrates value totaling at a node that does not result from simple addition of the nodes and/or risk factors below that node. In FIG. 41, a window 600 contains a node for customer concentration 601. The node for customer concentration 601 is the result of the worst node below it. In this example, customer concentration 601 has a value 601a of −14 points because it selected the customer concentration risk factor that was the most negative, from the factor for One customer concentration 602, with a value 602a of −14.

Figure 42:
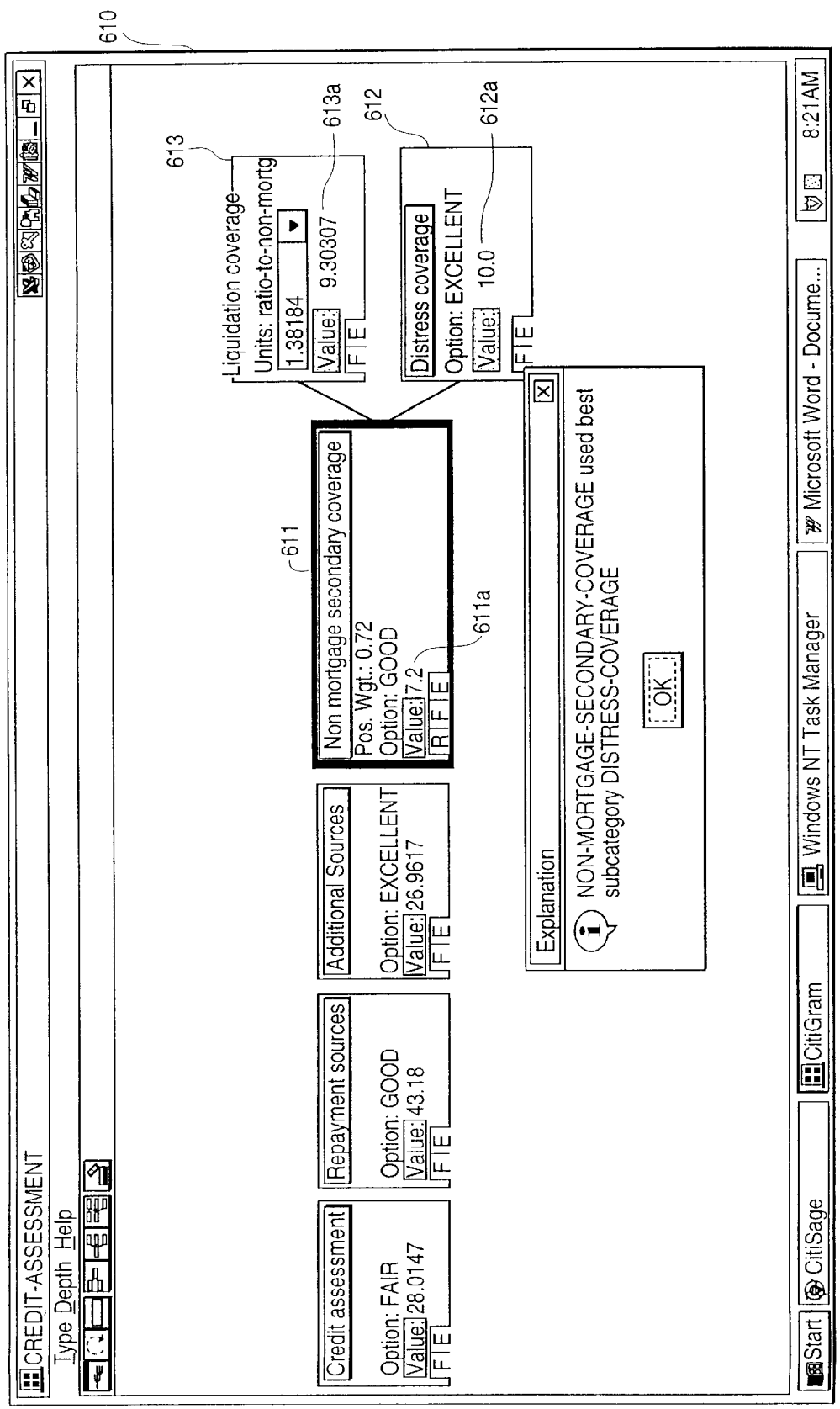
FIG. 42 shows an example for an embodiment of the present invention for value totaling at a node.

FIG. 42 demonstrates two other methods of how weights are propagated up the evidence tree. FIG. 42 contains a window 610 with a node for Non mortgage secondary coverage 611. In this example, the node for Non mortgage secondary coverage 611 used the best value from a node and/or factor below it to obtain its value. Here, the value selected was based on the factor for Distress coverage 612, which has a value 612a of 10 points; the factor of Liquidation coverage 613, with value 613a, was not the basis used because its value was less than 10 points (9.30307 points). FIG. 42 also illustrates another aspect of an embodiment for totaling weighting values, the application of an additional modifier to the value selected. Here, the modifier of 0.72 was applied to the best factor and/or node selected value (10 points) to produce final weight of 7.2 points for the Non mortgage secondary coverage 611 value 611a. The modifier in this case (72%) was derived from the fact that 72% of the facilities requested by the customer in this case were non-mortgage related.

Figure 43:
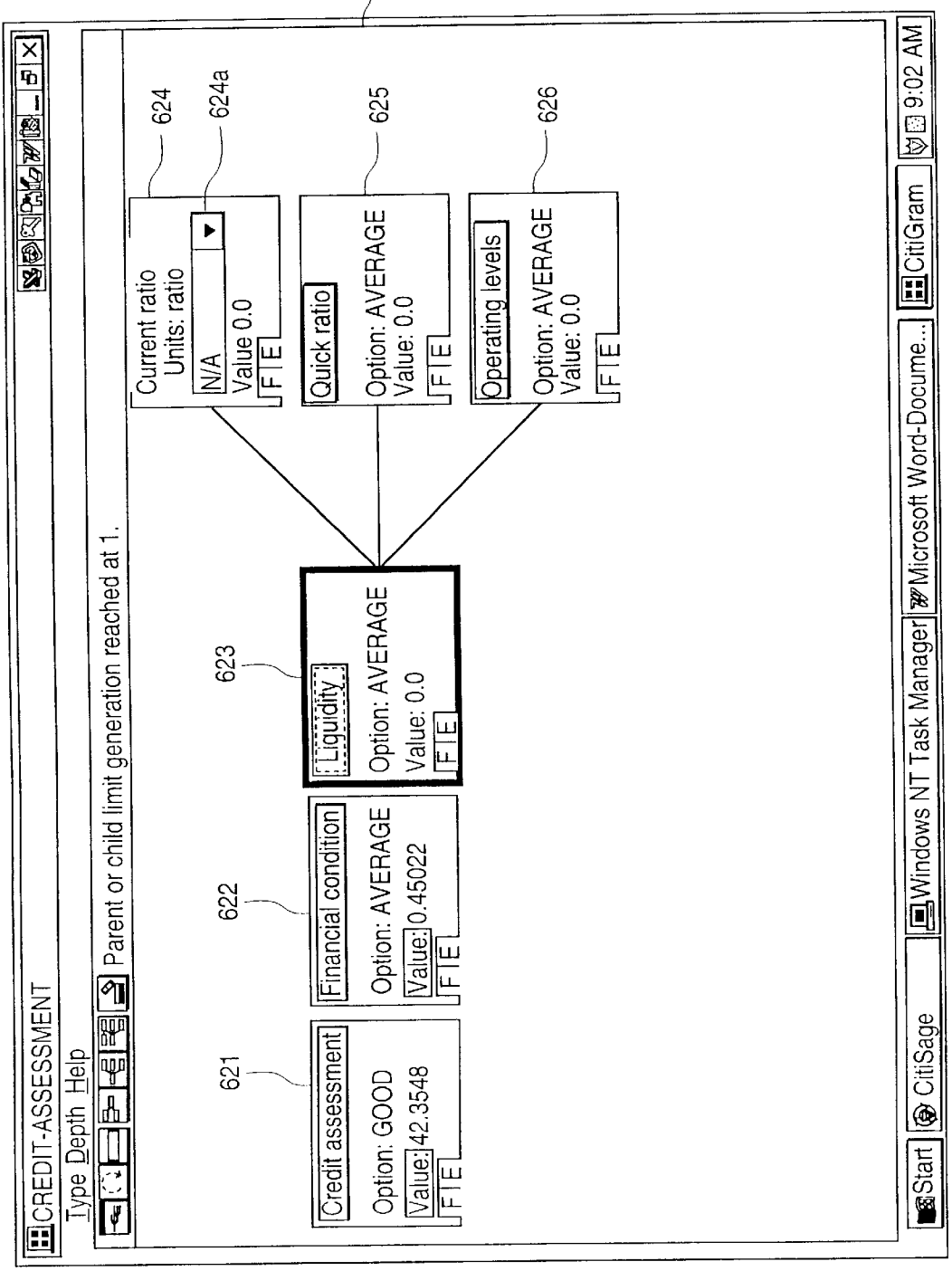
FIG. 43 shows an embodiment of the present invention indicating how a risk factor may not be applicable in a particular case.
Figure 44:
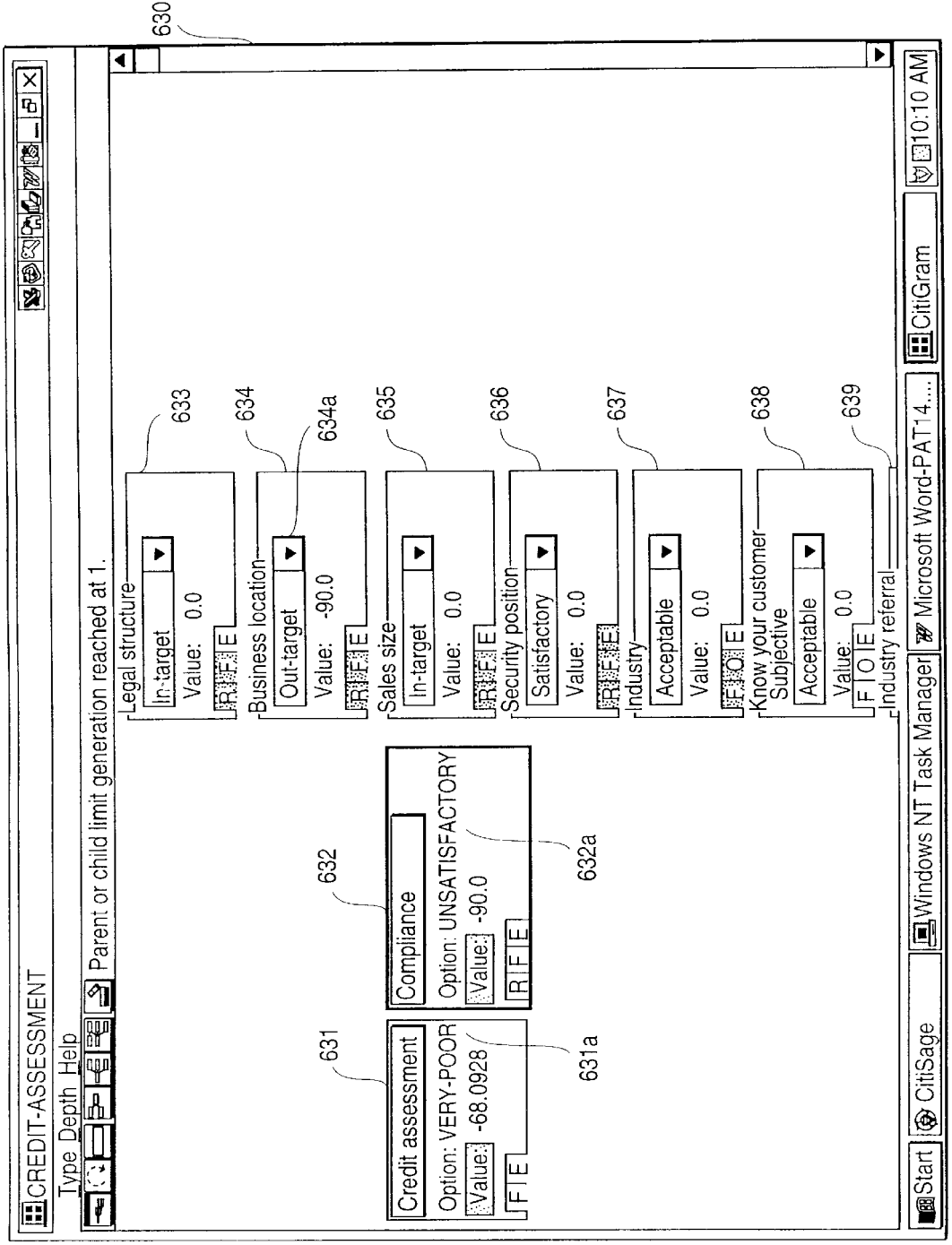
FIG. 44 presents a feature of an embodiment of the present invention that allows the user to modify data and view the results immediately.

FIG. 43 demonstrates that some factors assessed by a risk factor may not be applicable in a particular case. If a particular factor is not applicable, it receives an "N/A" signal. This helps clarify to the user why no value is contained within that factor, since use of another value such as a blank would signal to the user less information about the value actually used. In FIG. 44, a window 620 contains nodes 621, 622, and 623, and factors 624, 625, and 626. Note that the factor for Current ratio 624, contains N/A 624a instead of an option.

FIG. 44 presents another feature of an embodiment of the invention. This feature allows the user, when viewing the graphical interface, to enter modified data directly into the risk factors and view the result immediately. FIG. 44 contains a window 630 presenting this feature. The window 630, contains nodes 631 and 632, and factors 633, 634, 635, 636, 637, 638, and 639. If the data for Business location 634 is changed from in-target to out-target, this result appears in the factor (as shown for the data 634a in factor Business location 634 in FIG. 44). In this example, this change produces a corresponding change in the node for Compliance 632 from satisfactory to unsatisfactory 632a, as shown in FIG. 44, and in the node for Credit assessment 631 to very poor 631a, with the result that the credit decision becomes a decline. The benefits of allowing such changes are that the user, such as a credit officer, can modify data in a temporary way without entering it into the data base and obtain a better understanding of the reasoning process in the system.

An addition aspect of an embodiment of the invention is the use of color in conjunction with values associated with each node or factor. The following colors are used: green indicates a very positive value; blue is a positive value; gray signals an indifferent value; yellow identifies a negative value; and red indicates a very negative value.

Subjective factors are designated by the system operator, and, as noted, as these factors are inputted by the user, their values are highlighted as part of the loan analysis report. An embodiment of the system includes a designation for each question as to whether the information is of a subjective nature. An example of a subjective question could include "How do you view the quality of management at the applicant institution?" The answers that the user could input could include "excellent," "average," and "poor." Each of these answers would have a weighting value associated with it that would affect the system rating. However, each of these answers also is subjective and depends on the user's unquantified determination. In the report phase, the system tallies all of the subjective points and places the tally within a total range of possible subjective scores. For example, the report could indicate that 100 points were awarded for all subjective factors; the minimum that could have been awarded was −200 points; the maximum that could have been awarded was 120 points; average is 0 points; good is 20 points; poor is −50 points. One of the purposes of tracking subjective points is to evaluate the "pessimism" or "optimism" of the user, who generally will be a credit officer.

Further, key information from the last permanent file of results from the assessment model is also available in summary form as a menu option as a "view only" report that includes decision weighting result and recommendation, primary strengths and weaknesses identified; and officer comments on strengths and weakness and recommendation.

Historic loan assessments are retrievable even after a change in the assessment model or expert system program has occurred. In this way decisions made several years ago under prior model versions can be recreated and viewed if necessary.

After a loan has been either approved, declined or withdrawn all data is marked as a permanent file that can no longer be revised. This assures data integrity. Data for a loan decision that is being processed can be filed as work in process prior to a decision point.

What is claimed is:

1. A method for a user to process a loan application for an applicant, comprising:

said user entering loan products requested;

said user entering data relating to said application into a data management system;

said data management system checking said data for completeness and generating preliminary results;

said data management system transmitting said data and preliminary results to an expert analysis system;

said expert analysis system assessing and recommending a loan decision using an evidence tree, wherein said data and preliminary results are propagated from a first set of nodes or factors to a second set of nodes in the evidence tree; and generating a set of documents and transmitting applicant information from said expert analysis system to said data management system so that the data management system produces the set of documents and other forms.

2. The method of claim 1 further including:

said data management system searching and retrieving information relevant to said application from publicly available databases.

3. The method of claim 2 wherein said publicly available databases include at least one option selected from the group consisting of credit bureau agencies, UCC, litigation, and lien information.

4. The method of claim 1 further including generating a letter.

5. The method of claim 1 wherein said set of documents comprises approval documents.

6. The method of claim 1 wherein said set of documents comprises legal documents.

7. The method of claim 1 wherein said assessing and recommending includes analyzing financial records.

8. The method of claim 1 further comprising:

assigning of a debt rating;

determining a risk rating for said loan products requested;

determining an overall risk rating to the obligor; and calculating the relationship profitability after all direct and indirect expenses.

9. The method of claim 1 wherein said assessing and recommending includes identifying sources of repayment.

10. The method of claim 1 wherein said data relating to an application comprises demographic, business, banking, products, industry, business financial, personal, and personal financial information, and subjective evaluations.

11. The method of claim 1 wherein the assessing and recommending comprises:

preprocessing prior to execution to align evidence tree elements based on the profile of said loan application;

analyzing inputted data in preparation for input to the evidence tree elements;

inputting said analyzed inputted data into the evidence tree elements;

evaluating the evidence tree elements based on the weights assigned, the rules, and the inputted data;

producing an explanation of strengths and weaknesses of the loan application based on inputs to and results of evidence tree analysis; and making a loan recommendation.

12. The method of claim 11 wherein said loan recommendation includes at least one option selected from the group consisting of approve, decline, defer, refer, and neutral, and includes a grading of at least one option selected from the group consisting of excellent, good, fair, marginal, poor, and very poor, and includes an overall rating.

13. The method of claim 11 wherein said explanations comprises narrative text.

14. The method of claim 11 wherein said strengths are listed prior to said weaknesses for an approved loan application.

15. The method of claim 11 wherein said weaknesses are listed prior to said strengths for a declined loan application.

16. A method for an expert analysis system to assist a user with making a loan decision based on inputted data, comprising:

preprocessing to align evidence tree elements and assign weights based on the profile of said loan application;

analyzing the inputted data in preparation for input to the evidence tree elements;

inputting said analyzed inputted data into the evidence tree elements;

assigning values to some of the inputted data based on a scale;

evaluating the evidence tree elements based on the weights assigned and the values by multiplying some of the values by some of the weights to create weighted values that are propagating from a first node to a second node;

producing an explanation of strengths and weaknesses of the loan application based on inputs to and results of the evidence tree analysis; and making a loan recommendation.

17. The method of claim 16 wherein said evaluating includes adding additional values assigned to evidence tree factors and nodes.

18. The method of claim 16 wherein said evaluating includes selecting a largest numeric value assigned to one of the evidence tree factors and nodes.

19. The method of claim 18 further including applying a numeric modifier.

20. The method of claim 19 wherein said modifier is a percentage.

21. The method of claim 16 wherein said evaluating includes selecting a smallest numeric value assigned to one of the factors and nodes.

22. The method of claim 16 further comprising saving data from said loan application.

23. The method of claim 16 further comprising:

inputting data for multiple scenarios;

producing results for multiple scenarios;

presenting to the user said results; and producing approval documents for said multiple scenarios.

24. The method of claim 16 further comprising linking to a database system for data extraction.

25. The method of claim 16 wherein said loan recommendation includes at least one option selected from the group consisting of Approve, Decline, Neutral, Refer, and Defer.

26. The method of claim 16 further includes:
tagging selected factors of the evidence tree;
collecting said tagged factors;
combining said tagged factors; and
assigning narrative information to said combined tagged factors.

27. The method of claim 16 further including:
identifying a decision tree element that is not applicable to the evidence tree analysis evaluation; and
replacing said inputted data in evidence tree elements with a textual symbol.

28. The method of claim 27 wherein said textual symbol is "N/A".

29. The method of claim 16 further comprising:
identifying risk acceptance criteria and underwriting guidelines for evidence tree elements; and
providing a flag within the system identifying said risk acceptance criteria and said underwriting guidelines as at least one option selected from the group consisting of pass and fail.

30. The method of claim 29 wherein the flag is included in a factor.

31. The method of claim 29 wherein said flag comprises a highlighted symbol.

32. The method of claim 16 further comprising:
identifying an exceptionally negative factor within the evidence tree; and
providing a list of extreme negative factors that includes said identified extreme negative factor.

33. The method of claim 16 further comprising:
identifying an exceptionally positive factor; and
providing a list of exceptionally positive factors that includes said identified exceptionally positive factor.

34. The method of claim 16 further comprising:
identifying that an overriding rule has been triggered; and
providing a flag to the user that an overriding rule has been triggered.

35. The method of claim 16 further comprising:
determining by said expert system that no data has been entered for one of the evidence tree elements; and
providing to the user an indication that no data was entered for the one evidence tree element for which no data has been entered.

36. The method of claim 16 further comprising tagging factors.

37. The method of claim 36 wherein said tagging includes color tagging.

38. The method of claim 36 wherein said tagging includes verbal tagging.

39. The method of claim 36 wherein said tagging includes textual tagging.

40. The method of claim 36 wherein said tagging includes symbol tagging.

41. The method of claim 36 wherein said tagging includes numeric tagging.

42. The method of claim 16 further comprises
allowing the user to view color tags, verbal tags, textual, symbol, and numeric tags, and real-time propagation of the evaluating step.

43. The method of claim 16 further comprising:
tagging each evidence tree element for which an explanations is available; and
allowing the user to select an option to view said explanation.

44. The method of claim 16 further comprises
providing a list of factors that were not evaluated where an incomplete set of input data has been inputted by said user.

45. The method of claim 16 further comprises:
identifying qualitative factors in the evidence tree;
combining said qualitative factors; and
providing said user with the total of said qualitative factors and a range of possible qualitative factors.

46. The method of claim 45 wherein said qualitative factors comprise subjective factors.

47. The method of claim 45 wherein said qualitative factors include identified factors in an evidence tree.

48. The method of claim 45 wherein said combining includes summing numeric values associated with evidence tree branches.

49. A system for a user to process a loan application by an applicant, comprising:
means for entering data relating to said application into a data management system;
means for said data management system to check said data;
means for said data management system to generate relevant documents for said applicant relating to said application;
means for said data management system to transmit said data to an evidence tree;
means for said evidence tree to assess and recommend a loan decision by propagating data from a first node or factor to a second node in the evidence tree; and
means for said evidence tree to transmit applicant information to said data management system so that the data management system may generate a set of relevant documents.

50. The system of claim 49 further comprising:
means for searching and retrieving within said data management system of publicly available databases for information relevant to said loan application, including UCC, litigation, and lien information relevant to said application.

51. The system of claim 49 further comprising generating a letter.

52. The system of claim 49 wherein said means for checking, generating, searching, assessing, filing, and recommending comprise computing means.

53. A method for processing an application comprising:
entering applicant data into a processing system;
organizing the applicant data into formatted data by the processing system
generating preliminary results by the processing system;
forwarding the preliminary results to an expert analysis system comprised of an evidence tree;
accessing at least one database to obtain additional data;
generating second results by the expert system based upon the formatted data, preliminary results and the additional data using the evidence tree containing a plurality of nodes and factors and at least one of the following techniques:
propagating a value from a first node or a first factor to a second node;

propagating a weighted value from a third node or a second factor to a fourth node;

forwarding the results to the processing system; and producing documents necessary to manage a financial transaction by the processing system wherein some of the results from the expert analysis system are contained in the documents.

54. The method of claim 53 further comprising:

identifying suggested alternative possible evaluation outcomes for nodes and factors; and displaying said alternative outcomes.

55. The method of claim 53 further comprising displaying said nodes and factors without alternative outcomes.

56. The method of claim 53 further comprising the step of displaying said nodes and factors without tags and flags.

57. The method of claim 53 wherein said factors comprise qualitative evaluation by said user, including at least one option selected from the group consisting of satisfactory and unsatisfactory for supplier risk, and at least one option selected from the group consisting of high, medium, and low for customer stability.

* * * * *